(12) United States Patent
Ngo et al.

(10) Patent No.: US 10,579,580 B2
(45) Date of Patent: Mar. 3, 2020

(54) START OF SEQUENCE DETECTION FOR ONE WIRE BUS

(71) Applicant: RF Micro Devices, Inc.

(72) Inventors: Christopher Truong Ngo, Queen Creek, AZ (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 704 days.

(21) Appl. No.: 14/659,292

(22) Filed: Mar. 16, 2015

(65) Prior Publication Data

US 2015/0193373 A1 Jul. 9, 2015

Related U.S. Application Data

(63) Continuation-in-part of application No. 14/575,491, filed on Dec. 18, 2014, now Pat. No. 10,185,683.
(Continued)

(51) Int. Cl.
*G06F 13/00* (2006.01)
*G06F 13/42* (2006.01)
(Continued)

(52) U.S. Cl.
CPC ........ *G06F 13/4291* (2013.01); *G06F 13/364* (2013.01); *G06F 13/3625* (2013.01); *G06F 13/4018* (2013.01)

(58) Field of Classification Search
CPC ........ G06F 13/36; G06F 13/38; G06F 13/385; G06F 13/40; G06F 2213/0016;
(Continued)

(56) References Cited

U.S. PATENT DOCUMENTS 3,953,835 A * 4/1976 Cuccio .................... G06F 13/24
710/60
5,787,132 A * 7/1998 Kishigami .............. H04L 7/042
370/304

(Continued)

OTHER PUBLICATIONS

Non-Final Office Action for U.S. Appl. No. 14/575,491, dated May 26, 2017, 20 pages.
(Continued)

*Primary Examiner* — Tim T Vo
*Assistant Examiner* — Kim T Huynh
(74) *Attorney, Agent, or Firm* — Withrow & Terranova, P.L.L.C.

(57) ABSTRACT

The disclosure relates to bus interface systems. In one embodiment, the bus interface system includes a bus line along with a master bus controller and a slave bus controller coupled to the bus line. In order to start a data frame, the master bus controller is configured to generate a sequence of data pulses along the bus line such that the sequence of data pulses is provided in accordance to a start of sequence (SOS) pulse pattern. The slave bus controller is configured to recognize that the sequence of data transmitted along the bus line by the master bus controller has been provided in accordance with the SOS pulse pattern. In this manner, the slave bus controller can detect when the master bus controller has started a new data frame. As such, the exchange of information through data frames can be synchronized along the bus line with requiring an additional bus line for a clock signal.

31 Claims, 21 Drawing Sheets

Related U.S. Application Data

(60) Provisional application No. 61/953,251, filed on Mar. 14, 2014, provisional application No. 61/917,610, filed on Dec. 18, 2013.

(51) Int. Cl.
  *G06F 13/364* (2006.01)
  *G06F 13/40* (2006.01)
  *G06F 13/362* (2006.01)

(58) Field of Classification Search
  CPC ..... G06F 2213/0024; G06F 2213/0026; G06F 13/4004; G06F 13/4027; G06F 2213/4002; G06F 12/0835; H04L 12/40052; H04L 2012/4026
  USPC .......................................... 710/110, 305–306
  See application file for complete search history.

(56) References Cited

U.S. PATENT DOCUMENTS

| | | |
|---|---|---|
| 6,408,163 B1 | 6/2002 | Fik |
| 6,484,268 B2 | 11/2002 | Tamura et al. |
| 7,685,320 B1 | 3/2010 | Wishneusky |
| 9,430,321 B2 | 8/2016 | Slik |
| 9,519,612 B2 | 12/2016 | Hietala et al. |
| 9,652,451 B2 | 5/2017 | Elder |
| 2001/0050713 A1 | 12/2001 | Kubo et al. |
| 2004/0049619 A1 | 3/2004 | Lin |
| 2004/0100400 A1 | 5/2004 | Perelman et al. |
| 2004/0128594 A1 | 7/2004 | Elmhurst et al. |
| 2004/0221067 A1 | 11/2004 | Huang et al. |
| 2005/0012492 A1 | 1/2005 | Mihalka |
| 2006/0050694 A1 | 3/2006 | Bury et al. |
| 2006/0152236 A1 | 7/2006 | Kim |
| 2006/0236008 A1 | 10/2006 | Asano et al. |
| 2009/0248932 A1 | 10/2009 | Taylor et al. |
| 2011/0035632 A1 | 2/2011 | Hong et al. |
| 2011/0113171 A1 | 5/2011 | Radhakrishnan et al. |
| 2012/0027104 A1 | 2/2012 | Bas et al. |
| 2012/0030753 A1 | 2/2012 | Bas et al. |
| 2012/0226965 A1 | 9/2012 | Hammerschmidt et al. |
| 2012/0303836 A1 | 11/2012 | Ngo et al. |
| 2013/0054850 A1 | 2/2013 | Co |
| 2013/0124763 A1 | 5/2013 | Kessler |
| 2013/0132624 A1 | 5/2013 | Chen et al. |
| 2013/0197920 A1 | 8/2013 | Lesso et al. |
| 2013/0265884 A1 | 10/2013 | Brombal et al. |
| 2013/0301689 A1 | 11/2013 | Marchand et al. |
| 2014/0025999 A1 | 1/2014 | Kessler |
| 2014/0376278 A1 | 12/2014 | Fornage et al. |
| 2015/0056941 A1 | 2/2015 | Lin et al. |
| 2015/0074306 A1 | 3/2015 | Ayyagari et al. |
| 2015/0106541 A1 | 4/2015 | Southcombe et al. |
| 2015/0127862 A1 | 5/2015 | Fan et al. |
| 2016/0050513 A1 | 2/2016 | Wang et al. |
| 2016/0124892 A1 | 5/2016 | Amarillo et al. |

OTHER PUBLICATIONS

Non-Final Office Action for U.S. Appl. No. 14/659,379, dated Apr. 7, 2017, 37 pages.
Non-Final Office Action for U.S. Appl. No. 14/575,491, dated Nov. 30, 2017, 18 pages.
Advisory Action for U.S. Appl. No. 14/659,379, dated Feb. 26, 2018, 3 pages.
Non-Final Office Action for U.S. Appl. No. 14/659,328, dated Sep. 8, 2017, 51 pages.
Non-Final Office Action for U.S. Appl. No. 14/659,355, dated Sep. 20, 2017, 32 pages.
Non-Final Office Action for U.S. Appl. No. 14/659,371, dated Sep. 25, 2017, 23 pages.
Final Office Action for U.S. Appl. No. 14/659,379, dated Oct. 18, 2017, 44 pages.
Final Office Action for U.S. Appl. No. 14/659,328, dated Mar. 20, 2018, 61 pages.
Final Office Action for U.S. Appl. No. 14/659,355, dated Apr. 17, 2018, 11 pages.
Final Office Action for U.S. Appl. No. 14/659,371, dated May 3, 2018, 21 pages.
Notice of Allowance for U.S. Appl. No. 14/659,379, dated Mar. 20, 2018, 10 pages.
Notice of Allowance for U.S. Appl. No. 14/659,328, dated Jul. 2, 2018, 8 pages.
Advisory Action for U.S. Appl. No. 14/659,355, dated Jul. 5, 2018, 3 pages.
Advisory Action for U.S. Appl. No. 14/659,371, dated Aug. 1, 2018, 3 pages.
Non-Final Office Action for U.S. Appl. No. 15/467,790, dated Jun. 28, 2018, 14 pages.
Ex Parte Quayle Action for U.S. Appl. No. 15/365,315, mailed Jul. 26, 2018, 7 pages.
Notice of Allowance for U.S. Appl. No. 15/472,756, dated Aug. 8, 2018, 8 pages.
Notice of Allowance and Examiner-Initiated Interview Summary for U.S. Appl. No. 15/365,315, dated Sep. 14, 2018, 9 pages.
Non-Final Office Action for U.S. Appl. No. 14/659,355, dated Oct. 12, 2018, 8 pages.
Final Office Action for U.S. Appl. No. 15/467,790, dated Nov. 5, 2018, 15 pages.
Non-Final Office Action for U.S. Appl. No. 15/443,236, dated Nov. 16, 2018, 19 pages.
Non-Final Office Action for U.S. Appl. No. 15/886,209, dated May 17, 2019, 7 pages.
Notice of Allowance for U.S. Appl. No. 15/467,790, dated May 20, 2019, 8 pages.
Final Office Action for U.S. Appl. No. 15/443,236, dated May 30, 2019, 20 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Advisory Action for U.S. Appl. No. 15/467,790, dated Feb. 26, 2019, 3 pages.
Final Office Action for U.S. Appl. No. 14/659,355, dated May 2, 2019, 8 pages.
Author Unknown, "1-Wire," Wikipedia, last modified Jan. 16, 2015, accessed Feb. 12, 2015, http://en.wikipedia.org/wiki/1-Wire, 4 pages.
Author Unknown, "DS1822: Econo 1-Wire Digital Thermometer," Maxim Integrated, 2007, 21 pages.
Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
U.S. Appl. No. 14/575,491, filed Dec. 18, 2014.
U.S. Appl. No. 14/659,328, filed Mar. 16, 2015.
U.S. Appl. No. 14/659,355, filed Mar. 16, 2015.
U.S. Appl. No. 14/659,371, filed Mar. 16, 2015.
U.S. Appl. No. 14/659,379, filed Mar. 16, 2015.
Notice of Allowance for U.S. Appl. No. 15/886,209, dated Sep. 11, 2019, 7 pages.
Final Office Action for U.S. Appl. No. 15/365,295, dated Aug. 15, 2019, 11 pages.
Corrected Notice of Allowance for U.S. Appl. No. 15/467,790, dated Aug. 15, 2019, 6 pages.
Corrected Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.

\* cited by examiner

START OF SEQUENCE DETECTION FOR ONE WIRE BUS

RELATED APPLICATIONS

This application claims the benefit of provisional patent application Ser. No. 61/953,251, filed Mar. 14, 2014, the disclosure of which is hereby incorporated herein by reference in its entirety. This application is a continuation in part of U.S. patent application Ser. No. 14/575,491, filed Dec. 18, 2014, now U.S. Pat. No. 10,185,683, which claims priority to provisional patent application Ser. No. 61/917,610, filed Dec. 18, 2013.

The present application is related to U.S. Pat. No. 10,282,269, entitled "READ TECHNIQUE FOR A BUS INTERFACE SYSTEM;" U.S. patent application Ser. No. 14/659,355, filed Mar. 16, 2015, entitled "WRITE TECHNIQUE FOR A BUS INTERFACE SYSTEM;" U.S. patent application Ser. No. 14/659,371, filed Mar. 16, 2015, entitled "POWER MANAGEMENT SYSTEM FOR A BUS INTERFACE SYSTEM;" and U.S. Pat. No. 10,049,026, entitled "GROUP WRITE TECHNIQUE FOR A BUS INTERFACE SYSTEM."

All of the applications listed above are hereby incorporated herein by reference in their entireties.

FIELD OF THE DISCLOSURE

This disclosure relates generally to digital bus interfaces.

BACKGROUND

Digital bus interfaces are used to communicate data between components within an electronic device, such as a computer, a radio frequency (RF) front-end module, a cellular telephone, a tablet, a camera, and/or the like. The digital bus interface generally includes at least one master bus controller and one or more slave bus controllers. The master bus controller(s) and the slave bus controller(s) are connected by bus lines and the master bus controller coordinates the transfer of data along the bus lines. The slave bus controllers perform commands (e.g., read and write commands) as coordinated by the master bus controller. If more than one master bus controller is provided, a bus arbitration scheme is generally implemented to negotiate between the various master bus controllers. The bus lines that connect the master bus controller(s) to the slave bus controllers typically include one or more data, power, and clock bus lines. Generally, the size of the digital bus interface increases as more bus lines are provided in the digital bus interface. The increase is due to the number of wires which must be routed between the bus controllers and the number of pins for the bus controllers that must be dedicated to the bus lines. In modern communication systems, the area available for pins and wires is minimal.

Therefore, digital bus interface designs that utilize fewer bus lines are needed.

SUMMARY

The disclosure relates generally to a bus interface system and methods of operating the same. In one embodiment, the bus interface system includes a bus line, a master bus controller coupled to the bus line, and a slave bus controller coupled to the bus line. In order to start a data frame, the master bus controller is configured to generate a sequence of data pulses along the bus line such that the sequence of data pulses is provided in accordance to a start of sequence (SOS) pulse pattern. The sequence of data pulses includes a calibration data pulse. The slave bus controller includes a decoder configured to decode data pulses from the master bus controller. In addition, the slave bus controller is configured to recognize that the sequence of data transmitted along the bus line by the master bus controller has been provided in accordance with the SOS pulse pattern. In this manner, the slave bus controller can detect when the master bus controller has started a new data frame. The slave bus controller is further configured to calibrate the decoder in accordance with the calibration data pulse in response to recognizing that the sequence of data pulses has been provided in accordance with the SOS pulse pattern. As such, data frames can be synchronized along the bus line without requiring an additional bus line to send a clock signal.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
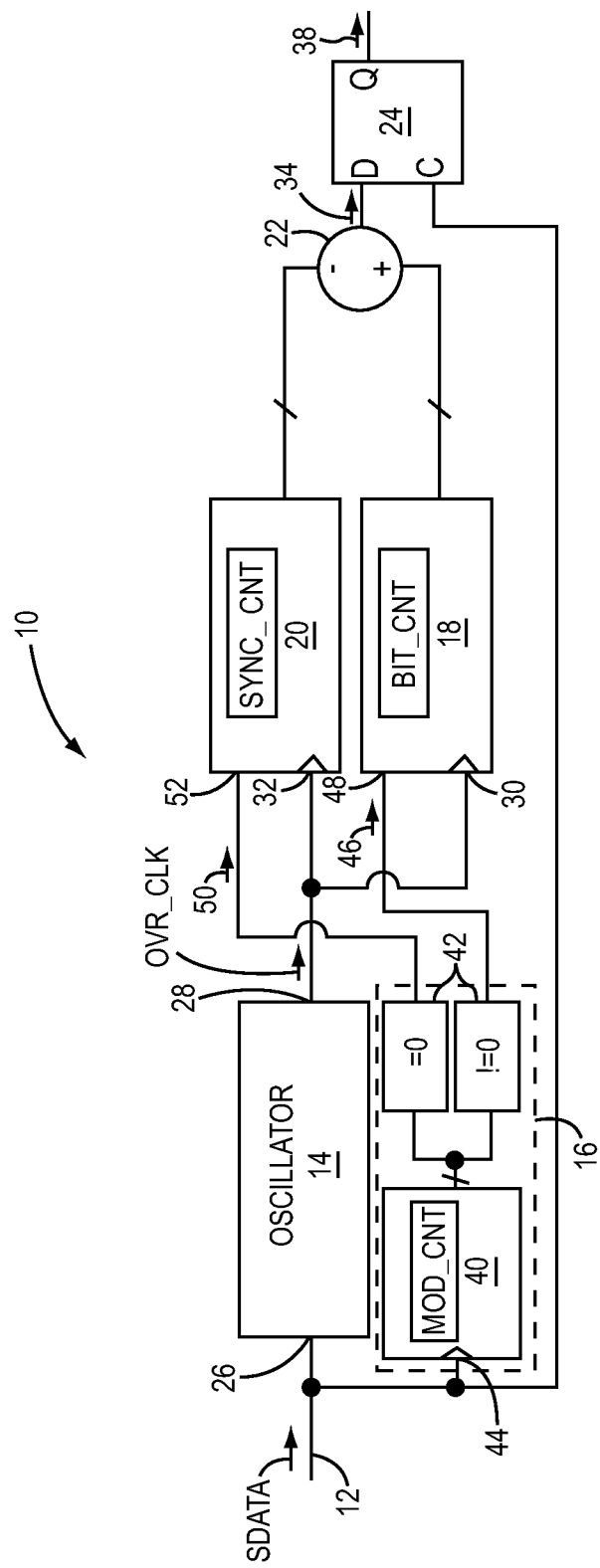
FIG. 1 illustrates one embodiment of a decoder, which may be provided in a bus controller of a bus interface system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims. With regard to the term "terminal," a terminal refers to any conductive feature in an electronic component for receiving signals, transmitting signals, and/or establishing a connection to another electronic component. For instance, a terminal may be one or more nodes, ports, conductive pads, pins, solder bumps, leads, pins, and/or the like.

When relative terminology, such as "approximately," "substantially," and the like are used in this disclosure, the relative terminology should be interpreted sensu lato but also in accordance to error tolerances dictated by performance parameters for a particular apparatus or method. These performance parameters may be described explicitly and/or implicitly by technical standard(s) relevant to an application that uses the particular apparatus or method to implement certain designed functions.

This disclosure relates generally to bus interface systems, components for bus interface systems and related methods of operating the same. Embodiments of a bus interface system may be a digital bus interface system and include various bus controllers connected by a bus line. For example, a bus interface system may include a master bus controller and a slave bus controller coupled by a bus line. Some embodiments of the bus interface system may be one wire bus interface systems where power, synchronization, payload information, and address information are all delivered to the slave bus controller on the bus line such that no other bus lines are provided between the master bus controller and the slave bus controller. More specifically, the master bus controller may be configured to generate an input data signal and transmit the input data signal on the bus line to the slave bus controller. The slave bus controller may include a decoder that extracts address information and payload information from the input data signal. As explained in further detail below, a bus protocol utilizing pulse width modulation (PWM) may be utilized where the decoder is clocked by the input data signal itself so that a separate clock signal does not have to be provided to the slave bus controller. Some embodiments of the slave bus controller may also include power conversion circuitry configured to convert the input data signal into a supply voltage. Accordingly, the slave bus controller may also be powered by the input data signal itself. In this manner, no other bus line has to be provided in the bus interface system in order to couple the master bus controller to the slave bus controller.

FIG. 1 illustrates one embodiment of a decoder 10, which may be provided in a bus controller of a bus interface system, such as a digital interface bus system. The decoder 10 is configured to receive an input data signal SDATA. The input data signal SDATA may be provided along a bus line 12 to the bus controller. The input data signal SDATA may define data pulses in order to represent data being transmitted along the bus line 12. For example, the input data signal SDATA may define data pulses such that logical values (e.g. bit values, logical symbols) are represented in accordance with a PWM bus protocol by the data pulses. More specifically, different logical values may be represented by a temporal duration of a data pulse during a time slot. As explained in further detail below, the PWM bus protocol also allows for the decoder 10 to be clocked by the input data signal SDATA itself, and thus an additional bus line does not have to be provided for a system clock signal in order to synchronize the decoder 10.

With regard to the input data signal SDATA, the data pulses defined by the input data signal SDATA are provided during time slots. More specifically, each of the data pulses may be provided during a different one of the time slots. The PWM bus protocol may organize the data pulses into data frames, where the data frame includes a certain number of the data pulses provided during a certain number of time slots. A temporal length of the time slots and thus of the data frame may be defined by the PWM bus protocol. For example, the PWM bus protocol may also allow for a bus address and a payload to be provided during certain time slots of the data frame. Also, an initial time slot of the data frame may be utilized to calibrate the decoder 10 as explained in further detail below. Accordingly, both the bus address and the payload can be provided by the input data signal SDATA so that additional address or data bus lines do not have to be provided. Furthermore, since the input data signal SDATA can also be used to calibrate the decoder 10, additional clock lines also do not have to be provided to synchronize the decoder 10. In this manner, a bus controller with the decoder 10, such as a slave bus controller, can extract both a bus address and a payload without requiring additional bus lines.

As shown in FIG. 1, the decoder includes an oscillator 14, counter enabling circuitry 16, a first counter 18, a second counter 20, a comparison circuit 22 and a sequential state element 24. The oscillator 14 is operable to receive the input data signal SDATA from the bus line 12. As mentioned above, each of the data pulses may be provided during a different one of the time slots. In other words, the data pulses provided by the input data signal SDATA may correspond injectively with the time slots.

In this embodiment, the oscillator 14 includes an enabling terminal 26 and is coupled to the bus line 12 so that the input data signal SDATA is received at the enabling terminal 26. In this manner, the oscillator 14 is configured to be enabled by the data pulses of the input data signal SDATA. In other words, the oscillator 14 is triggered by an activating edge of each of the data pulses of the input data signal SDATA. The oscillator 14 is configured to generate oscillation pulses while enabled. The oscillator 14 shown in FIG. 1 is operable to provide an oscillation signal OVR_CLK from an output terminal 28 of the oscillator 14. While enabled, the oscillator 14 is configured to provide the oscillation signal OVR_CLK so that the oscillation signal OVR_CLK defines the oscillation pulses. The oscillator 14 is then deactivated in response to an end of the data pulse. More specifically, the oscillator 14 is deactivated and does not generate oscillation pulses in response to a deactivation edge of each of the data pulses of the input data signal SDATA. While deactivated, the oscillation signal OVR_CLK does not provide the oscillation pulses and thus does not provide the oscillation signal OVR_CLK. The oscillation signal OVR_CLK is held in a deactivation state while the oscillator 14 is not enabled and deactivated. Since the oscillator 14 is enabled by the data pulses of the input data signal SDATA and deactivated when the data pulses of the input data signal SDATA are not provided, the decoder 10 is more power efficient. For instance, little to no current may be drawn by the oscillator 14 when deactivated as a result of the input data signal SDATA being between the data pulses. When the oscillator 14 is deactivated, the oscillator 14 does not generate the oscillation pulses, and thus little to no power may be consumed by the oscillator 14 while deactivated.

In accordance with the PWM bus protocol, a pulse rate of the oscillation signal OVR_CLK is significantly greater than a pulse rate of the data pulses of the input data signal SDATA. For example, the oscillator 14 is configured to generate the oscillation pulses when enabled at a pulse rate that is at least three times greater than a pulse rate of the data pulses. Thus, for a particular data pulse provided during a particular time slot, a temporal duration (i.e., a pulse width) of the particular data pulse in the input data signal SDATA can be determined by the number of oscillation pulses provided in the oscillation signal OVR_CLK during the particular time slot. The PWM bus protocol assigns different temporal durations (i.e., different pulse widths) to different logical values. In this manner, the decoder 10 can count the number of oscillation pulses provided in the oscillation signal OVR_CLK during the particular time slot and thereby determine the logical value being represented by the particular data pulse during that particular time slot, as explained in further detail below. Note that how much greater the pulse rate of the oscillation signal OVR_CLK is with respect to the pulse rate of the input data signal SDATA may depend on various factors such as a cardinality of the set of logical values that can be represented by each of the data pulses and an acceptable error rate in discriminating between the different logical values. For example, it is easier to discriminate what logical value a data pulse represents if a set of logical values that can be represented by the data pulse only includes a bit value of "1" and a bit value "0." Thus, the pulse rate of the oscillation signal OVR_CLK can be lower if desired in this case. It is more difficult to discriminate what logical value a particular data pulse represents if the set of logical values includes logical symbols, such as "0," "1," "2." However, the greater the cardinality of the set of logical values that can be represented by the data pulse, the greater the informational efficiency of the PWM bus protocol.

As shown in FIG. 1, both the first counter 18 and the second counter 20 are configured to receive the oscillation signal OVR_CLK from the oscillator 14. More specifically, the first counter 18 includes an input terminal 30 coupled to the output terminal 28 of the oscillator 14 so that the first counter 18 receives the oscillation signal OVR_CLK at the input terminal 30. The second counter 20 includes an input terminal 32 coupled to the output terminal 28 of the oscillator 14 so that the second counter 20 receives the oscillation signal OVR_CLK at the input terminal 32. The first counter 18 and the second counter 20 are each enabled and disabled by the counter enabling circuitry 16.

The first counter 18 is operable to store a first count parameter BIT_CNT. While the first counter 18 is enabled by the counter enabling circuitry 16, the first counter 18 is configured to increment the first count parameter BIT_CNT in response to each of the oscillation pulses provided by the oscillation signal OVR_CLK. When the first counter 18 is disabled by the counter enabling circuitry, the first counter 18 holds the first count parameter BIT_CNT at its current value. The second counter 20 is operable to store the reference parameter SYNC_CNT. While the second counter 20 is enabled by the counter enabling circuitry 16, the second counter 20 is configured to increment the reference parameter SYNC_CNT in response to each of the oscillation pulses provided by the oscillation signal OVR_CLK. When the second counter 20 is disabled by the counter enabling circuitry 16, the second counter 20 holds the reference parameter SYNC_CNT at its current value.

The input data signal SDATA may be formatted in accordance with the PWM bus protocol so that the data pulses defined by the input data signal SDATA during the time slots are organized into data frames. For each data frame, an initial time slot may be a calibration time slot. The data pulse provided during the calibration time slot is a calibration pulse, which may be provided by a bus controller (e.g., a master bus controller as explained in further detail below) with a precise pulse duration. For example, a duty cycle of the calibration pulse may be approximately 50% with respect to the calibration time slot and thus be provided during half of the calibration time slot. The oscillator 14 is configured to be enabled by the calibration data pulse. As explained in further detail below, the counter enabling circuitry 16 is configured to disable the first counter 18 and enable the second counter 20 during the calibration time slot of the data frame. Also, the second counter 20 may have reset the reference parameter SYNC_CNT to an initial value (e.g., such as zero) prior to an activation edge of the calibration pulse. Thus, during the calibration time slot of each of the data frames, the second counter 20 is configured to count the oscillation pulses defined by the oscillation signal OVR_CLK. In this manner, the reference parameter SYNC_CNT indicates a reference number, and the reference number is based on how many of the oscillation pulses were generated by the oscillator 14 during the calibration time slot as a result of the calibration pulse. In this example, the reference number is equal to how many of the oscillation pulses were generated by the oscillator 14 during the calibration time slot. This reference number is used to determine logical values of a remainder of the data pulses provided in the data frame. By making the decoder 10 responsive to the calibration pulse as described above, the decoder 10 can be synchronized and calibrated by the input data signal SDATA itself without having to receive an external clock signal on another bus line. It should be noted that in other embodiments, the calibration time slot may be greater than the other time slots in the data frame. Thus, in these cases, the reference number may be equal to some fraction of the number of oscillation pulses that were generated by the oscillator during the calibration time slot. In this case, the second counter 20 may be configured to be incremented after a certain number of the oscillation pulses or may include division circuitry that divides the reference parameter SYNC_CNT by the appropriate integer after the calibration pulse so that the reference parameter SYNC_CNT is stored after the calibration time pulse to equal the appropriate fraction of the number of oscillation pulses that were generated by the oscillator during the calibration time slot.

In accordance with the PWM bus protocol, the remainder of the data pulses provided in the other time slots of the data frame may represent a bus address, a payload, and/or the like. To recover the logical value represented by a data pulse during a time slot, the first counter 18 is configured to count the oscillation pulses such that the first count parameter BIT_CNT indicates a number of the oscillation pulses generated during the time slot. More specifically, after the calibration time slot, the counter enabling circuitry 16 is configured to disable the second counter 20 and enable the first counter 18 in response to the data pulse defined by the input data signal SDATA during the time slot. Thus, for the remainder of the time slots in the data frame, the second counter 20 holds the reference parameter SYNC_CNT indicating the reference number, which is how many of the oscillation pulses were generated by the oscillator during the calibration time slot as a result of the calibration pulse.

The first counter 18 is configured to reset the first count parameter BIT_CNT to an initial value (e.g., zero) in response to the activation edge of the data pulse. In response to the data pulse defined by the input data signal SDATA during the time slot, the oscillator 14 is configured to be enabled by the data pulse of the input data signal SDATA and generate oscillation pulses while enabled. The first counter 18 (which has been enabled by the counter enabling circuitry 16) is configured to increment the first count parameter BIT_CNT in response to the oscillation pulses from the oscillator 14. Thus, for each of the data pulses provided after the calibration time slot, the first counter 18 is configured to count the oscillation pulses defined by the oscillation signal OVR_CLK such that the first count parameter BIT_CNT indicates a number of the oscillation pulses generated during the time slot. The oscillation pulses defined by the oscillation signal OVR_CLK were generated as a result of the data pulse of the input data signal SDATA. In this manner, the first count parameter BIT_CNT indicates how many of the oscillation pulses were generated during the time slot during the data pulse of the input data signal SDATA.

To determine the logical value of the data pulse from the first count parameter BIT_CNT, the comparison circuit 22 is configured to compare the first count parameter BIT_CNT with the reference parameter SYNC_CNT. As explained above, the reference parameter SYNC_CNT indicates the reference number, which is a count of the oscillation pulses that were generated by the oscillator 14 during the calibration time slot as a result of the calibration pulse at the beginning of the data frame. The PWM bus protocol may define a set of logical values that may be represented by each of the data pulses provided during the time slots of the data frame after the calibration time slot. The comparison circuit 22 is configured to generate a data output 34 such that the data output 34 represents a first logical value in response to the first count parameter BIT_CNT being greater than the reference parameter SYNC_CNT and such that the data output 34 represents a second logical value in response to the first count parameter BIT_CNT being less than the reference parameter SYNC_CNT.

For a bit scheme, the set of logical values may be the set of bit values [0, 1]. In the embodiment shown in FIG. 1, the comparison circuit 22 is configured to the data output 34 as a data output signal such that the data output signal represents an output bit. The output bit is a first bit value (e.g., bit value of 1 in the set of bit values [0, 1]) if the first count parameter BIT_CNT is greater than the reference parameter SYNC_CNT. For example, in this case, the data pulse defined during the time slot by the data pulse of the input data signal SDATA had a temporal duration that was longer than a temporal duration of the calibration pulse defined by the data pulse of the input data signal SDATA during the calibration time slot. As a result, the number of oscillation pulses provided by the oscillation signal OVR_CLK during this time slot is greater than the number of oscillation pulses provided during the calibration time slot. Thus, the comparison circuit 22 will determine that the first count parameter BIT_CNT is greater than the reference parameter SYNC_CNT and generate the data output 34 such that the data output 34 represents the first bit value (e.g., the bit value 1).

The output bit is a second bit value (e.g., bit value of 0 in the set of bit values [0, 1]) if the first count parameter BIT_CNT is less than the reference parameter SYNC_CNT. In this case, the data pulse defined during the time slot by the data pulse of the input data signal SDATA had a temporal duration that was shorter than a temporal duration of the calibration pulse defined by the data pulse of the input data signal SDATA during the calibration time slot. As a result, the number of oscillation pulses provided by the oscillation signal OVR_CLK during this time slot is less than the number of oscillation pulses provided during the calibration time slot. Thus, the comparison circuit 22 will determine that the first count parameter BIT_CNT is less than the reference parameter SYNC_CNT and generate the data output 34 such that the data output 34 represents the second bit value (e.g., the bit value 0).

The sequential state element 24 is configured to receive the data output 34 and store the output bit represented by the data output 34, which in this example is provided by a data output signal. In this example, the sequential state element 24 is a flip-flop that has a data input terminal D, a clock terminal C, and a data output terminal Q. The data output 34 (e.g., the data output signal) is received by the sequential state element 24 at the data input terminal D. The input data signal SDATA is received at the clock terminal C and thus is used to clock the sequential state element 24. A memory input signal 38 is generated at the data output terminal Q so that the bit value stored by the sequential state element 24 is provided to memory outside of the decoder 10. As explained below, in other embodiments, the set of logical values that can be represented by the data pulses may be logical symbols. In this case, the data output 34 may have multiple data output signals in order to represent multiple bits. Thus, additional sequential state elements (not explicitly shown) may be provided to store the various bits.

As shown in FIG. 1, the comparison circuit 22 is provided as a subtractor that is configured to compare the first count parameter BIT_CNT with the reference parameter SYNC_CNT by subtracting the first count parameter BIT_CNT and the reference parameter SYNC_CNT. In this embodiment, the comparison circuit 22 is configured to subtract the first count parameter BIT_CNT from the reference parameter SYNC_CNT to determine a difference between the first count parameter BIT_CNT and the reference parameter SYNC_CNT. If the difference is positive, the comparison circuit 22 circuit generates the data output 34 to represent the first bit value (e.g., the bit value 1). If the difference is negative, the comparison circuit 22 circuit generates the data output 34 to represent the second bit value (e.g., the bit value 0).

As mentioned above, the counter enabling circuitry 16 is configured to enable the second counter 20 and disable the first counter 18 during a calibration time slot of the data frame and enable the first counter 18 and disable the second counter 20 during time slots of the data frame after the calibration time slot. To do this, the counter enabling circuitry 16 shown in FIG. 1 includes a modulo counter 40 and a logical network 42. The modulo counter 40 is operable to store a modulo count parameter MOD_CNT and receive the input data signal SDATA at an input terminal 44. The modulo counter 40 is configured to increment the modulo count parameter MOD_CNT in response to each of the data pulses defined by input data signal SDATA, including the calibration pulse and the other data pulses defined during the time slots of a data frame.

Since the modulo counter 40 is modulo, the modulo count parameter MOD_CNT wraps around to cycle through an initial value to a final value and back to the initial value to cycle through the values again. The cycle can be set in accordance with the number of time slots provided in each data frame. For example, if the number of time slots in each data frame is an integer N and the initial value is zero (0), then the modulo counter 40 can be configured to cycle the modulo count parameter MOD_CNT between the initial value of zero (0) and the final value of N−1. Accordingly, the initial value (e.g., zero (0)) can be used to indicate the initial time slot of a data frame, which in this embodiment is the calibration time slot that has the calibration pulse. Any other one of the values in the cycle is for time slots after the calibration time slot. The final value of N−1 indicates that the last time slot in the data frame has been reached. If the modulo count parameter MOD_CNT is incremented again after reaching the final value of N−1, the modulo count parameter MOD_CNT wraps back around to the initial value of zero (0) and thereby indicates the calibration time slot for the next data frame. The initial value of zero (0) is thus a calibration number that indicates the calibration time slot of the data frame. In this manner, the counter enabling circuitry 16 allows the decoder 10 to be synchronized with the various data frames provided with the input data signal SDATA.

The logical network 42 is configured to disable the first counter 18 and enable the second counter 20 such that the second counter 20 counts the oscillation pulses if the modulo count parameter MOD_CNT is equal to a calibration number (e.g. zero (0)). In this example, the logical network 42 is configured to generate an enabling signal 46 received at an enabling terminal 48 of the first counter 18 and generate an enabling signal 50 receive at an enabling terminal 52 of the second counter 20. The logical network 42 generates the enabling signal 46 in a deactivation state, and the enabling signal 50 in an activation state if the modulo count parameter MOD_CNT is equal to a calibration number (e.g. zero (0)). As such, the first counter 18 is disabled and the second counter is enabled during the calibration time slot. However, the logical network 42 is configured to enable the first counter 18 and disable the second counter 20 such that the first counter 18 counts the oscillation pulses if the modulo count parameter MOD_CNT is not equal to the calibration number. Thus, the logical network 42 shown in FIG. 1 generates the enabling signal 46 in the activation state and the enabling signal 50 in the deactivation state when the modulo count parameter MOD_CNT is equal to any value from 1 to N−1. As such, the first counter 18 is enabled and the second counter is disabled during the time slots that are provided after the calibration time slot.

Figure 2:
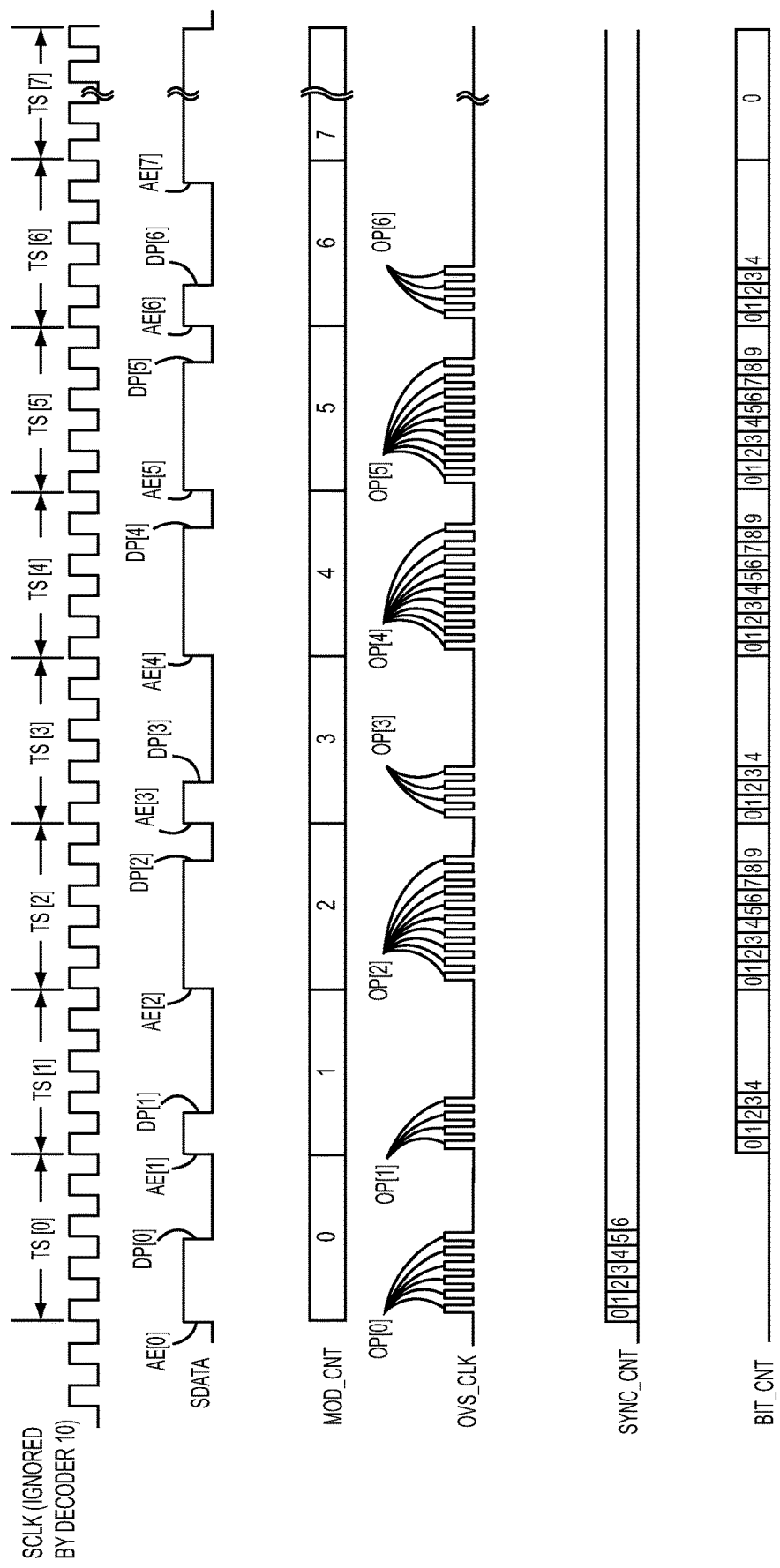
FIG. 2 illustrates a timing diagram for the decoder shown in FIG. 1 during an exemplary data frame provided in accordance to a one wire PWM bus protocol.

Referring now to FIG. 1 and FIG. 2, FIG. 2 illustrates a timing diagram for the decoder 10 shown in FIG. 1 during an exemplary data frame provided in accordance to a one wire PWM bus protocol. As shown in FIG. 2, the data frame in this example has eight time slots (referred to generally and generically as elements TS and specifically as elements TS[0]-TS[7]). The timing diagram shown in FIG. 2 illustrates signal levels and parameter values for embodiments of a system clock signal SCLK, the input data signal SDATA, the modulo count parameter MOD_CNT, the oscillator signal OVS_CLK, the reference parameter SYNC_CNT, and the first count parameter BIT_CNT as a function of time during the time slots of the data frame. The system clock signal SCLK is ignored by the decoder 10 and is not provided at all to the decoder 10 shown in FIG. 1. However, the system clock signal SCLK may be utilized by outside circuitry (such as a master bus controller) to generate the input data signal SDATA, as explained in further detail below. The system clock signal SCLK is being shown here to help clarify the timing diagram with respect to system timing despite the decoder 10 not utilizing the system clock signal SCLK. As shown in FIG. 2, a time duration of each of the time slots TS is approximately equal to four clock cycles.

The input data signal SDATA provided to the decoder 10 defines data pulses (referred to generally or generically as elements DP and specifically as elements DP[0] to DP[6]) during each of the time slots TS[1]-TS[6]. More specifically, a data pulse DP[0] is defined by the input data signal SDATA during a time slot TS[0]. This is the initial time slot, which is a calibration time slot. Thus, the data pulse DP[0] is a calibration data pulse. A duty cycle of the data pulse DP[0] is 50%, and thus the data pulse DP[0] is provided for half the time slot TS[0] and has a temporal duration equal to two clock cycles of the system clock signal SCLK. The PWM bus protocol in this example uses one of the time slots to communicate a one-bit command. A data pulse DP[1] is defined by the input data signal SDATA during a time slot TS[1]. The time slot TS[1] is a command time slot and the data pulse DP[1] represents a command bit. A duty cycle of the data pulse DP[1] is 25%, and thus the data pulse DP[1] is provided for one quarter of the time slot TS[1] and has a temporal duration equal to one clock cycle of the system clock signal SCLK.

The PWM bus protocol in this example uses two of the time slots to communicate a two-bit bus address. A data pulse DP[2] is defined by the input data signal SDATA during a time slot TS[2]. The time slot TS[2] is a bus address time slot, and the data pulse DP[2] represents an address bit for a bus address. A duty cycle of the data pulse DP[2] is 75%, and thus the data pulse DP[2] is provided for 3 quarters of the time slot TS[2] and has a temporal duration equal to three clock cycles of the system clock signal SCLK. A data pulse DP[3] is defined by the input data signal SDATA during a time slot TS[3]. The time slot TS[3] is also an address time slot, and the data pulse DP[3] represents another address bit for the bus address. A duty cycle of the data pulse DP[3] is 25% and thus the data pulse DP[3] is provided for one quarter of the time slot TS[3] and has a temporal duration equal to one clock cycle of the system clock signal SCLK.

The PWM bus protocol in this example uses three of the time slots TS to communicate a three-bit payload. A data pulse DP[4] is defined by the input data signal SDATA during a time slot TS[4]. The time slot TS[4] is a payload time slot, and the data pulse DP[4] represents a first data bit for the three-bit data payload. A duty cycle of the data pulse DP[4] is 75%, and thus the data pulse DP[4] is provided for 3 quarters of the time slot TS[4] and has a temporal duration equal to three clock cycles of the system clock signal SCLK. A data pulse DP[5] is defined by the input data signal SDATA during a time slot TS[5]. The time slot TS[5] is another payload time slot, and the data pulse DP[5] represents a second data bit for the three-bit data payload. A duty cycle of the data pulse DP[5] is 75%, and thus the data pulse DP[5] is provided for 3 quarters of the time slot TS[5] and has a temporal duration equal to three clock cycles of the system clock signal SCLK. A data pulse DP[6] is defined by the input data signal SDATA during a time slot TS[6]. The time slot TS[6] is yet another payload time slot, and the data pulse DP[6] represents a third data bit for the three-bit data payload. A duty cycle of the data pulse DP[6] is 25%, and thus the data pulse DP[6] is provided for a quarter of the time slot TS[6] and has a temporal duration equal to one clock cycle of the system clock signal SCLK. A time slot TS[7] is a set up time slot for the next data frame. During the time slot TS[7], the input data signal SDATA is held high. The time slot TS[7] may extend for any period of time, and thus may be longer than the time slots TS[1]-TS[6].

As shown in FIG. 2, the modulo count parameter MOD_CNT is provided to equal the calibration number of zero (0) during the time slot TS[0], which is the calibration time slot. The counter enabling circuitry 16 is thus configured to enable the second counter 20 and disable the first counter 18. The oscillator 14 is configured to be enabled by the data pulse DP[0], which is the calibration pulse provided during the calibration time slot (i.e., TS[0]). The reference parameter SYNC_CNT of the second counter 20 may have been reset to an initial value of zero (0) prior to an activation edge AE[0] of the data pulse DP[0]. The second counter 20 is configured to count the oscillation pulses OP[0] defined by the oscillation signal OVR_CLK during the time slot TS[0] as a result of the data pulse DP[0] (the calibration pulse). More specifically, the second counter 20 is configured to increment the reference parameter SYNC_CNT as a result of each of the oscillation pulses OP[0] defined by the oscillation signal OVR_CLK during the time slot TS[0]. In this example, the reference parameter SYNC_CNT is set equal to a reference number of six (6) as a result of the six oscillation pulses OP[0] generated as a result of the data pulse DP[0] during the time slot TS[0]. As a result of the end of the data pulse DP[0], no more of the oscillation pulses OP[0] are generated, and the oscillation signal OVS_CLK is held in a deactive state for a remainder of the time slot TS[0]. Accordingly, the reference parameter SYNC_CNT indicates the reference number of six (6), which is how many of the oscillation pulses OP[0] were generated by the oscillator 14 during the time slot TS[0] (i.e., the calibration time slot) as a result of the data pulse DP[0] (i.e., the calibration pulse).

The modulo count parameter MOD_CNT is provided to equal the number of one (1) during the time slot TS[1], which is the command time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[1], which is the command time slot. The first counter 18 may be configured to reset the first count parameter BIT_CNT to an initial value of zero (0) in response to an activation edge AE[1] of the data pulse DP[1]. The first counter 18 is configured to count the oscillation pulses OP[1] defined by the oscillation signal OVR_CLK during the time slot TS[1] as a result of the data pulse DP[1] (the command pulse), which had a 25% duty cycle.

More specifically, the first counter 18 is configured to increment the first count parameter BIT_CNT as a result of each of the oscillation pulses OP[1] defined by the oscillation signal OVR_CLK during the time slot TS[1]. In this example, the first count parameter BIT_CNT is set equal to a number of four (4) as a result of the four oscillation pulses OP[1] generated as a result of the data pulse DP[1] during the time slot TS[1]. As a result of the end of the data pulse DP[1], no more of the oscillation pulses OP[1] are generated and the oscillation signal OVS_CLK is held in a deactive state for a remainder of the time slot TS[1]. Accordingly, the first count parameter BIT_CNT indicates a number of four (4), which is how many of the oscillation pulses OP[1] were generated by the oscillator 14 during the time slot TS[1] (i.e., the command time slot) as a result of the data pulse DP[1] (i.e., a command pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The command bit has thus been recovered in this case to equal the bit value of 0, which may indicate a write command. If the command bit had been a bit value of 1, this may have indicated a read command.

The modulo count parameter MOD_CNT is provided to equal the number of two (2) during the time slot TS[2], which is a first address time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[2], which is a first address time slot. The first counter 18 may be configured to reset the first count parameter BIT_CNT to an initial value of zero (0) in response to an activation edge AE[2] of the data pulse DP[2]. The first counter 18 is configured to count the oscillation pulses OP[2] defined by the oscillation signal OVR_CLK during the time slot TS[2] as a result of the data pulse DP[2] (i.e., a first address pulse), which has a 75% duty cycle.

More specifically, the first counter 18 is configured to increment the first count parameter BIT_CNT as a result of each of the oscillation pulses OP[2] defined by the oscillation signal OVR_CLK during the time slot TS[2]. In this example, the first count parameter BIT_CNT is set equal to a number of nine (9) as a result of the nine oscillation pulses OP[2] generated as a result of the data pulse DP[2] during the time slot TS[2]. As a result of the end of the data pulse DP[2], no more of the oscillation pulses OP[2] are generated, and the oscillation signal OVS_CLK is held in a deactive state for a remainder of the time slot TS[2]. Accordingly, the first count parameter BIT_CNT indicates a number of nine (9), which is how many of the oscillation pulses OP[2] were generated by the oscillator 14 during the time slot TS[2] (i.e., the first address time slot) as a result of the data pulse DP[2] (i.e., the first address pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The first address bit has thus been recovered in this case to equal a bit value of 1.

The modulo count parameter MOD_CNT is provided to equal the number of three (3) during the time slot TS[3], which is a second address time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[3], which is a second address time slot. The first counter 18 may be configured to reset the first count parameter BIT_CNT to an initial value of zero (0) in response to an activation edge AE[3] of the data pulse DP[3]. The first counter 18 is configured to count the oscillation pulses OP[3] defined by the oscillation signal OVR_CLK during the time slot TS[3] as a result of the data pulse DP[3] (i.e., a second address pulse), which has a 25% duty cycle.

More specifically, the first counter 18 is configured to increment the first count parameter BIT_CNT as a result of each of the oscillation pulses OP[3] defined by the oscillation signal OVR_CLK during the time slot TS[3]. In this example, the first count parameter BIT_CNT is set equal to a number of four (4) as a result of the four oscillation pulses OP[3] generated as a result of the data pulse DP[3] during the time slot TS[3]. As a result of the end of the data pulse DP[3], no more of the oscillation pulses OP[3] are generated, and the oscillation signal OVS_CLK is held in a deactive state for a remainder of the time slot TS[3]. Accordingly, the first count parameter BIT_CNT indicates a number of four (4), which is how many of the oscillation pulses OP[3] were generated by the oscillator 14 during the time slot TS[3] (i.e., the second address time slot) as a result of the data pulse DP[3] (i.e., the second address pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The second address bit has thus been recovered in this case to equal a bit value of 0.

The modulo count parameter MOD_CNT is provided to equal a number of four (4) during the time slot TS[4], which is a first payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[4], which is the first payload time slot. The first counter 18 may be configured to reset the first count parameter BIT_CNT to an initial value of zero (0) in response to an activation edge AE[4] of the data pulse DP[4]. The first counter 18 is configured to count the oscillation pulses OP[4] defined by the oscillation signal OVR_CLK during the time slot TS[4] as a result of the data pulse DP[4] (i.e., a first payload pulse), which has a 75% duty cycle.

More specifically, the first counter 18 is configured to increment the first count parameter BIT_CNT as a result of each of the oscillation pulses OP[4] defined by the oscillation signal OVR_CLK during the time slot TS[4]. In this example, the first count parameter BIT_CNT is set equal to a number of nine (9) as a result of the nine oscillation pulses OP[4] generated as a result of the data pulse DP[4] during the time slot TS[4]. As a result of the end of the data pulse DP[4], no more of the oscillation pulses OP[4] are generated, and the oscillation signal OVS_CLK is held in a deactive state for a remainder of the time slot TS[4]. Accordingly, the first count parameter BIT_CNT indicates a number of nine (9), which is how many of the oscillation pulses OP[4] were generated by the oscillator 14 during the time slot TS[4] (i.e., the first payload time slot) as a result of the data pulse DP[4] (i.e., the first payload pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The first payload bit has thus been recovered in this case to equal a bit value of 1.

The modulo count parameter MOD_CNT is provided to equal the number of five (5) during the time slot TS[5], which is a second payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[5], which is the second payload time slot. The first counter 18 may be configured to reset the first count parameter BIT_CNT to an initial value of zero (0) in response to an activation edge AE[5] of the data pulse DP[5]. The first counter 18 is configured to count the oscillation pulses OP[5] defined by the oscillation signal OVR_CLK during the time slot TS[5] as a result of the data pulse DP[5] (i.e., a second payload pulse), which has a 75% duty cycle.

More specifically, the first counter 18 is configured to increment the first count parameter BIT_CNT as a result of each of the oscillation pulses OP[5] defined by the oscillation signal OVR_CLK during the time slot TS[5]. In this example, the first count parameter BIT_CNT is set equal to a number of nine (9) as a result of the nine oscillation pulses OP[5] generated as a result of the data pulse DP[5] during the time slot TS[5]. As a result of the end of the data pulse DP[5], no more of the oscillation pulses OP[5] are generated, and the oscillation signal OVS_CLK is held in a deactive state for a remainder of the time slot TS[5]. Accordingly, the first count parameter BIT_CNT indicates a number of nine (9), which is how many of the oscillation pulses OP[5] were generated by the oscillator 14 during the time slot TS[5] (i.e., the second payload time slot) as a result of the data pulse DP[5] (i.e., the second payload pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The second payload bit has thus been recovered in this case to equal a bit value of 1.

Also, the modulo count parameter MOD_CNT is provided to equal a number of six (6) during the time slot TS[6], which is a third payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[6], which is the third payload time slot. The first counter 18 may be configured to reset the first count parameter BIT_CNT to an initial value of zero (0) in response to an activation edge AE[6] of the data pulse DP[6]. The first counter 18 is configured to count the oscillation pulses OP[6] defined by the oscillation signal OVR_CLK during the time slot TS[6] as a result of the data pulse DP[6] (i.e., a third payload pulse), which has a 25% duty cycle.

More specifically, the first counter 18 is configured to increment the first count parameter BIT_CNT as a result of each of the oscillation pulses OP[6] defined by the oscillation signal OVR_CLK during the time slot TS[6]. In this example, the first count parameter BIT_CNT is set equal to a number of four (4) as a result of the four oscillation pulses OP[6] generated as a result of the data pulse DP[6] during the time slot TS[6]. As a result of the end of the data pulse DP[6], no more of the oscillation pulses OP[6] are generated, and the oscillation signal OVS_CLK is held in a deactive state for a remainder of the time slot TS[6]. Accordingly, the first count parameter BIT_CNT indicates a number of four (4), which is how many of the oscillation pulses OP[6] were generated by the oscillator 14 during the time slot TS[6] (i.e., the third payload time slot) as a result of the data pulse DP[6] (i.e., the third payload pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The third payload bit has thus been recovered in this case to equal a bit value of 0. Note that in this embodiment, the data pulses DP and oscillation pulses (referred to generally or generically as elements OP) are positive pulses. Other embodiments of the decoder 10 may be provided to operate with the data pulses DP and/or the oscillation pulses OP being negative pulses. For example, in another embodiment, the data pulses DP are negative pulses, while the oscillation pulses OP are positive pulses.

Finally, the modulo count parameter MOD_CNT is provided to equal the number of seven (7) during the time slot TS[7], which is the setup time slot. The time slot TS[7] does not include a data pulse. Rather, the input data signal SDATA is held in the activation state during the entire time slot TS[7]. The counter enabling circuitry 16 is configured to deactivate the oscillator 14 so that the oscillator does not generate the oscillation pulses OP when the modulo count parameter MOD_CNT is equal to 7 during the time slot TS[7]. Thus, oscillation pulses OP are not generated during the time slot TS[7]. The first counter 18 may be configured to reset the first count parameter BIT_CNT to an initial value of zero (0) in response to an activation edge AE[7] of input data signal SDATA during the time slot TS[7]. Similarly, the second counter 20 may be configured to reset the reference parameter SYNC_CNT to an initial value of zero (0) in response to an activation edge AE[7] of input data signal SDATA during the time slot TS[7]. In this manner, the decoder 10 is set up for the next data frame. The time slot TS[7] could extend for any period of time until the next data frame is ready to be communicated.

In the example described above in FIG. 2, the time slot D[0] has the same temporal duration as the time slots D[1]-D[6]. However, in other embodiments, the time slot D[0] (i.e., the calibration time slot) may be greater than the temporal duration of the time slots D[1]-D[6]. For example, the time slot D[0] may be four times as long as the temporal duration of the time slots D[1]-D[6]. Thus, in this case, the reference number may be equal to a quarter of the number of oscillation pulses OP[0] that were generated by the oscillator 14 during the calibration time slot. The second counter 20 may be configured to divide the reference parameter SYNC_CNT by four to equal the reference number of a quarter of the number of the oscillation pulses OP[0] that were generated by the oscillator 14 during the time slot D[0] (i.e., the calibration time slot).

Figure 3:
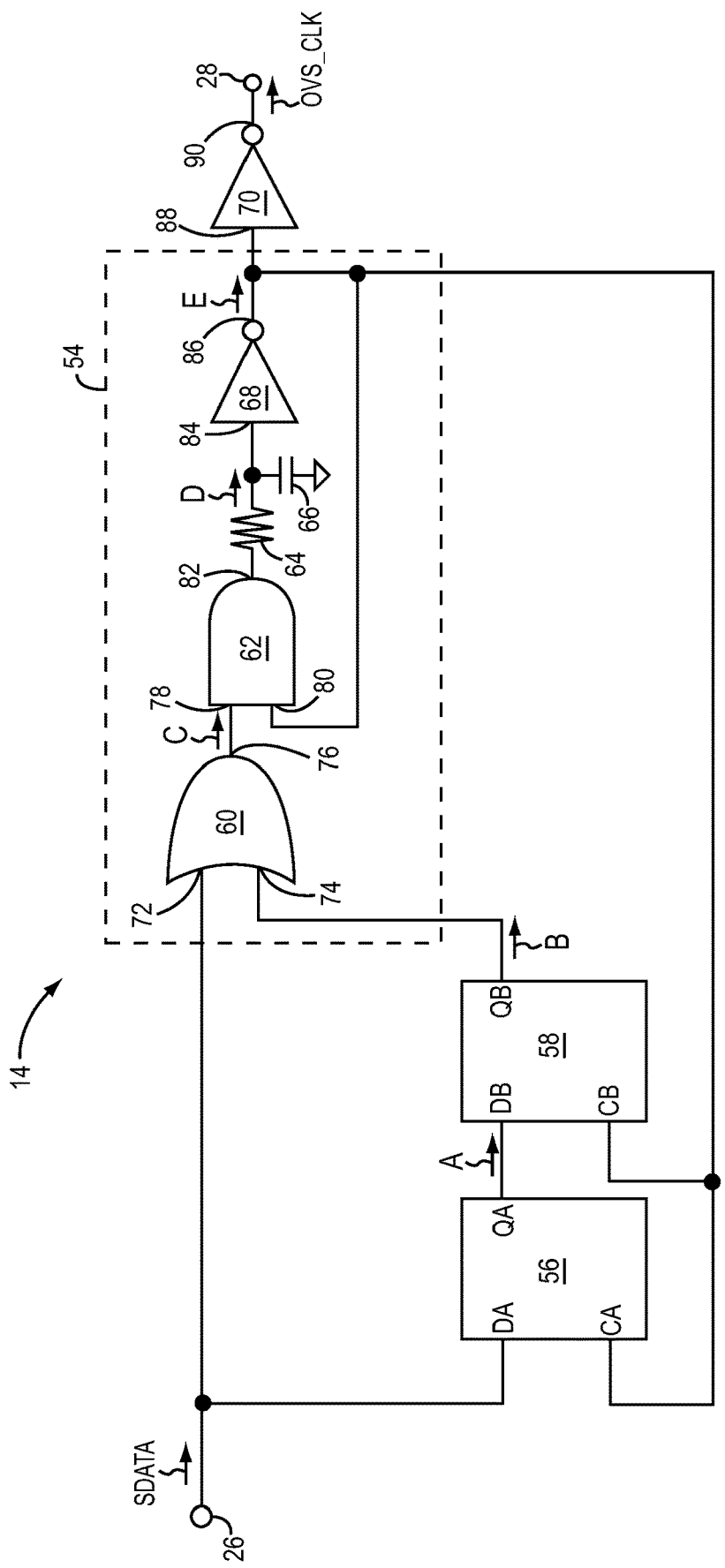
FIG. 3 illustrates one embodiment of an oscillator provided within the decoder shown in FIG. 1.

FIG. 3 illustrates one embodiment of the oscillator 14 provided within the decoder 10 shown in FIG. 1. The oscillator 14 includes a ring oscillator 54, a flip-flop 56, and a flip-flop 58. The ring oscillator 54 includes an OR gate 60, an AND gate 62, a resistor 64, a capacitor 66, and an inverter gate 68. An inverter gate 70 is connected to the inverter gate 68 of the ring oscillator 54. The input data signal SDATA is received at the enabling terminal 26. The oscillator 14 provides an asynchronous turn on and a synchronous turn off. An asynchronous turn on is acceptable because the normal state of this oscillator 14 is off. A synchronous turn off is used because data pulse edges on SDATA do not have a guaranteed phase.

The flip-flops 56, 58 are coupled sequentially with one another such that the flip-flops 56, 58 are configured to receive the input data signal SDATA and generate a delayed data signal B. More specifically, the flip-flop 56 includes a data terminal DA coupled to receive the data input signal SDATA, an output terminal QA, and a clock terminal CA. The flip-flop 58 includes a data terminal DB coupled to the output terminal QA, an output terminal QB, and a clock terminal CB. Flip-flop 56 generates a delayed data signal A from the data input signal SDATA, which is received by the flip-flop 58 at the data terminal DB. In response, the flip-flop 58 generates the delayed data signal B from the output terminal QB. In other embodiments, more flip-flops are provided in sequence with the flip-flops 56, 58 to provide an appropriate delay. The clock terminals CA, CB of the flip-flops 56, 58 are coupled to the ring oscillator 54 such that each of the flip-flops 56, 58 is clocked by the ring oscillator 54.

The OR gate 60 has an input terminal 72 coupled to receive the input data signal SDATA, an input terminal 74 coupled to the output terminal QB of the flip-flop 58, and an output terminal 76. The flip-flops 56, 58 are thus coupled to provide the delayed data signal B to the input terminal 74 of the OR gate 60. The OR gate 60 performs an OR operation on the input data signal SDATA and the delayed data signal B to generate an oscillator enable signal C at the output terminal 76.

The AND gate 62 has an input terminal 78 coupled to the output terminal 76 so as to receive the oscillator enable signal C, an input terminal 80 coupled to the ring oscillator 54, and an output terminal 82. The AND gate 62 thus gates the ring oscillator 54 and provides a feedback oscillator signal D from the output terminal 82. The resistor 64 and the capacitor 66 are used to provide a time constant for the ring oscillator 54. The feedback oscillator signal D is generated in accordance with the time constant set by the resistor 64 and capacitor 66 respectively. The inverter gate 68 has an input terminal 84 that receives the feedback oscillator signal D. The inverter gate 68 is an initial stage of the ring oscillator 54. The inverter gate 68 is configured to invert the feedback oscillator signal D and generate an intermediate oscillator signal E from an output terminal 86. The intermediate oscillator signal E is fed back to the input terminal 80 of the AND gate 62 and is provided to the clock terminals CA, CB to clock the flip-flops 56, 58. The AND gate 62 thus perform an AND operation on the intermediate oscillator signal E and the oscillator enable signal C to generate the feedback oscillator signal D. The intermediate oscillator signal E is provided to an input terminal 88 of the inverter gate 70. The inverter gate 70 is a buffer of the ring oscillator 54. The inverter gate 70 is configured to generate the oscillator signal OVS_CLK from an output terminal 90 of the inverter gate 70. The oscillator signal OVS_CLK is then output from the output terminal 28.

Figure 4:
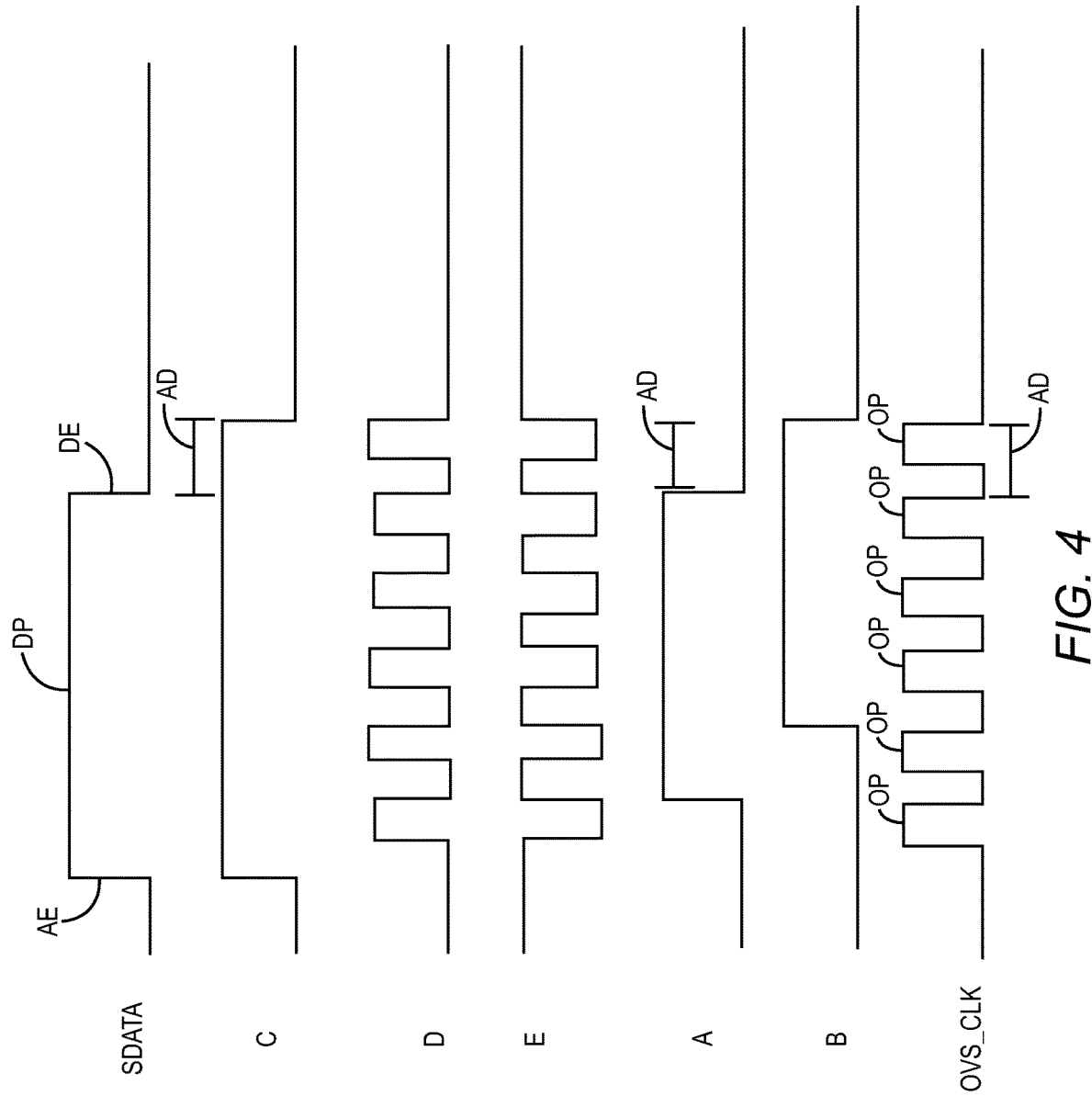
FIG. 4 illustrates an exemplary timing diagram for the oscillator shown in FIG. 3.

Referring now to FIG. 3 and FIG. 4, FIG. 4 illustrates an exemplary timing diagram for the oscillator 14 shown in FIG. 3. The operation of the oscillator 14 is demonstrated for the data pulse DP defined by the input data signal SDATA. Initially, when the input data signal SDATA is low, the capacitor 66 is discharged, and the feedback oscillator signal D is low while the intermediate oscillator signal E is high. At an activation edge AE of the data pulse DP and throughout the data pulse DP, the input terminal 72 of the OR gate 60 rises, and thus the oscillator enable signal C is provided in an activation state. Eventually the capacitor 66 charges enough so that the feedback oscillator signal D also is provided in an activation state. In response, the intermediate oscillator signal E goes low. As such, the capacitor 66 begins to discharge, and eventually the inverter gate 68 provides the intermediate oscillator signal E high. The inverter gate 70 then inverts the intermediate oscillator signal E to generate the oscillator signal OVS_CLK low. The process repeats so that, through the inverter gate 70, the ring oscillator 54 generates the oscillation pulses OP in the oscillation signal OVS_CLK. Note that any number of additional inverter gates may be provided in the ring oscillator 54 to provide an odd number of inversions.

By utilizing the OR gate 60, the input data signal SDATA provides a gated clock that activates and deactivates the ring oscillator 54. However, sampling errors can occur since the input data signal SDATA and the oscillator signal OVS_CLK are not frequency locked. The flip-flops 56, 58 synchronize the input data signal SDATA in accordance with the oscillator signal OVS_CLK and ensure that the oscillator 14 is cleanly deactivated. If the oscillation pulses OP of the oscillator signal OVR_CLK were being provided by sampling the input data signal SDATA, there would be a potential for counter errors on the activation edge AE and the deactivation edge DE of the data pulse DP defined by the input data signal SDATA. The flip-flops 56, 58 hold the oscillator enable signal C high for a time delay AD to ensure proper synchronization.

After the deactivation edge DE, the delayed data signal A is delayed by the flip-flop 56, and the delayed data signal B has an additional delay due to the flip-flop 58. This provides the oscillator enable signal C in a high state for an additional period AD after the deactivation edge DE. Otherwise, if the OR gate 60 were not provided and the input data signal SDATA were provided directly into the input terminal 78 of the AND gate 62, a narrow glitch could occur in the feedback oscillator signal D. Also, in a worst case scenario without the OR gate, the activation edge AE or the deactivation edge DE of the SDATA is provided during a positive edge of one of the oscillation pulses OP of the oscillation signal OVR_CLK. Since noise can shift the activation edge AE or the deactivation edge DE, this could cause a counter error. If both the activation edge AE and the deactivation edge DE shift, counter errors from 0-2 can result. The OR gate 60 and the flip-flops 56, 58 help ensure that the activation edge AE and the deactivation edge DE are appropriately aligned and that glitches do not occur in the oscillation signal OVR_CLK. In this manner, an appropriate number of the oscillation pulses OP are provided for the data pulse DP.

Figure 5:
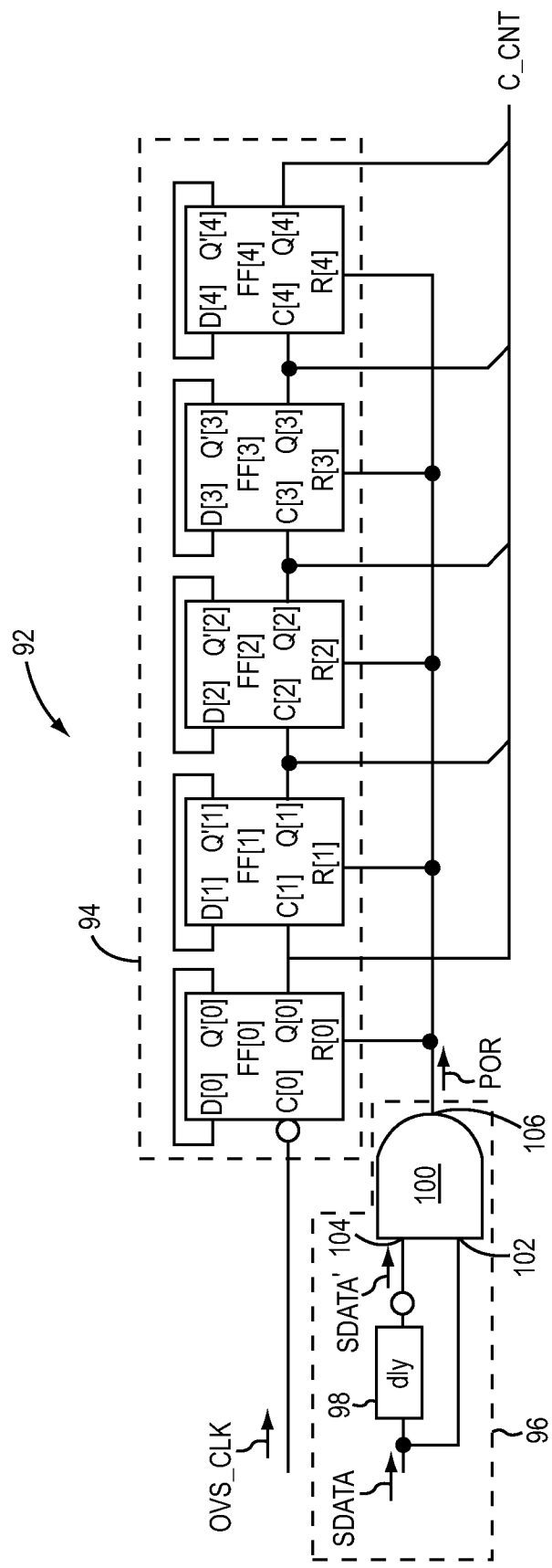
FIG. 5 illustrates one embodiment of a counter, which may be provided within the decoder shown in FIG. 1.

FIG. 5 illustrates one embodiment of a counter 92. The first counter 18 and/or the second counter 20 shown in FIG. 1 may be provided in accordance with the counter 92 shown in FIG. 5. The counter 92 includes a ripple counter 94 and a reset circuit 96. The ripple counter 94 includes flip-flops (referred to generally or generically as elements FF and specifically as elements FF[0]-FF[4]). Each of the flip-flops FF includes a data terminal (referred to generally or generically as elements D and specifically as elements D[0]-D[4]), a non-inverted output terminal (referred to generally or generically as elements Q and specifically as elements Q[0]-Q[4]), an inverted output terminal (referred to generally or generically as elements Q' and specifically as elements Q'[0]-Q'[4]), a clock terminal (referred to generally or generically as elements C and specifically as elements C[0]-C[4])), and a reset terminal (referred to generally or generically as elements R and specifically as elements R[0]-R[4])).

More specifically, a flip-flop FF[0] includes a data terminal D[0], a non-inverted output terminal Q[0], an inverted output terminal Q'[0], and a reset terminal R[0]. The inverted output terminal Q'[0] is connected to the data terminal D[0]. The reset terminal R[0] is coupled to the reset circuit 96. The clock terminal C[0] is connected to receive an inverted version of the oscillation signal OVS_CLK. A flip-flop FF[1] includes a data terminal D[1], a non-inverted output terminal Q[1], an inverted output terminal Q'[1], and a reset terminal R[1]. The inverted output terminal Q'[1] is connected to the data terminal D[1]. The reset terminal R[1] is coupled to the reset circuit 96. The clock terminal C[1] is connected to the non-inverted output terminal Q[0]. A flip-flop FF[2] includes a data terminal D[2], a non-inverted output terminal Q[2], an inverted output terminal Q'[2], and a reset terminal R[2]. The inverted output terminal Q'[2] is connected to the data terminal D[2]. The reset terminal R[2] is coupled to the reset circuit 96. The clock terminal C[2] is connected to the non-inverted output terminal Q[1]. A flip-flop FF[3] includes a data terminal D[3], a non-inverted output terminal Q[3], an inverted output terminal Q'[3], and a reset terminal R[3]. The inverted output terminal Q'[3] is connected to the data terminal D[3]. The reset terminal R[3] is coupled to the reset circuit 96. The clock terminal C[3] is connected to the non-inverted output terminal Q[2]. Finally, a flip-flop FF[4] includes a data terminal D[4], a non-inverted output terminal Q[4], an inverted output terminal Q'[4], and a reset terminal R[4]. The inverted output terminal Q'[4] is connected to the data terminal D[4]. The reset terminal R[4] is coupled to the reset circuit 96. The clock terminal C[4] is connected to the non-inverted output terminal Q[3]. Each of the flip-flops FF stores a bit of a count parameter C_CNT, which may be the reference parameter SYNC_CNT or the first count parameter BIT_CNT. The ripple counter arrangement of the flip-flops FF allows for the count parameter C_CNT to be incremented for each the oscillation pulses defined by the oscillation signal OVR_CLK.

The reset circuit 96 is configured to generate a reset signal POR that is received by the reset terminal R of each of the flip-flops FF to reset the ripple counter 94. In particular, the reset circuit 96 provides power on reset. As shown in FIG. 5, the reset circuit 96 includes a delay element 98 and an AND gate 100. The AND gate 100 has an input terminal 102 operable to receive the input data signal SDATA. The input data signal SDATA is also received by the delay element 98 that provides a delayed data signal SDATA', which is a delayed and inverted version of the input data signal SDATA. The AND gate 100 is operable to receive the delayed data signal SDATA' at the input terminal 104. The AND gate 100 also includes an output terminal 106. The AND gate 100 is configured to perform an AND operation on the input data signal SDATA and the delayed data signal SDATA' to generate the reset signal POR. Thus, the reset signal POR is high only after the reset circuit 96 is initially turned on by an activation edge of a data pulse and for a temporal period equal approximately to a propagation delay of the delay element 98. Otherwise, the reset signal POR remains low. The propagation delay of the delay element 98 is shorter than an oscillation period of the oscillation pulses defined by the oscillation signal OVS_CLK. This is because the negative edge of the oscillation pulses defined by the oscillation signal OVS_CLK is used. Once the input data signal SDATA goes low, the oscillation signal OVS_CLK is provided in a deactivation state, so the counter 92 will hold its last value of the count parameter C_CNT.

Figure 6:
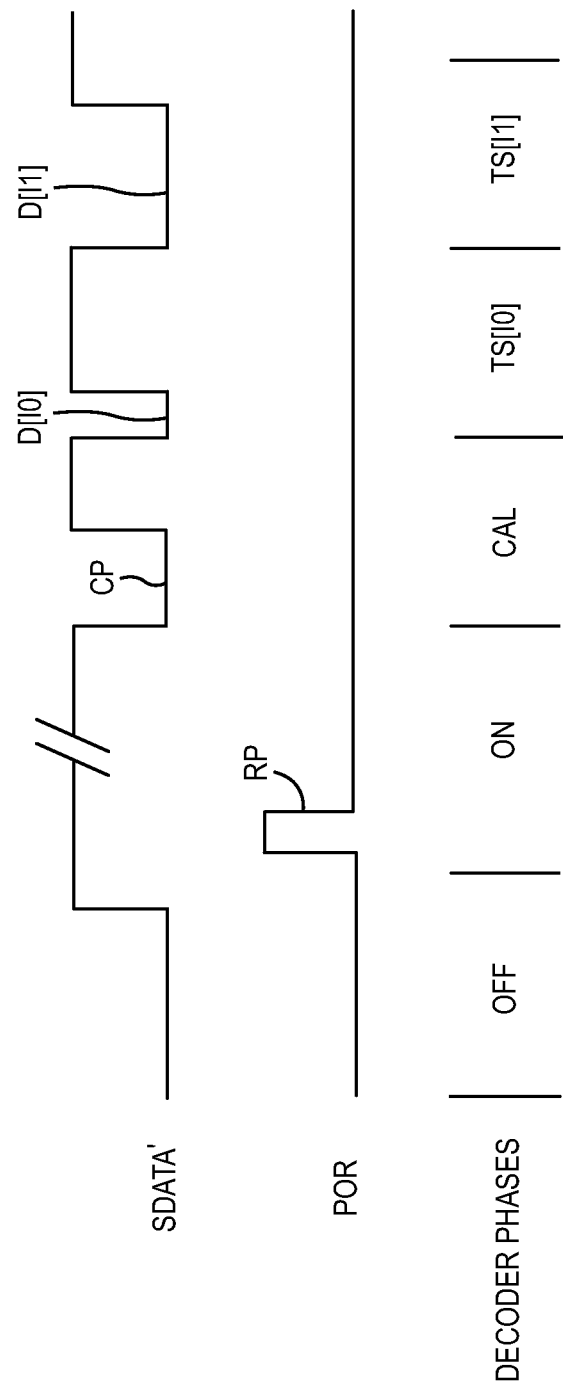
FIG. 6 illustrates a timing diagram for the counter shown in FIG. 5.

FIG. 6 illustrates a timing diagram for the counter 92 shown in FIG. 5. In this embodiment, the delayed input data signal SDATA' is shown, which is inverted with respect to the input data signal SDATA. The reset signal POR is shown for different phases of the decoder 10, including an off state, an on state, a calibration time slot CAL that provides a calibration pulse CP, a data pulse D[I0] that represents a bit value of 0 during a time slot TS[I0], and a data pulse D[I1] that represents a bit value of 1 during a time slot TS[I1]. As shown in FIG. 6, the reset signal POR has a reset pulse RP, which is provided initially when transitioning from the off state and the on state.

As illustrated by the timing diagram in FIG. 6, the counter 92 shown in FIG. 5 uses active high signaling. Note that since the signaling polarity is inverted in the delayed data signal SDATA', the oscillation signal OVS_CLK shown in FIG. 5 triggers the counter 92 when delayed data signal SDATA' is low. With reference to FIG. 6, the oscillation signal OVS_CLK will not be provided when the decoder 10 is in the off state or in the on state. It will only run during the calibration time slot CAL, the time slot TS[I0] and the time slot [I1].

As shown by the delayed data signal SDATA', when the input data signal SDATA pin is held low for a long period of time during the off state, it essentially starves the decoder 10 of power and the decoder turns off. To wake up the slave in the on state, the data input signal SDATA and the delayed input signal SDATA simply go high. This allows for the decoder 10 to be turned on in the on state and triggers the reset pulse RP of the reset signal POR when reaching a nominal voltage threshold. From there, the delayed data signal SDATA' has an opposite polarity of the data input signal SDATA shown in FIG. 2.

Figure 7:
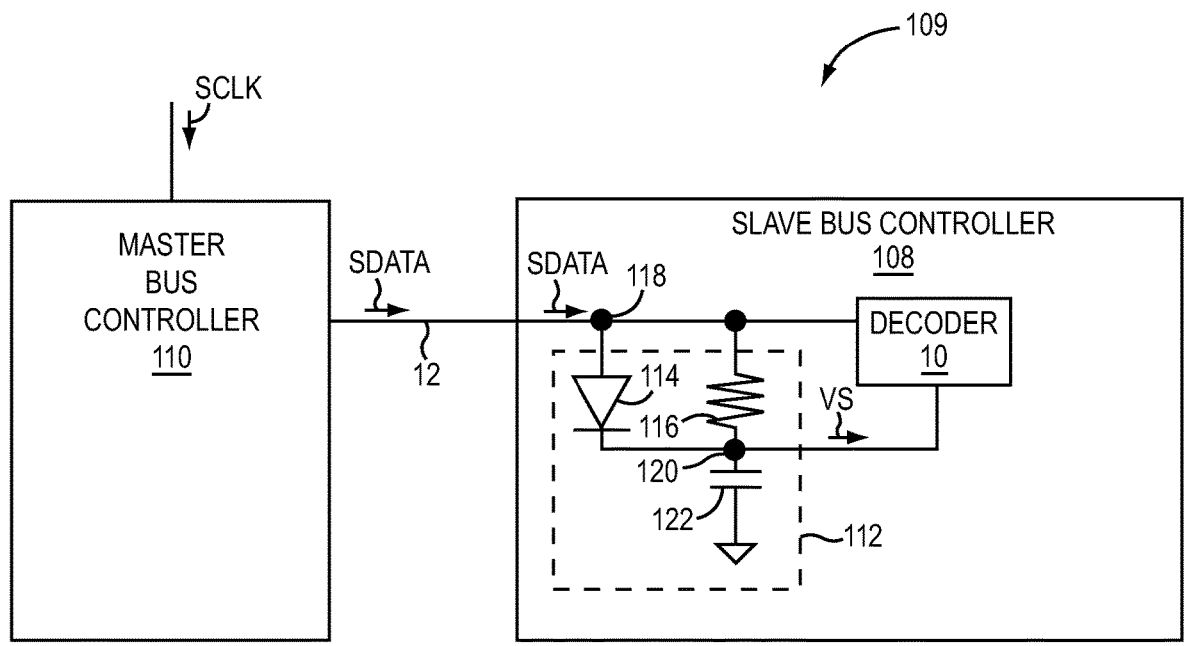
FIG. 7 illustrates an exemplary bus interface system having a slave bus controller, a master bus controller, and a bus line, where the slave bus controller derives power from the input data signal transmitted along the bus line.

FIG. 7 illustrates an exemplary bus interface system 109 having a slave bus controller 108, a master bus controller 110, and the bus line 12, where the slave bus controller 108 derives power from the input data signal SDATA. The master bus controller 110 is configured to generate the input data signal SDATA in accordance with the PWM bus protocol described above. The master bus controller 110 is coupled to the bus line 12 to transmit the input data signal SDATA along the bus line 12 to the slave bus controller 108. The slave bus controller 108 includes the decoder 10 described above with respect to FIG. 1. The slave bus controller 108 is also coupled to the bus line 12 to receive the input data signal SDATA from the master bus controller 110. In this manner, the slave bus controller 108 can recover bits from the input data signal SDATA using the decoder 10 as described above with respect to FIGS. 1 and 2. The slave bus controller 108 also includes power conversion circuitry 112 configured to also receive the input data signal SDATA and convert the input data signal SDATA into a supply voltage VS. More specifically, the supply voltage VS is used to power the decoder 10 in the slave bus controller 108 along with other components. Note that in this embodiment of the bus interface system 109, no other bus line is provided to couple the master bus controller 110 to the slave bus controller 108. Thus, only the bus line 12 is provided to couple the master bus controller 110 to the slave bus controller 108.

While the master bus controller 110 may use the system clock signal SCLK to synchronize the input data signal SDATA, the system clock signal SCLK does not have to be provided to the slave bus controller 108 since the master bus controller 110 generates the input data signal SDATA in accordance with the PWM bus protocol. As a result, the calibration pulse of the data frame is used by the decoder 10 in the slave bus controller 108 to synchronize the data frames and provide calibration as explained with respect to FIGS. 1 and 2 above. Thus, a clock bus line does not have to be provided between the master bus controller 110 and the slave bus controller 108 since the slave bus controller 108 can be synchronized without the system clock signal SCLK. Furthermore, since the power conversion circuitry 112 converts the input data signal SDATA into the supply voltage VS, a power bus line does not have to be provided in order to provide a supply voltage to the slave bus controller 108. Instead, the slave bus controller 108 generates the supply voltage VS from the input data signal SDATA itself. Thus, no other bus line besides the bus line 12 is provided by the bus interface system 109 to couple the master bus controller 110 to the slave bus controller 108.

In this embodiment, the power conversion circuitry 112 includes a diode 114 and a resistor 116 coupled in parallel between a node 118 and a node 120. Both the diode 114 and the resistor 116 receive the input data signal SDATA from the node 118. A capacitor 122 is coupled in shunt to the node 120. The capacitor 122 is charged by the input data signal SDATA to generate the supply voltage VS.

The power conversion circuitry 112 isolates the bus line 12 from the supply voltage VS provided to power the slave bus controller 108. The diode 114 allows for the input data signal SDATA to be pulled low without discharging the supply voltage VS. The resistor 116 does cause a slight pull down of the supply voltage VS. The diode 114 allows for faster charging of the capacitor 122. When the master bus controller 110 pulls the input data signal SDATA low to turn off the slave bus controller 108, the resistor 116 discharges the capacitor 122 to turn off the supply voltage VS and the slave bus controller 108.

Figure 8:
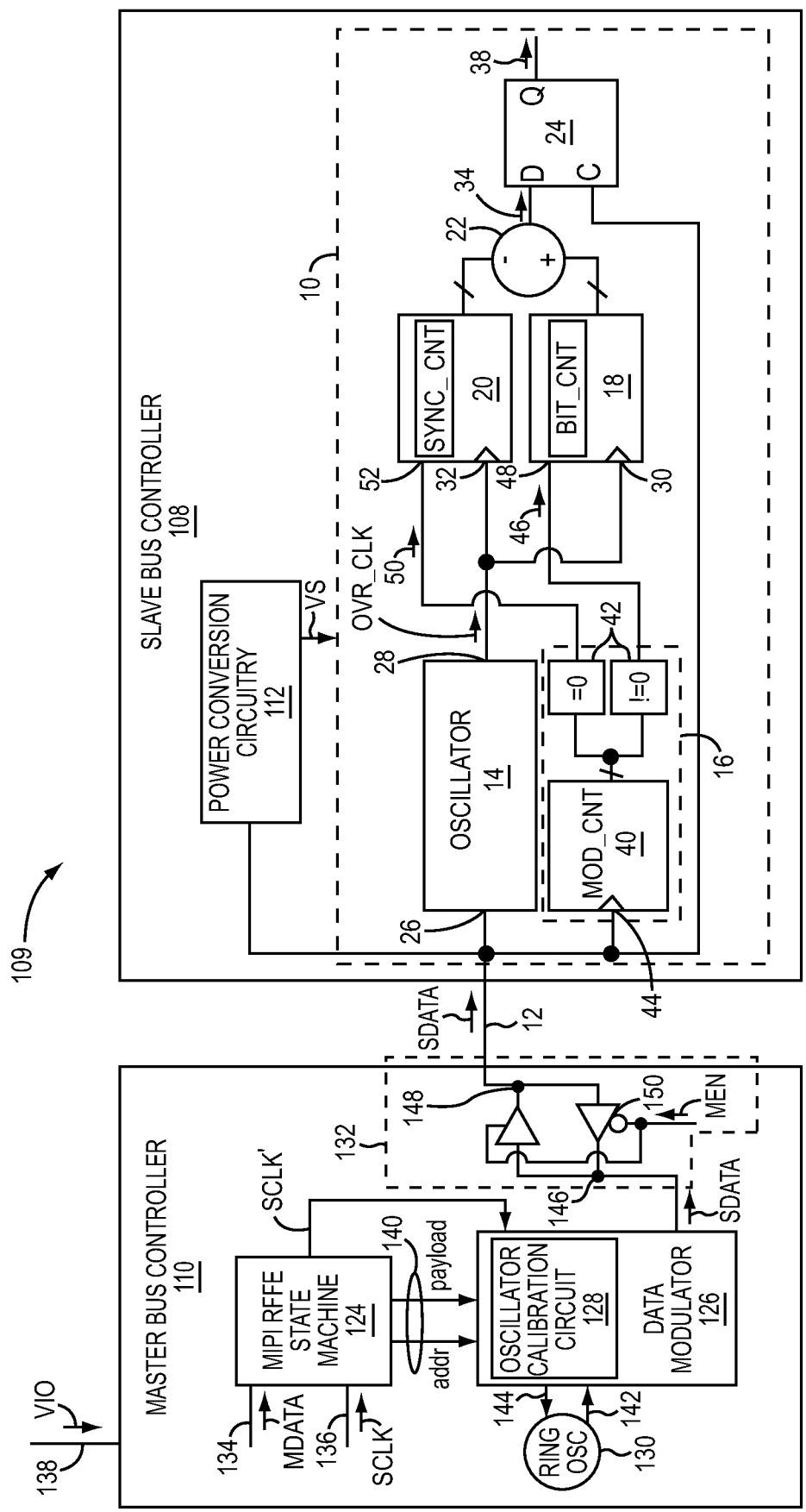
FIG. 8 illustrates another exemplary embodiment of the bus interface system that includes exemplary embodiments of the slave bus controller and the master bus controller, where the master bus controller is a bridge bus controller.

FIG. 8 illustrates another exemplary embodiment of the bus interface system 109 that includes exemplary embodiments of the slave bus controller 108 and the master bus controller 110. The master bus controller 110 is coupled to the bus line 12 to provide the input data signal SDATA and transmit the input data signal SDATA along the bus line 12 to the slave bus controller 108. The slave bus controller 108 includes the decoder 10 described above with respect to FIG. 1 and the power conversion circuitry 112 described above with respect to FIG. 7 that generates the supply voltage VS that powers the decoder 10. The slave bus controller 108 is also coupled to the bus line 12 to receive the input data signal SDATA from the master bus controller 110. In this embodiment, the master bus controller 110 is a bridge bus controller that translates a data frame formatted in accordance with a first bus protocol into the data pulses DP (shown in FIG. 2) defined by the input data signal SDATA during the time slots TS (shown in FIG. 2) of the data frame formatted in accordance with the PWM bus protocol. More specifically, in this embodiment, the master bus controller 110 is configured to translate the payload and the bus address represented by a data frame formatted in accordance with a Mobile Industry Processor Interface (MIPI) bus protocol and translate the payload and the bus address represented by the second data frame into the data pulses DP (shown in FIG. 2) defined by the input data signal SDATA during the time slots TS (shown in FIG. 2) of the data frame formatted in accordance with the PWM bus protocol.

The master bus controller 110 shown in FIG. 8 includes a MIPI Radio Frequency Front End (RFFE) state machine 124, a data modulator 126, an oscillator calibration circuit 128, a ring oscillator 130, and a bidirectional buffer 132. In this embodiment, the oscillator calibration circuit 128 is provided in the data modulator 126. The MIPI RFFE state machine 124 is configured to receive a first bus input, which in this example is a data input signal MDATA formatted in accordance with the MIPI bus protocol. The data input signal MDATA is received on a bus line 134. The data input signal MDATA represents a data frame that includes a bus address and a payload formatted in accordance with the MIPI bus protocol. To synchronize the master bus controller 110, the master bus controller 110 also receives the system clock signal SCLK on a bus line 136. Furthermore, the master bus controller 110 receives a supply voltage VIO along a bus line 138. The MIPI RFFE state machine is configured to extract the bus address and the payload from the data frame represented using the input data signal MDATA and generate a digital output 140 that transfers the bus address and the payload to the data modulator 126. The data modulator 126 is configured to obtain the bus address and payload extracted from the data input signal MDATA and provide the bus address and payload to a data frame formatted in accordance with the PWM bus protocol. The data modulator 126 is synchronized using the ring oscillator 130, which in this example is a digitally controlled oscillator (DCO). The ring oscillator 130 is configured to generate an oscillation signal 142. The ring oscillator 130 is relatively cheap. The oscillator calibration circuit is configured to calibrate the ring oscillator 130 based on the system clock signal SCLK. In this embodiment, the MIPI RFFE state machine 124 is configured to generate a calibration clock signal SCLK' by dividing down the system clock signal SCLK. The oscillator calibration circuit 128 is operable to receive the calibration clock signal SCLK' and generate a control output 144 that synchronizes the oscillation signal 142 in accordance with the calibration clock signal SCLK'.

The data modulator 126 is operable to receive the oscillation signal 142 and is configured to generate the input data signal SDATA such that the data pulses DP (shown in FIG. 2) of the input data signal SDATA are synchronized by the oscillation signal 142. Since the oscillation signal 142 was synchronized based on the system clock signal SCLK (e.g., in this embodiment, in accordance with the calibration clock signal SCLK' generated from the system clock signal SCLK), the timing accuracy of the oscillation signal 142 is maintained. As shown in FIG. 8, the bidirectional buffer 132 has an input terminal 146 that receives the SDATA signal and an output terminal 148 that provides the input data signal SDATA to the bus line 12. The output terminal 148 is coupled to the bus line 12, which is connected to the slave bus controller 108. However, the bidirectional buffer 132 also includes an input terminal 150 that is operable to receive an enable signal MEN. When the enable signal MEN is in an activated state, the bidirectional buffer 132 is configured to transmit the input data signal SDATA along the bus line 12. Otherwise, when the enable signal MEN is in a deactivation state, the bidirectional buffer 132 does not transmit the input data signal SDATA along the bus line 12 but rather allows the master bus controller 110 to receive data signals from slave controllers connected to the bus line 12. The enabling signal MEN may be generated by the data modulator 126 and may activate the bidirectional buffer 132 when the slave bus controller 108 (shown in FIG. 7) is not pulling down the bus line 12. Since the slave bus controller 108 is synchronized with the data pulse DP[0] (i.e., the calibration pulse), and the power conversion circuitry 112 converts the input data signal SDATA into the supply voltage VS, the master bus controller 110 and the slave bus controller 108 are only connected by the bus line 12. No other bus lines are needed.

Figure 9:
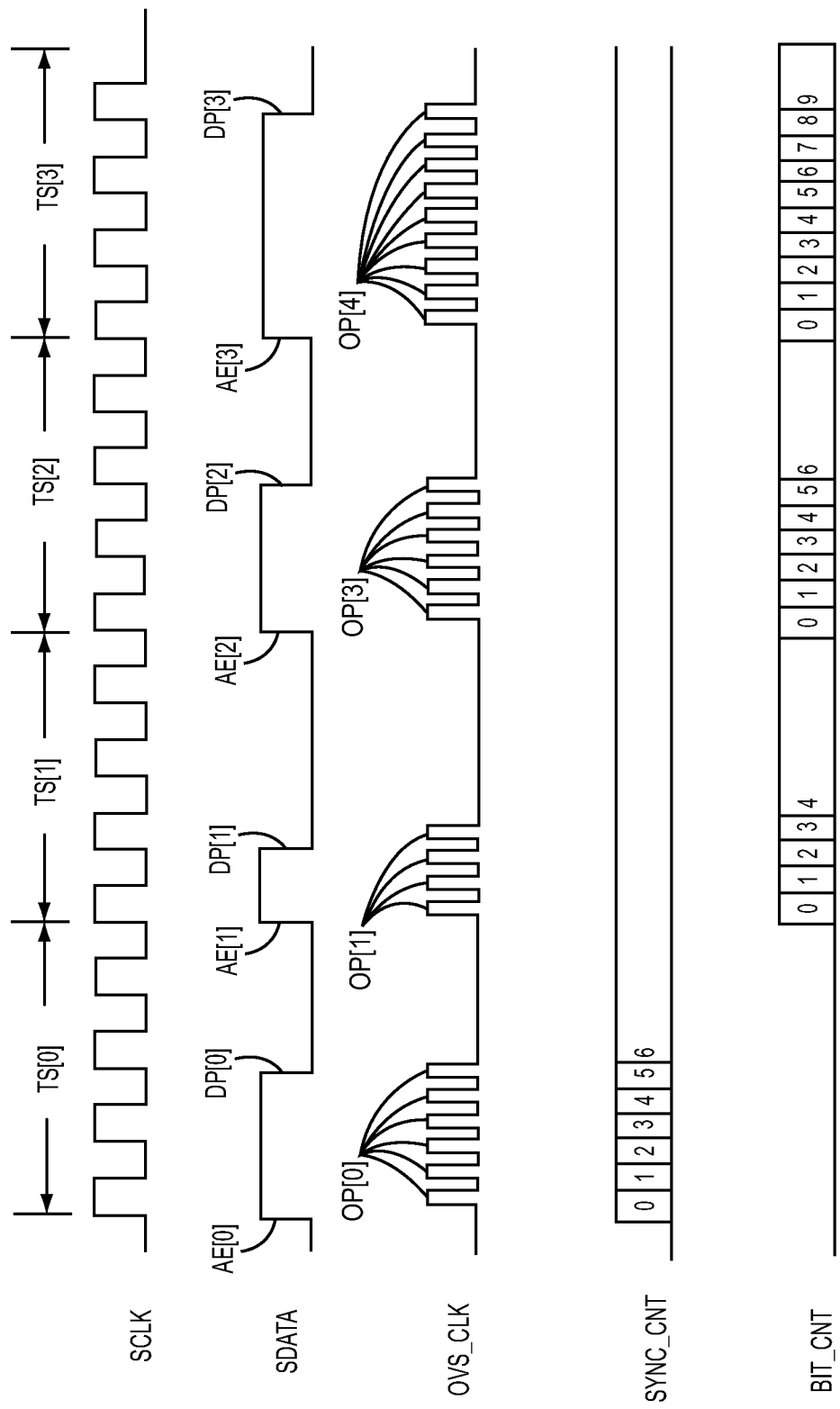
FIG. 9 illustrates a timing diagram for the bus interface system shown in FIG. 8 during an exemplary data frame provided in accordance to a one wire PWM bus protocol.

Referring now to FIG. 8 and FIG. 9, FIG. 9 illustrates a timing diagram for the bus interface system 109 shown in FIG. 8 during an exemplary data frame provided in accordance to another one wire PWM bus protocol. FIG. 9 includes an exemplary illustration of the input data signal SDATA, the system clock signal SCLK, the oscillation signal OVS_CLK, the reference parameter SYNC_CNT, and the first count parameter BIT_CNT as provided throughout the data frame. In this embodiment, the PWM bus protocol is provided so that the data pulses DP[1]-DP[3] represents any one of a set of logical values. More specifically, the data pulses DP[1]-DP[3] can represent any one of a set of three logical symbols, such as a logical symbol "0," a logical symbol "1," and a logical symbol "2." The master bus controller 110 is configured to generate the input data signal SDATA, which is synchronized based on the system clock signal SCLK, as described above. Again, in this embodiment, the data pulse DP[0] is the calibration pulse provided during the time slot TS[0], which is the calibration time slot. In this example, the data pulse DP[0] is provided by the master bus controller 110 for two clock periods of the system clock signal SCLK. The master bus controller 110 generates the data pulses DP[1]-DP[3] with logical symbols representing a bus address and a payload using the ring oscillator 130, as explained above with respect to FIG. 8.

With respect to the slave bus controller 108, the oscillator 14 in the decoder 10 is configured to be enabled by the data pulse DP[0], which is the calibration pulse provided during the calibration time slot (i.e., TS[0]). The second counter 20 may be configured to reset the reference parameter SYNC_CNT to an initial value of zero (0) in response to an activation edge AE[0] of the data pulse DP[0]. The second counter 20 is configured to count the oscillation pulses OP[0] defined by the oscillation signal OVR_CLK during the time slot TS[0] as a result of the data pulse DP[0] (the calibration pulse). More specifically, the second counter 20 is configured to increment the reference parameter SYNC_CNT as a result of each of the oscillation pulses OP[0] defined by the oscillation signal OVR_CLK during the time slot TS[0]. In this example, the reference parameter SYNC_CNT is set equal to a reference number of six (6) as a result of the six oscillation pulses OP[0] generated as a result of the data pulse DP[0] during the time slot TS[0]. As a result of the end of the data pulse DP[0], no more of the oscillation pulses OP[0] are generated, and the oscillation signal OVS_CLK is held in a deactive state for a remainder of the time slot TS[0]. Accordingly, the reference parameter SYNC_CNT indicates the reference number of six (6), which is how many of the oscillation pulses OP[0] were generated by the oscillator 14 during the time slot TS[0] (i.e., the calibration time slot) as a result of the data pulse DP[0] (i.e., the calibration pulse).

With respect to the second time slot TS[1], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[1]. The first counter 18 may be configured to reset the first count parameter BIT_CNT to an initial value of zero (0) in response to an activation edge AE[1] of the data pulse DP[1]. The first counter 18 is configured to count the oscillation pulses OP[1] defined by the oscillation signal OVR_CLK during the time slot TS[1] as a result of the data pulse DP[1], which has a 25% duty cycle.

More specifically, the first counter 18 is configured to increment the first count parameter BIT_CNT as a result of each of the oscillation pulses OP[1] defined by the oscillation signal OVR_CLK during the time slot TS[1]. In this example, the first count parameter BIT_CNT is set equal to a number of four (4) as a result of the four oscillation pulses OP[1] generated as a result of the data pulse DP[1] during the time slot TS[1]. As a result of the end of the data pulse DP[1], no more of the oscillation pulses OP[1] are generated and the oscillation signal OVS_CLK is held in a deactive state for a remainder of the time slot TS[1]. Accordingly, the first count parameter BIT_CNT indicates a number of four (4), which is how many of the oscillation pulses OP[1] were generated by the oscillator 14 during the time slot TS[1] as a result of the data pulse DP[1]. The comparison circuit 22 then subtracts the reference parameter SYNC_CNT from the first count parameter BIT_CNT. Since four (4) minus six (6) is negative, the comparison circuit 22 generates the data output 34 so that the data output 34 represents a logical symbol "0."

With respect to the time slot TS[2], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[2]. The first counter 18 may be configured to reset the first count parameter BIT_CNT to an initial value of zero (0) in response to an activation edge AE[2] of the data pulse DP[2]. The first counter 18 is configured to count the oscillation pulses OP[2] defined by the oscillation signal OVR_CLK during the time slot TS[2] as a result of the data pulse DP[2], which has a 50% duty cycle.

More specifically, the first counter 18 is configured to increment the first count parameter BIT_CNT as a result of each of the oscillation pulses OP[2] defined by the oscillation signal OVR_CLK during the time slot TS[2]. In this example, the first count parameter BIT_CNT is set equal to a number of six (6) as a result of the six oscillation pulses OP[2] generated as a result of the data pulse DP[2] during the time slot TS[2]. As a result of the end of the data pulse DP[2], no more of the oscillation pulses OP[2] are generated, and the oscillation signal OVS_CLK is held in a deactive state for a remainder of the time slot TS[2]. Accordingly, the first count parameter BIT_CNT indicates a number of six (6), which is how many of the oscillation pulses OP[2] were generated by the oscillator 14 during the time slot TS[2] (i.e., the first address time slot) as a result of the data pulse DP[2]. The comparison circuit 22 then subtracts the reference parameter SYNC_CNT from the first count parameter BIT_CNT. Since six (6) minus six (6) is zero, the comparison circuit 22 generates the data output 34 so that the data output 34 represents a logical symbol of "1."

With respect to the time slot TS[3], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[3]. The first counter 18 may be configured to reset the first count parameter BIT_CNT to an initial value of zero (0) in response to an activation edge AE[3] of the data pulse DP[3]. The first counter 18 is configured to count the oscillation pulses OP[3] defined by the oscillation signal OVR_CLK during the time slot TS[3] as a result of the data pulse DP[3] which has a 75% duty cycle.

More specifically, the first counter 18 is configured to increment the first count parameter BIT_CNT as a result of each of the oscillation pulses OP[3] defined by the oscillation signal OVR_CLK during the time slot TS[3]. In this example, the first count parameter BIT_CNT is set equal to a number of nine (9) as a result of the nine oscillation pulses OP[3] generated as a result of the data pulse DP[3] during the time slot TS[3]. As a result of the end of the data pulse DP[3], no more of the oscillation pulses OP[3] are generated, and the oscillation signal OVS_CLK is held in a deactive state for a remainder of the time slot TS[3]. Accordingly, the first count parameter BIT_CNT indicates a number of nine (9), which is how many of the oscillation pulses OP[3] were generated by the oscillator 14 during the time slot TS[3] as a result of the data pulse DP[3]. The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a logical symbol of "2."

Figure 10:
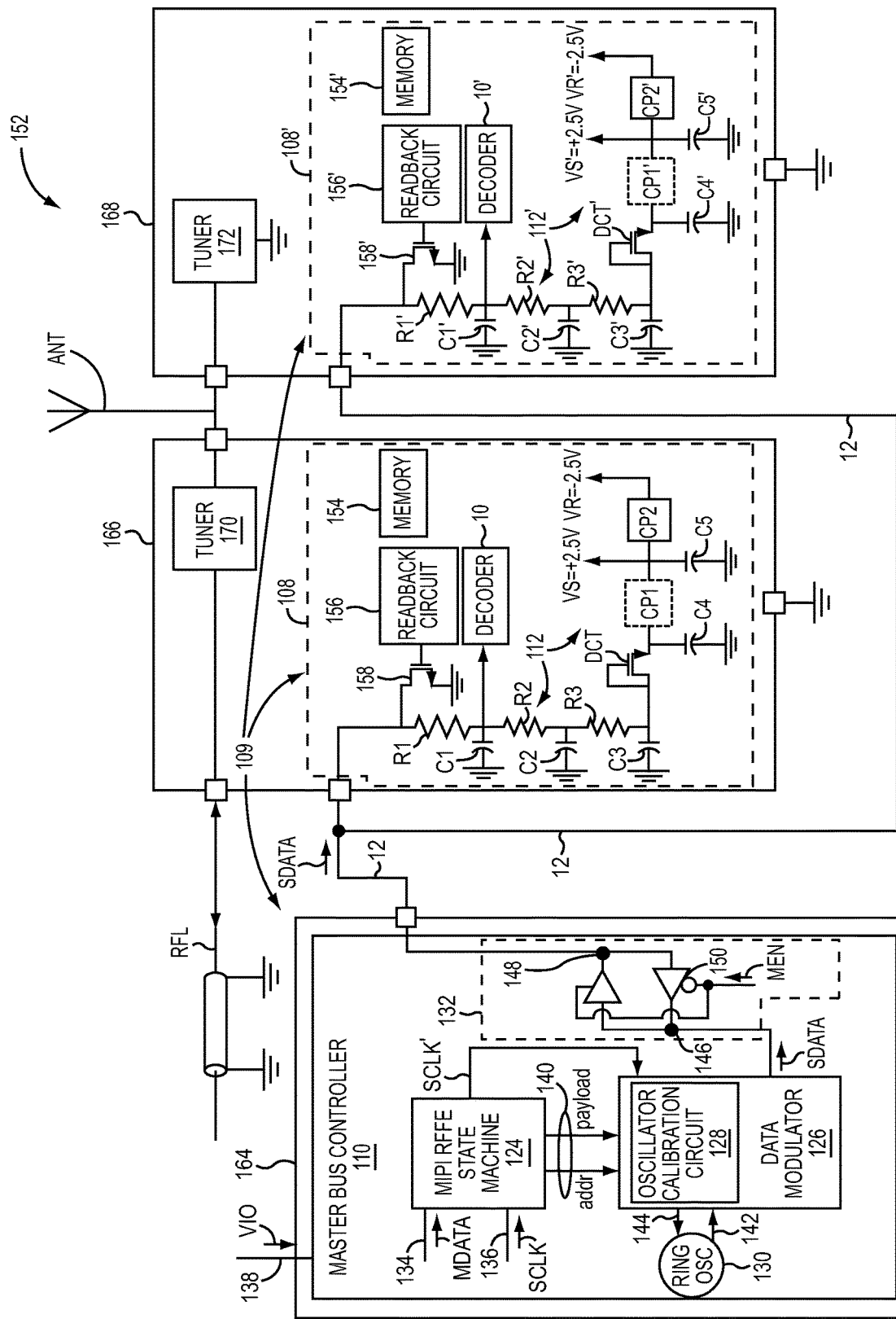
FIG. 10 illustrates another exemplary embodiment of the bus interface system that includes a master bus controller and slave bus controllers coupled in a daisy chain along the bus line.

FIG. 10 illustrates another exemplary embodiment of the bus interface system 109, which is provided in a radio frequency (RF) front end module 152. The bus interface system 109 includes an embodiment of the master bus controller 110, an embodiment of the slave bus controller 108, and another slave bus controller 108'. The slave bus controller 108' is coupled to the bus line 12 such that the slave bus controller 108 and the slave bus controller 108' are coupled in a daisy chain along the bus line 12. In this manner, the slave bus controller 108' also receives the input data signal SDATA from the master bus controller 110. In this embodiment, the slave bus controller 108 includes a memory device 154 that stores information received on the bus line 12 and can be used to write information on the bus line 12. A readback circuit 156 is configured to control a pull down transistor 158 in order to write bits onto the bus line 12. The slave bus controller 108 includes the decoder 10, which was described with respect to FIG. 1.

In addition, the slave bus controller 108 also includes another embodiment of the power conversion circuitry 112. In this embodiment, the power conversion circuitry includes shunt coupled capacitors C1, C2, C3, C4, C5, series connected resistors R1, R2, R3, a diode connected transistor DCT, a charge pump CP1, and a charge pump CP2. The shunt coupled capacitors C1, C2, C3, C4, C5, series connected resistors R1, R2, R3, and series connected transistors provide the appropriate RC constant to convert the input data signal SDATA into the supply voltage VS and a supply voltage VR. In this embodiment, the charge pump CP1 is a positive charge pump that generates the supply voltage at approximately +2.5V. The charge pump CP2 is a negative charge pump that generates the supply voltage VR at approximately −2.5V. The supply voltage VS and the supply voltage VR are provided to power the decoder 10 and readback circuit 156 of the slave bus controller 108.

In this embodiment, the slave bus controller 108' is identical to the slave bus controller 108. Thus, a decoder 10', a memory device 154', a readback circuit 156' a pull down transistor 158', a power conversion circuitry 112', shunt coupled capacitors C1', C2', C3', C4', C5', series connected resistors R1', R2', R3', a diode connected transistor DCT', a charge pump CP1', and a charge pump CP2' of the slave bus controller 108' are identical to the decoder 10, the memory device 154, the readback circuit 156, the pull down transistor 158, the power conversion circuitry 112, the shunt coupled capacitors C1, C2, C3, C4, C5, the series connected resistors R1, R2, R3, the diode connected transistor DCT, the charge pump CP1, and the charge pump CP2, respectively of the slave bus controller 108.

The master bus controller 110 is formed as an integrated circuit (IC) within an IC package 164. Similarly, the slave bus controller 108 is formed as an IC within an IC package 166 and the slave bus controller 108' is formed as an IC with an IC package 168. The IC packages 164, 166, 168 connect the master bus controller 110 and the slave bus controller 108, 108' in a daisy chain along the bus line 12. This arrangement thus reduces interconnections, and thus the slave bus controllers 108, 108' are provided with other circuitry of the RF front end module. More specifically, the IC package 166 includes a tuner 170 connected to an antenna ANT along an RF line RFL. The IC package 168 also includes a tuner 172 connected to the antenna ANT along the RF line RFL. In this example, the master bus controller 110 may be included with a cellular baseband chipset in a dedicated phone compartment and the slave bus controllers 108, 108' reside close to the antenna ANT. Reducing interconnections helps reduce costs and increase reliability.

Figure 11:
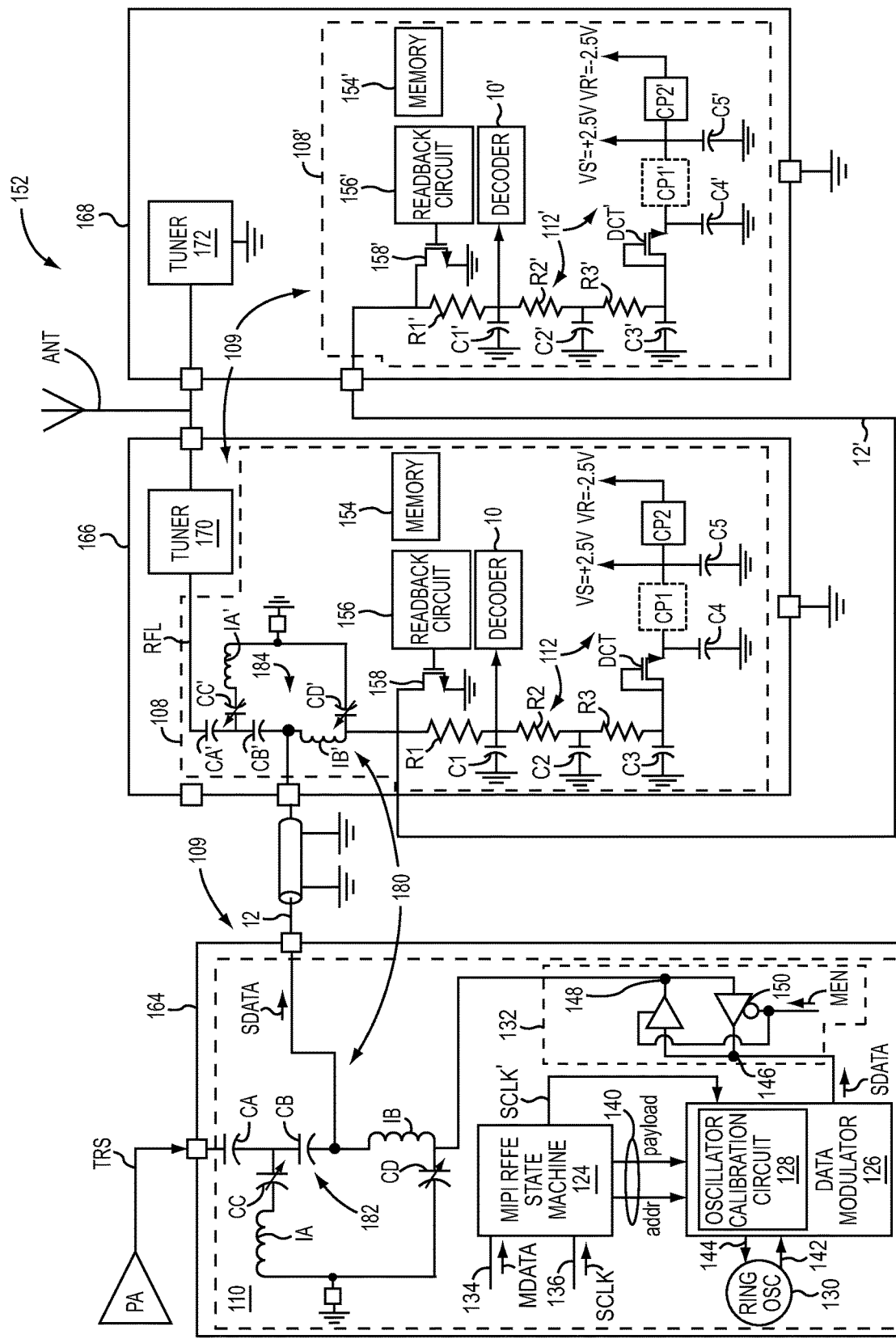
FIG. 11 illustrates another exemplary embodiment of the bus interface system that includes a master bus controller and slave bus controllers with a diplexer that reduces transmit injections along the bus line.

FIG. 11 illustrates another exemplary embodiment of the bus interface system 109, which is provided in another embodiment of the RF front end module 152. The master bus controller 110, the slave bus controller 108, and the slave bus controller 108' are the same as the embodiments shown in FIG. 10 except that, in this embodiment, the slave bus controller 108 and the slave bus controller 108' are connected by a bus line 12'. Furthermore, a diplexer 180 is provided to deal with transmit injection onto the bus line 12 and the bus line 12' resulting from a transmit signal TRS amplified by the power amplifier PA in the RF front end module 152. The RF transmit signal TRS propagates along the RF line RFL. The diplexer 180 includes a first RF filter 182 and a second RF filter 184. The master bus controller 110 includes the first RF filter 182. The slave bus controller 108 includes the second RF filter 184.

The RF transmit signal TRS is diplexed onto the wire in the master bus controller 110 and to the wire in the slave bus controller 108. As such, the RF transmit signal TRS needs to be passed with as little loss and noise as possible. The first RF filter 182 and the second RF filter 184 are configured to block bus noise produced by the master bus controller 110, the slave bus controller 108, and the slave bus controller 108' from entering the RF line RFL and the RF transmit signal TRS. The bus line 12 is connected between the first RF filter 182 and the second RF filter 184. The bus line 12' is connected between the pull down transistor 158 and resistor R1 in the slave bus controller 108 and is connected between the pull down transistor 158' and resistor R1' in the slave bus controller 108'.

The first RF filter 182 includes capacitors CA, CB, variable capacitive structure CC, CD, inductor IA, and inductor IB. The capacitor CA is coupled in series to provide matching for the transmit signal TRS from the power amplifier PA. The variable capacitive structure CC and the inductor IA are series coupled to form a series resonator connected in shunt. The capacitor CB, variable capacitive structure CC, and the inductor IA form a high pass filter that blocks energy from the communications bus activity from getting back to RF sections. The variable capacitive structure CD and the inductor IB are coupled in series to form another series resonator. The variable capacitive structure CD and the inductor IB form a low pass filter that blocks RF energy from getting to the data modulator 126. This low pass filter reduces RF levels at the output terminal 148 of the bidirectional buffer 132 from entering the master bus controller 110. The variable capacitive structures CC and CD may each be a programmable array of capacitors. Any other suitable variable capacitive structure may also be used such as varactors. In this manner, the first RF filter 182 can be tuned.

The second RF filter 184 includes capacitors CA', CB', variable capacitive structure CC', CD', inductor IA', and inductor IB'. The bus line 12 is connected to first RF filter 182 between the capacitor CB and the inductor IB and is connected to the second RF filter 184 between the capacitor CB' and the inductor IB'. The capacitor CA' is coupled in series to provide matching to the RF line RFL. The variable capacitive structure CC' and the inductor IA' are series coupled to form a series resonator connected in shunt. The capacitor CB', variable capacitive structure CC', and the inductor IA' form a high pass filter that blocks energy from the communications bus activity from getting back to RF sections. The variable capacitive structure CD' and the inductor IB' are coupled in series to form another series resonator. The series resonator formed by the variable capacitive structure CD' and the inductor IB' are connected in series to the other components of the slave bus controller 108. The variable capacitive structure CD' and the inductor IB' form a low pass filter that blocks RF energy from getting to the slave bus controller 108 and the slave bus controller 108' through the bus line 12'. The variable capacitive structures CC' and CD' may each be a programmable array of capacitors. Any other suitable variable capacitive structure may also be used such as varactors. In this manner, the second RF filter 184 can be tuned. The diplexer 180 may be tuned to have an elliptical response (Cauer characteristic response) such that the first RF filter 182 and the second RF filter 184 can be tuned for optimal selectivity at a signal frequency of the RF transit signal TRS.

Figure 12:
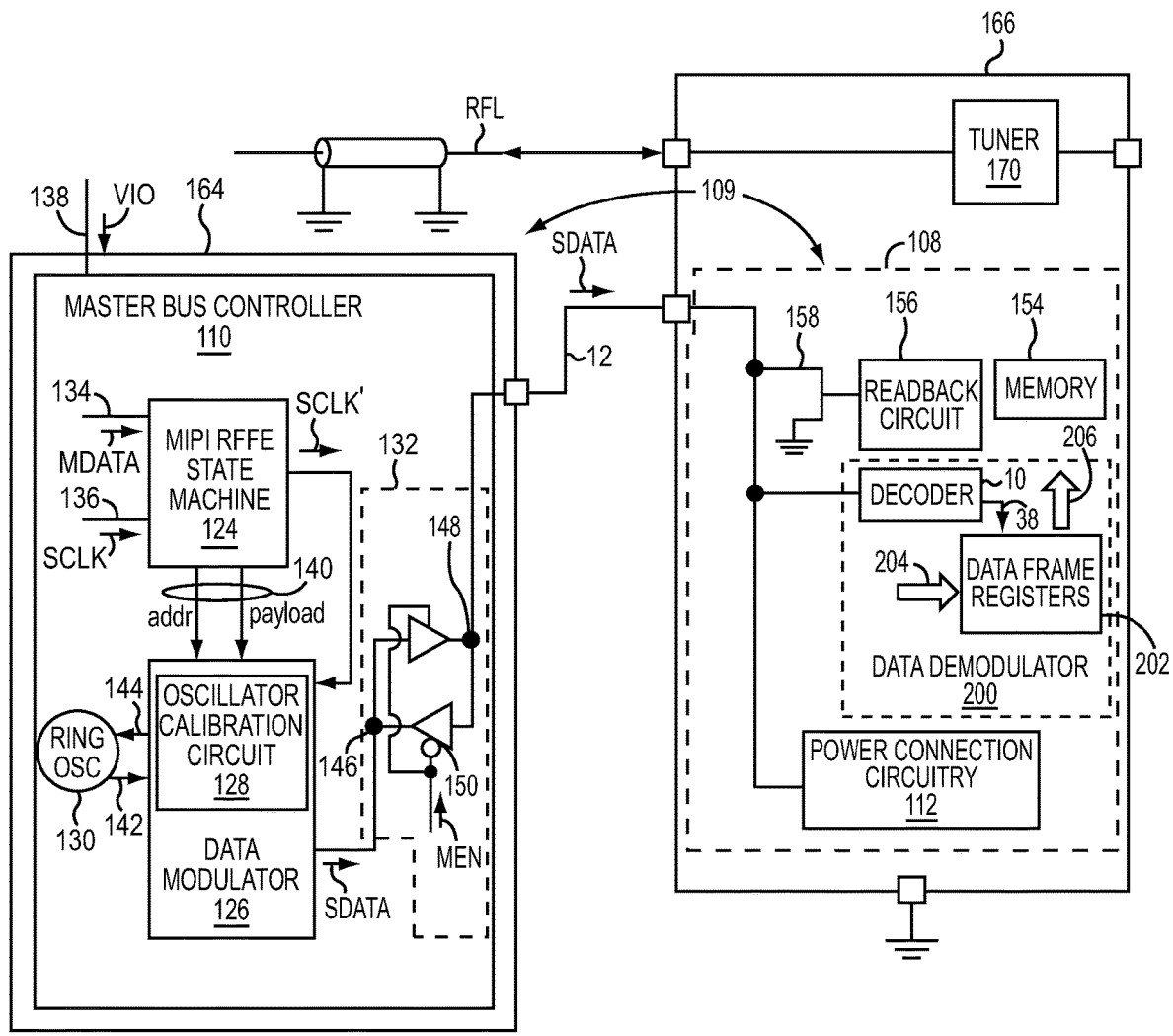
FIG. 12 illustrates one embodiment of a bus interface system that is configured to start data frames by generating a sequence of data pulses in accordance with a start-of-sequence (SOS) pulse pattern.

FIG. 12 illustrates another embodiment of the bus interface system 109. The bus interface system 109 shown in FIG. 12 includes an embodiment of the master bus controller 110 that is coupled to the bus line 12 and an embodiment of the slave bus controller 108 that is also coupled to the bus line 12. The master bus controller 110 is the same master bus controller 110 described above with respect to FIG. 8, FIG. 11, and FIG. 12. The slave bus controller 108 includes the memory device 154, the readback circuit 156, and the pull down transistor 158 described above with respect to FIGS. 8, 10, and 11. The slave bus controller also includes an embodiment of the power conversion circuitry 112. The power conversion circuitry 112 may be provided in the same manner as the embodiments of the power conversion circuitry 112 shown in FIGS. 7, 10, and 11. The power conversion circuitry 112 may also be provided as described in concurrently filed related U.S. patent application Ser. No. 14/659,371, filed Mar. 16, 2015, entitled "POWER MANAGEMENT SYSTEM FOR BUS INTERFACE SYSTEM," hereby incorporated herein by reference in its entirety. Also, as in the previously discussed embodiments, no other bus line is used to connect the master bus controller 110 to the slave bus controller 108.

As shown in FIG. 12, the slave bus controller 108 also includes an embodiment of the decoder 10. More specifically, the slave bus controller 108 includes an embodiment of a data demodulator 200, which includes the embodiment of the decoder 10 and data frame registers 202. The decoder 10 decodes data pulses from the master bus controller 110 in accordance with a PWM protocol as described above. The decoded logical symbols are stored by the data demodulator 200 in the data frame registers 202. However, in this embodiment, and unlike the embodiment of the decoder 10 shown in FIG. 1, the decoder 10 shown in FIG. 12 does not include the counter enabling circuitry 16 described above with respect to FIG. 1. The problem with the counter enabling circuitry 16 shown in FIG. 1 is that it is dependent on the counter enabling circuitry 16 maintaining an accurate count of the data pulses. If the modulo counter 40 (shown in FIG. 1) fails to increment the modular count parameter MOD_CNT then the decoder 10 (shown in FIG. 1) will not be able to accurately determine when a data frame is beginning and will not operate appropriately. Eventually, the slave bus controller 108 may need to reset upon determining that the decoder 10 (shown in FIG. 1) is not operating appropriately due to a failure of the modulo counter 40.

Referring again to FIG. 12, the bus interface system 109 provides for a technique that is not dependent on having to maintain the modular count parameter MOD_CNT (shown in FIG. 1) appropriately. Instead, the bus interface system 109 shown in FIG. 12 uses a start of sequence (SOS) pulse pattern to begin a data frame (described in further detail below). More specifically, the master bus controller 110 is configured to generate a sequence of data pulses along the bus line 12 such that the sequence of data pulses is provided in accordance to an SOS pulse pattern. The SOS pulse pattern is distinct from any pulse pattern of the data pulses representing logical symbols that is generated by the data modulator 126. In this manner, the data modulator 126 is configured to generate the input data signal SDATA with the sequence of data pulses in accordance to the SOS pulse pattern to indicate that a data frame has begun regardless of where the previous data frame was in its transmission.

As such, the data modulator 126 of the master bus controller 110 can generate the sequence of data pulses in the SOS pattern to begin a data frame after the bus line 12 has been idle and after a communication interlude where no information was being provided from the master bus controller 110 to the slave bus controller 108. However, the data modulator 126 of the master bus controller 110 can also provide the sequence of data pulses in accordance with the SOS pulse pattern by interrupting the previous data frame. Since the SOS pulse pattern is distinct from pulse patterns provided by combinations of data pulses representing logical symbols, the slave bus controller 108 can detect that a new data frame is being started even though the previous data frame had not been finished. To provide calibration, the master bus controller 110 is configured to generate the sequence of data pulses along the bus line in accordance to the SOS pulse pattern so that the sequence of data pulses includes a calibration data pulse.

More specifically, the slave bus controller 108 shown in FIG. 12 includes the data demodulator 200. The data demodulator 200 is configured to receive the input data signal SDATA and recognize that the sequence of data pulses transmitted along the bus line 12 has been provided in accordance with the SOS pulse pattern. The data demodulator 200 may provide the decoder 10 such that the decoder 10 is configured to recognize that the sequence of data pulses transmitted along the bus line have been provided in accordance with the SOS pulse pattern. However, in other embodiments, the data demodulator 200 includes separate specialized circuitry or specially programmed general purpose circuitry that is configured to recognize that the sequence of data pulses transmitted along the bus line 12 have been provided in accordance with the SOS pulse pattern.

Additionally, the slave bus controller 108 is configured to calibrate the decoder 10 in accordance with the calibration data pulse in response to recognizing that the sequence of data pulses has been provided in accordance to the SOS pulse pattern. More specifically, the data demodulator 200 of the slave bus controller 108 shown in FIG. 12 is configured to calibrate the decoder 10 in accordance with the calibration data pulse in response to recognizing that the sequence of data pulses has been provided from the master bus controller 110 in accordance with the first pulse pattern. Accordingly, the slave bus controller 108 can detect that a new data frame was started by the master bus controller 110 and calibrate the decoder 10 to decode the data pulses provided by the input data signal SDATA with logical symbols. As such, the decoder 10 shown in FIG. 12 does not have to include the counter enabling circuitry 16 (shown in FIG. 1). Rather, the data demodulator 200 detects the SOS pulse pattern.

Referring again to FIG. 12, the decoder 10 is configured to decode data pulses provided from the data modulator 126 in accordance with a PWM bus protocol as described with respect to the embodiments above. More specifically, the decoder 10 is configured to generate the memory input signal 38 in response to a data pulse in the input data signal SDATA from the master bus controller 110. Also, as explained above with respect to FIG. 1, the memory input signal 38 represents a logical value for a logical symbol transmitted along the bus line 12 and provided in the input data signal SDATA. The data frame registers 202 in the data demodulator 200 are configured to store the logical value represented by the memory input signal 38 in the data frame registers 202. Thus, as the data frame progresses, the logical symbols represented by data pulses from the data modulator 126 of the master bus controller 110 are decoded by the decoder 10 and stored in the data frame registers 202. However, once the data demodulator 200 recognizes the SOS pulse pattern, the data demodulator 200 of the slave bus controller 108 is configured to clear the data registers in response to recognizing that the sequence of data pulses has been provided in the SOS pulse pattern. Consequently, the data frame registers 202 are cleared and reset so that logical symbols represented by the new data frame can be stored by the data frame registers 202.

In this embodiment, the data demodulator 200 is configured to generate a reset output 204 that is received by the data frame registers 202. Upon receiving the reset output 204, the data frame registers 202 are reset. Once the logical symbols for the data frame output 206 have been decoded, the data frame output 206 can be output by the data frame registers 202 to other circuitry such as to the memory device 154 for storage or to processing circuitry in order to implement commands.

As discussed above, the master bus controller 110 is configured to start communication of a data frame along the bus line 12 with the sequence of data pulses provided in accordance to the SOS pulse pattern. For example, the input data signal SDATA can provide the data pulses DP of the data frame in the same manner shown in FIG. 2 except for the time slot TS[0] and the data pulse DP[0], which is the calibration data pulse in FIG. 2. Instead, the data modulator 126 would begin the data frame with a sequence of data pulses in accordance to the SOS pulse pattern. The sequence of data pulses would include a calibration data pulse, which the slave bus controller 108 uses to calibrate the decoder 10 in order to decode the data pulses DP[1]-DP[6] in accordance with the PWM protocol.

Figure 13:
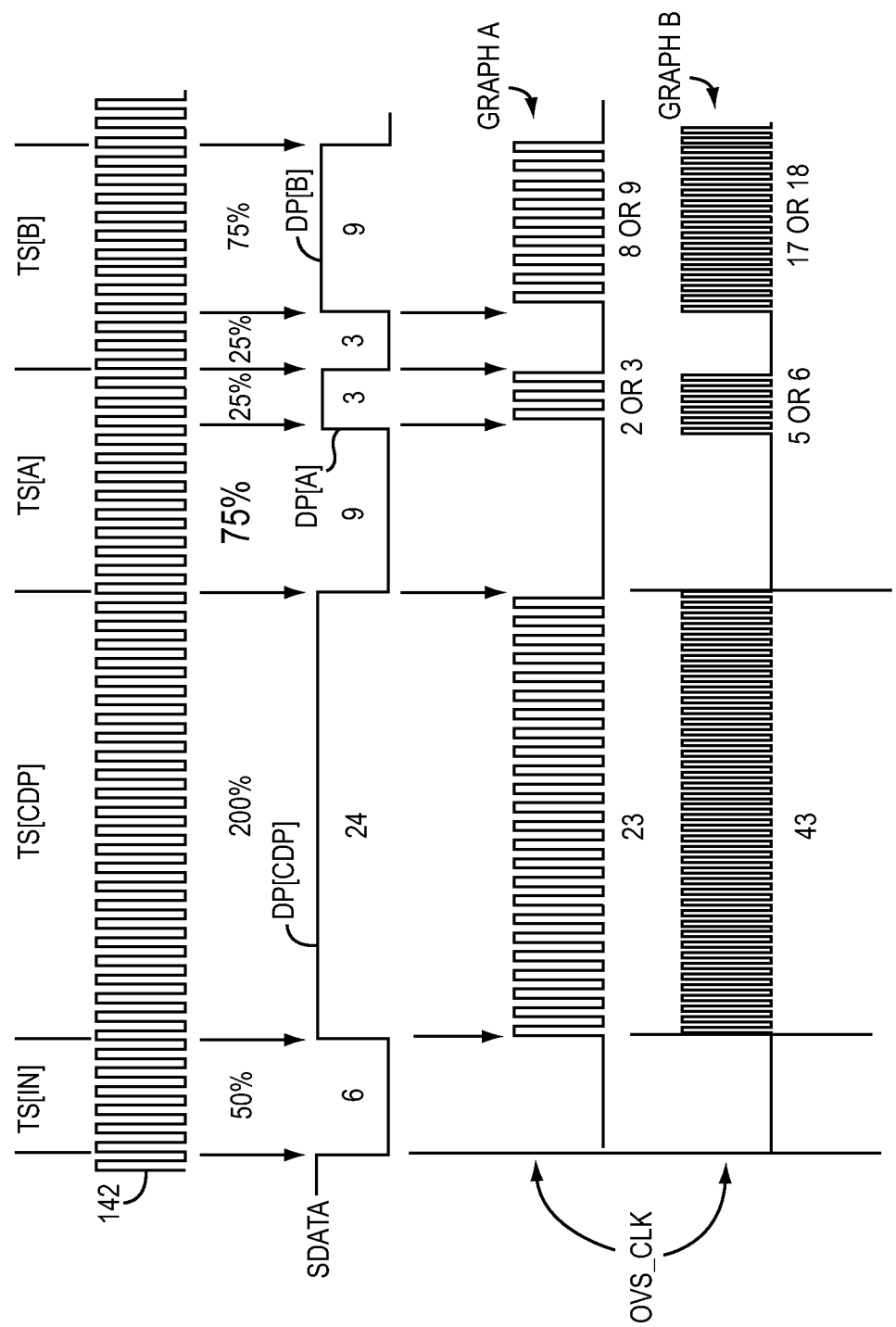
FIG. 13 is a signal graph that illustrates one embodiment of a sequence of data pulses generated in accordance with an SOS pulse pattern.

Referring now to FIGS. 12 and 13, FIG. 13 illustrates one embodiment of a sequence of data pulses DP[CDP], DP[A], and DP[B] which are generated by the data modulator 126 of the master bus controller 110 in the input data signal SDATA in order to start the data frame. The data modulator 126 synchronizes the generation of the data pulses DP[CDP], DP[A], and DP[B] in accordance with the oscillation signal 142 from the ring oscillator 130.

In this example, the input data signal SDATA is nominally high during a communication interlude between the master bus controller 110 and the slave bus controller 108. Thus, the SOS pulse pattern may begin with the data modulator 126 of the master bus controller 110 holding the input data signal SDATA low to initiate the data frame and communication session between the master bus controller 110 and the slave bus controller 108. The input data signal SDATA is held low during a time slot TS[IN]. The time slot TS[IN] is 50% as long as one of the time slots TS[1]-TS[6] shown in FIG. 2, which are all a standard time slot duration. The time slots TS[1]-TS[6] shown in FIG. 2 are time slots that include the data pulses DP[1]-DP[6] that represent logical symbols as explained above. In this example, this corresponds to six of the oscillation pulses in the oscillation signal 142 (shown in FIG. 12).

The data modulator 126 then generates a calibration data pulse DP[CDP] during a time slot TS[CDP]. The calibration data pulse DP[CDP] is generated throughout the entire time slot TS[CDP]. In this example, the time slot TS[CDP] is 200% as long as one of the time slots TS[1]-TS[6] shown in FIG. 2. As a result, the oscillator signal OVR_CLK is generated by the decoder 10 in order to detect a temporal length of the calibration data pulse DP[CDP]. In Graph A, the oscillation signal OVR_CLK of the decoder 10 (shown in FIG. 12) is provided at approximately the same pulse rate as the oscillation signal 142. In Graph B, the oscillation signal OVR_CLK is provided at approximately double the pulse rate as the oscillation signal 142. The calibration data pulse DP[CDP] is provided for 24 of the oscillation pulses of the oscillation signal 142. In Graph A, the oscillation signal OVR_CLK has 23 oscillation pulses while in Graph B it has 43 oscillation pulses. Thus, the data demodulator 200 will have a count of 23 or 43 in each respective case.

Note the discrepancy between the 24 pulses and either the 23 or 43 pulses. The discrepancy may be caused because the oscillator 14 (e.g., the embodiment of the oscillator 14 shown in FIG. 3) of the decoder 10 may be subject to process, voltage, and temperature variances. This can result in variations in the oscillation pulse rate of the oscillator signal OVR_CLK. By calibrating the decoder 10 with the calibration data pulse DP[CDP] when starting data frames, the reference parameter SYNC_CNT will be updated to a reference number based on the count resulting from the number of oscillation pulses of the oscillator signal OVR_CLK generated as a result of the calibration data pulse DP[CDP]. Accordingly, calibration helps compensate for the discrepancies resulting from process, voltage, and temperature variances since the reference parameter SYNC_CNT will be updated if the oscillation pulse rate changes enough to effect the count resulting from the calibration data pulse DP[CDP].

In this embodiment, after the calibration data pulse DP[CDP], a SOS identifier pulse DP[A] is provided during a time slot TS[A]. The time slot TS[A] is the same duration as the time slots TS[1]-TS[6] shown in FIG. 2. In this embodiment, initially, during the time slot TS[A], the master bus controller 110 holds the input data signal SDATA low for 75% of the time duration of the time slot TS[A]. Thus, during an initial portion of the time slot TS[A], the input data signal SDATA is held low for nine of the oscillation pulses of the oscillation signal 142. During the final three oscillation pulses of the time slot TS[A], the SOS identifier pulse DP[A] is provided by the data modulator 126 of the master bus controller 110. Thus the SOS identifier pulse DP[A] is provided for the final 25% of the time duration of the time slot TS[A]. In the example of Graph A, the oscillation signal OVR_CLK is provided with three oscillation pulses and the data demodulator 200 gets a count of two or three. However, in the example provided by Graph B, the oscillation signal OVR_CLK has six oscillation pulses and the data demodulator 200 gets a count of five or six.

The data modulator 126 of the master bus controller 110 generates a SOS identifier pulse DP[B] during a time slot TS[B], which is after the time slot TS[A]. The time slot TS[B] is of the same time duration as one of the time slots TS[1]-TS[6] shown in FIG. 2. During an initial 25% of the time slot TS[B], the input data signal SDATA is generated by the data modulator 126 low. Thus the input data signal SDATA is low for three oscillation pulses of the oscillation signal 142. During the final 75% of the time duration of the time slot TS[B], the data modulator 126 generates the SOS identifier pulse DP[B]. Thus its duration for 9 oscillation pulses of the oscillation signal 142. In Graph A, the oscillation signal OVS_CLK has nine oscillation pulses, and the data demodulator 200 gets a count of eight or nine. Similarly, the oscillation signal OVS_CLK in Graph B has 18 oscillation pulses and the data demodulator 200 gets a count of 17 or 18.

The oscillation signal OVS_CLK can be used by the data demodulator 200 of the slave bus controller 108 to recognize that the data pulses DP[CDP], DP[A], and DP[B] have been provided by the data modulator 126 of the master bus controller 110 in accordance to the SOS pulse pattern. The SOS pulse pattern illustrated by FIG. 13 is thus a pulse width pattern. In this example, the sequence of data pulses DP[CDP], DP[A], and DP[B] can be identified as being provided in the SOS pulse pattern since the calibration data pulse DP[CDP] is more than six times as long as the SOS identifier pulse DP[A], the calibration pulse DP[CDP] is more than two times as long as the SOS identifier pulse DP[B], and the SOS identifier pulse DP[B] is more than two times as long as the SOS identifier pulse DP[A]. This can be detected by the data demodulator 200 of the slave bus controller 108 based on the counts resulting from the oscillation signal OVS_CLK. For the remainder of the data frame, the data modulator 126 may provide the data pulses DP[1]-DP[6] in accordance to the PWM bus protocol, as shown in FIG. 2. However, if a data frame is being interrupted in order to start a new data frame, the input data signal SDATA may be provided with the sequence of the data pulses DP[CDP], DP[A], and DP[B] to initiate the next data frame despite the previous data frame not being finished.

Figure 14:
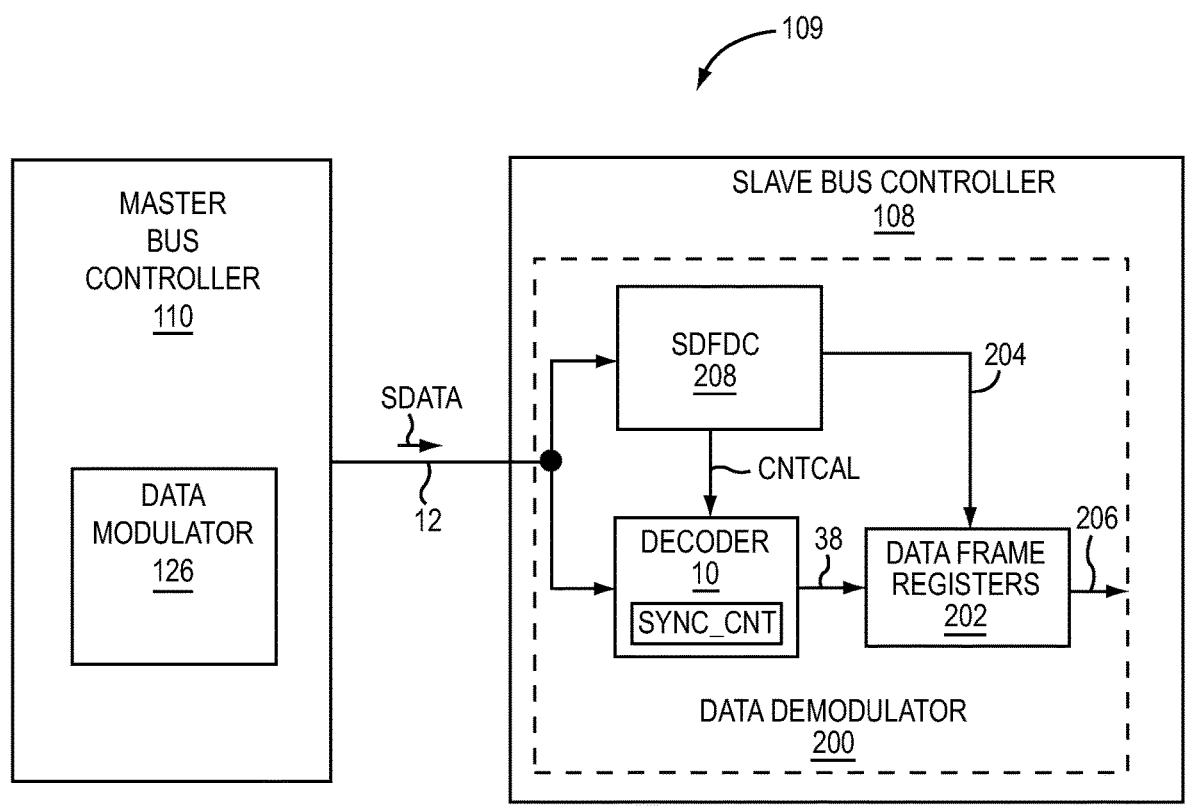
FIG. 14 illustrates one embodiment of a bus interface system that includes a slave bus controller with an exemplary data demodulator wherein the data demodulator includes a start of data frame detection circuit (SDFDC).

FIG. 14 illustrates an exemplary embodiment of the bus interface system 109 having the master bus controller 110 and the slave bus controller 108, which operate as described above with respect to FIG. 13. Thus, the master bus controller 110 is configured to start communication of a data frame along the bus line 12 with the sequence of data pulses provided in accordance to the SOS pulse pattern. Between communication sessions, the master bus controller 110 is configured to start a data frame with the sequence of data pulses in accordance to the SOS pulse pattern by ending a communication interlude between the master bus controller 110 and the slave bus controller 108 along the bus line 12. However, also as mentioned above, the master bus controller 110 is also configured to start a data frame with the sequence of data pulses in accordance with the SOS pulse pattern by interrupting communication of a previous data frame being communicated along the bus line 12 with the input data signal SDATA In FIG. 14, the slave bus controller 108 includes one embodiment of the data demodulator 200 shown in FIG. 13. In this embodiment, the decoder 10 of the data demodulator 200 continuously decodes the data pulses provided in the input data signal SDATA. A start of data frame detection circuit (SDFDC) 208 is also provided in the data demodulator 200 in order to detect when the sequence of data pulses are provided in accordance to the SOS pulse pattern in the input data signal SDATA transmitted along the bus line 12. More specifically, the SDFDC 208 is configured to recognize that the sequence of data pulses transmitted along the bus line 12 have been provided in accordance with the SOS pulse pattern.

The SDFDC 208 is also configured to calibrate the decoder 10 in accordance with the calibration data pulse (e.g., the calibration data pulse DP[CDP] shown in FIG. 13) in response to recognizing that the sequence of data pulses has been provided in accordance with the SOS pulse pattern. The decoder 10 is configured to store the reference parameter SYNC_CNT and decode data pulses in the input data signal SDATA transmitted along the bus line 12 based on the reference parameter SYNC_CNT similar to the embodiment of the decoder 10 shown in FIG. 1. However, in this embodiment (unlike the embodiment shown in FIG. 1), the decoder 10 shown in FIG. 14 does not set the reference parameter SYNC_CNT with the second counter 20 (shown in FIG. 1). Instead, the SDFDC 208 is configured to calibrate the decoder 10 in accordance with the calibration data pulse by setting the reference parameter SYNC_CNT based on the calibration data pulse (e.g., the calibration data pulse DP[CDP] shown in FIG. 13) in response to recognizing that the sequence of data pulses has been provided in accordance with the SOS pulse pattern.

In this embodiment, the SDFDC 208 continuously monitors the bus line 12 and the input data signal SDATA to determine whether the data modulator 126 of the master bus controller 110 has provided the input data signal SDATA with the sequence of data pulses in accordance to the SOS pulse pattern. If not, the reference parameter SYNC_CNT remains the same in the decoder 10. However, if the SDFDC 208 does detect that any series of data pulses have been provided by the master bus controller 110 in accordance to the SOS pulse pattern, the SDFDC 208 sets the reference parameter SYNC_CNT in accordance with the count resulting from the calibration data pulse (e.g., the calibration data pulse DP[CDP] shown in FIG. 13). The SDFDC 208 shown in FIG. 14 is configured to set the reference parameter SYNC_CNT in accordance with a calibration count parameter CNTCAL when the SDFDC 208 detects the SOS pulse pattern. The calibration count parameter CNTCAL is set based on a temporal length of the calibration data pulse.

The decoder 10 is configured to decode the data pulses in the input data signal SDATA continuously and generates the memory input signal 38 in accordance to the logical value decoded. The memory input signal 38 is received by the data frame registers 202, which store the logical value represented by the memory input signal 38. The data frame output 206 is generated by the data frame registers 202 so that the slave bus controller 108 can implement commands or store information from the data frame registers 202 in the memory device 154 (shown in FIG. 12). However, the SDFDC 208 is configured to generate the reset output 204 in response to recognizing that the sequence of data pulses has been provided in the SOS pulse pattern. As such, the data frame registers 202 are cleared once the reset output 204 is received. As such, logical values for a new data frame can be stored in the data frame registers 202.

Figure 15:
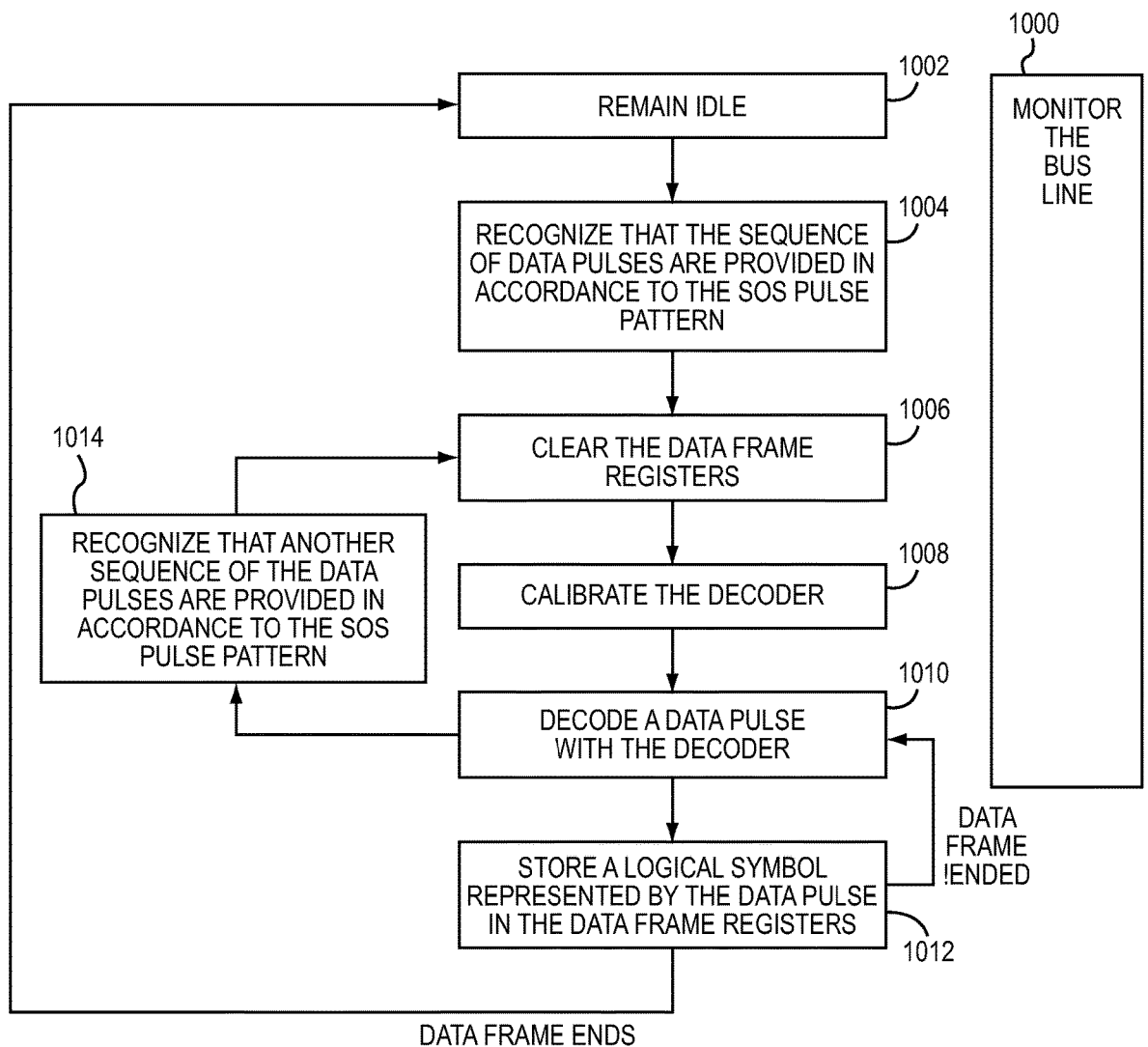
FIG. 15 illustrates one embodiment of a method of operating the slave bus controller illustrated in FIG. 14.

Referring now to FIGS. 14 and 15, FIG. 15 illustrates exemplary procedures that may be implemented by the slave bus controller 108 in a method of operation between the master bus controller 110 and the slave bus controller 108 coupled along the bus line 12. As explained above, the master bus controller 110 generates a sequence of data pulses along the bus line 12 such that the sequence of data pulses are provided in accordance to the SOS pulse pattern in order to start a data frame. The slave bus controller 108 and in particular the SDFDC 208 is configured to monitor the bus line 12 (procedure 1000). In the embodiment shown in FIG. 14, the slave bus controller 108 monitors the bus line 12 continuously so as to detect the sequence of data pulses in accordance to the SOS pulse pattern. Prior to the first data frame after the slave bus controller 108 has been turned on or during a communication interlude between the slave bus controller 108 and the master bus controller 110, the slave bus controller 108 remains idle (procedure 1002). More specifically, the data demodulator 200 of the slave bus controller 108 remains idle during a communication interlude (e.g., the end of the communication session as shown by the input data signal SDATA during the time slot TS[7] shown in FIG. 2). However, the master bus controller 110 generates the input data signal SDATA with the sequence of the data pulses in accordance with the SOS pulse pattern to begin the data frame. The master bus controller 110 generates the sequence of the data pulses to include the calibration data pulse.

As such, the data demodulator 200 of the slave bus controller 108 recognizes that the sequence of data pulses is provided in accordance with the SOS pulse pattern (procedure 1004). With regard to the embodiment shown in FIG. 14, the SDFDC 208 of the data demodulator 200 recognizes that the sequence of data pulses is provided in accordance to the SOS pulse pattern. Alternatively, as explained in further detail below, other embodiments may simply include the decoder 10 where the decoder 10 itself is capable of recognizing the SOS pulse pattern.

Referring again to FIGS. 14 and 15, since a new data frame has begun, the data demodulator 200 of the slave bus controller 108 is configured to clear the data frame registers 202 in the data demodulator 200 in response to recognizing that the sequence of data pulses has been provided in accordance with the SOS pulse pattern (procedure 1006). As such, in the procedure 1006, the data frame registers 202 are cleared by the data demodulator 200 to begin a data frame that is provided after the data demodulator 200 of the slave bus controller 108 was idle during procedure 1002. In the example shown in FIG. 14, the SDFDC 208 is configured to clear the data frame registers by generating the reset output 204.

Referring again to FIGS. 14 and 15, the data demodulator 200 of the slave bus controller 108 calibrates the decoder 10 in the data demodulator 200 of the slave bus controller 108 in accordance with the calibration data pulse in response to recognizing that the sequence of data pulses has been provided in accordance with the SOS pulse pattern (procedure 1008). More specifically, the data demodulator 200 shown in FIG. 14 is configured to provide the calibration count parameter CNTCAL in response to recognizing that the sequence of data pulses are provided in accordance to the SOS pulse pattern. The decoder 10 then sets the reference parameter SYNC_CNT based on the calibration count parameter CNTCAL. The calibration count parameter CNTCAL is set as a count that measures a temporal duration of the calibration data pulse (e.g., the calibration data pulse DP[CDP] shown in FIG. 13). After calibration, the data demodulator 200 of the slave bus controller 108 decodes a data pulse (e.g., the data pulse DP[1] shown in FIG. 2 that is transmitted during the time slot TS[1])(procedure 1010). The data demodulator 200 stores a logical symbol represented by the data pulse in the data frame registers 202 (procedure 1012).

For every subsequent data pulse of the data frame, procedures 1010 and 1012 are repeated until either the data frame is finished or the data demodulator 200 recognizes that another sequence of the data pulses has been provided in accordance to the SOS pulse pattern to start another data frame. For example, if the communication session and the data pulses of the data frame have come to an end, from procedure 1012, the data demodulator of the slave bus controller 108 goes back to procedure 1002 and remains idle until it again recognizes that a sequence of data pulses is provided in accordance to the SOS pulse pattern to start the next data frame.

However, the master bus controller 110 may interrupt transmission of a data frame before the data frame has finished. In this case, the master bus controller 110, and in particular the data modulator 126 of the master bus controller 110, is configured to generate another sequence of data pulses in accordance with the SOS pulse pattern. The master bus controller 110 thus interrupts transmission of the previous data frame before the data frame is finished and starts a new data frame. As such, the data demodulator 200 (and in the particular embodiment shown in FIG. 14, the SDFDC 208) recognizes that another sequence of the data pulses is provided in accordance to the SOS pulse pattern (procedure 1014).

Since the previous data frame was interrupted by the master bus controller 110, the data demodulator 200 again clears the data frame registers 202 in procedure 1006. In this case, the data frame registers 202 are cleared by the slave bus controller 108 when the master bus controller has interrupted transmission of the previous data frame. The data demodulator 200 then calibrates the decoder 10 with the calibration data pulse from the other sequence of the data pulses from the master bus controller 110 when the master bus controller 110 has interrupted transmission of the previous data frame. Procedures 1010 and 1012 are repeated so long as either this data frame has not finished or until still another sequence of data pulses is recognized to interrupt the current data frame. Accordingly, the procedures in FIG. 15 can be cycled through as new data frames are provided either after the slave bus controller 108 has been idling in procedure 1002 or if a previous data frame is interrupted with a new sequence of data pulses in accordance with the SOS pulse pattern to start a new data frame.

Figure 16:
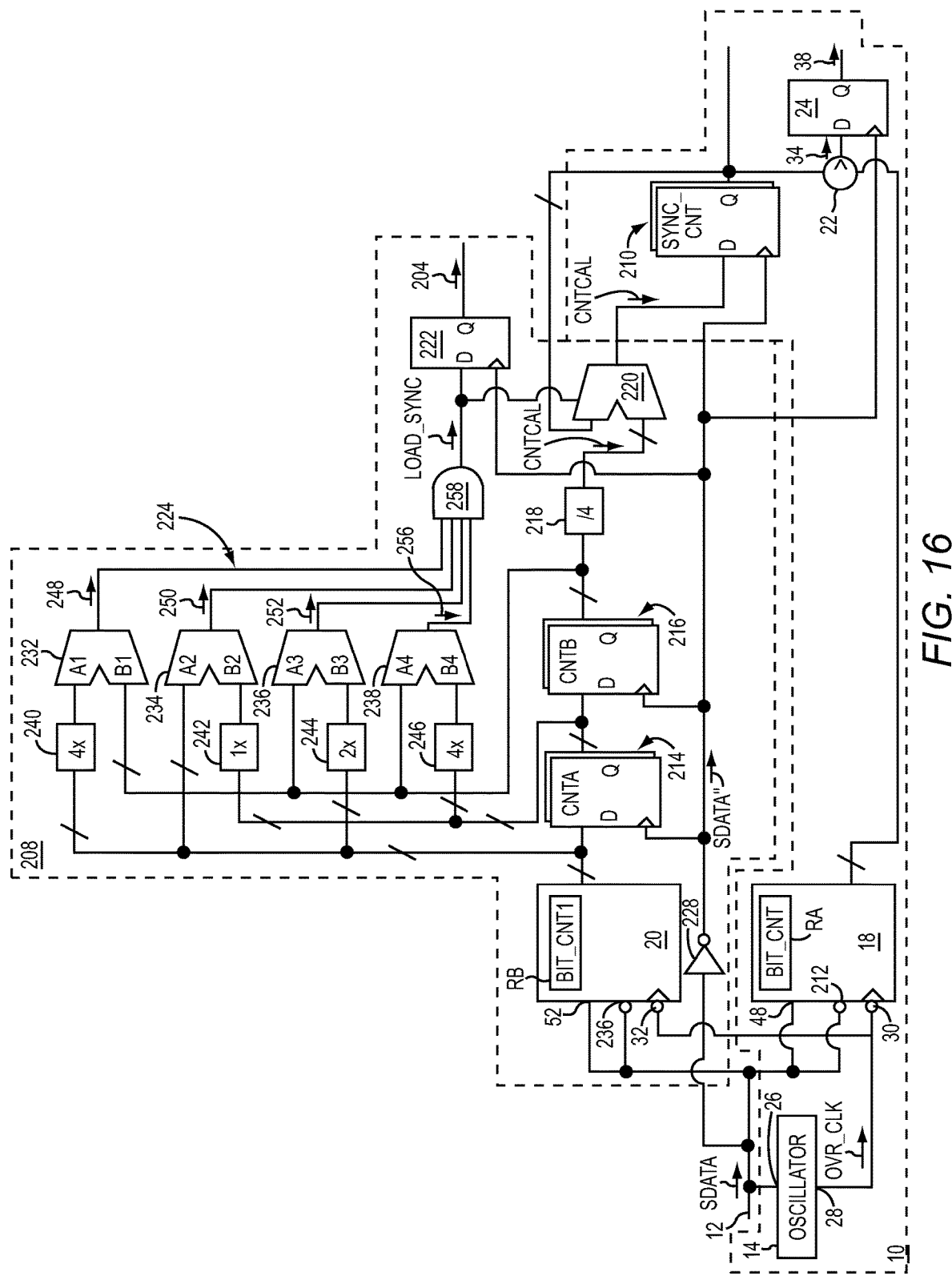
FIG. 16 illustrates an exemplary diagram of the SDFDC and a decoder for the data demodulator shown in FIG. 14.

FIG. 16 illustrates exemplary circuit diagrams for one embodiment of the decoder 10 and the SDFDC 208 of the data demodulator 200 shown in FIG. 14. The decoder 10 includes the oscillator 14, the first counter 18, the comparison circuit 22, and the sequential state element 24, just like the decoder 10 shown in FIG. 1. However, unlike the decoder 10 shown in FIG. 1, the decoder 10 shown in FIG. 16 does not include the second counter 20 (shown in FIG. 1) or the counter enabling circuitry 16. Rather, the SDFDC 208 includes the second counter 20. Furthermore, the decoder 10 includes a memory buffer 210. The memory buffer 210 is provided by a group of registers configured to store the reference parameter SYNC_CNT. As explained in further detail below, the SDFDC 208 shown in FIG. 16 sets the reference parameter SYNC_CNT in accordance with a temporal duration of the calibration time pulse. In this manner, the reference parameter SYNC_CNT can be compared with the first count parameter BIT_CNT to determine the logical value of a logical symbol in the same manner described above with respect to FIG. 1.

More specifically, the oscillator 14 is operable to receive the input data signal SDATA from the bus line 12. As mentioned above, each of the data pulses generated in the input data signal SDATA may be provided during different time slots. The oscillator 14 includes the enabling terminal 26 and is coupled to the bus line 12 so that the input data signal SDATA is received at the enabling terminal 26. In this manner, the oscillator 14 is configured to be enabled by the data pulses of the input data signal SDATA. As such, the oscillator 14 is triggered by the activating edge of each of the data pulses of the input data signal SDATA and is configured to generate oscillation pulses while enabled. The oscillator 14 shown in FIG. 16 is operable to provide the oscillation signal OVR_CLK from the output terminal 28 of the oscillator 14.

While enabled, the oscillator 14 is configured to provide the oscillation signal OVR_CLK so that the oscillation signal OVR_CLK defines the oscillation pulses. The oscillator 14 is then deactivated in response to the end of the data pulse. More specifically, the oscillator 14 is deactivated and does not generate oscillation pulses in response to a deactivation edge of the data pulses in the input data signal SDATA. When the oscillator 14 is deactivated, the oscillator 14 does not generate oscillation pulses. Thus, the oscillator 14 does not provide the oscillation pulses and does not provide the oscillation signal OVR_CLK.

The oscillation signal OVR_CLK is held in the deactivation state while the oscillator 14 is not enabled and deactivated. In accordance with a PWM bus protocol, a pulse rate of the oscillation signal OVR_CLK is significantly greater than a pulse rate of the data pulses of the input data signal SDATA, as explained above. The first counter 18 is configured to receive the oscillation signal OVR_CLK from the oscillator 14. More specifically, the first counter 18 is operable to receive the oscillation signal OVR_CLK from the output terminal 28 of the oscillator 14. In this embodiment, the first counter 18 also receives the input data signal SDATA at the enabling terminal 48. Thus, the first counter 18 shown in FIG. 16 is enabled by each of the data pulses in the input data signal SDATA and is disabled after the end of each of the data pulses.

The first counter 18 shown in FIG. 16 is operable to store the first count parameter BIT_CNT, as described with respect to FIG. 2. While the first counter 18 is enabled by one of the data pulses of the input data signal SDATA, the first counter 18 is configured to increment the first count parameter BIT_CNT in response to each of the oscillation pulses provided by the oscillation signal OVR_CLK. In this manner, the first count parameter BIT_CNT is a temporal measurement of the data pulse. The first count parameter BIT_CNT is reset to an initial value by the first counter 18 once the oscillator 14 is deactivated.

As explained above, the input data signal SDATA is formatted in accordance with the PWM protocol so that the data pulse defined by the input data signal SDATA represents logical symbols, such as bits. The first counter 18 is configured to count the oscillation pulses of the oscillation signal OVR_CLK such that the first count parameter BIT_CNT indicates the number of the oscillation pulses generated as a result of the data pulse.

The first counter 18 may store the first count parameter BIT_CNT in a group of registers RA, an example of which is shown by the flip-flops FF shown in FIG. 5. Note that in this embodiment, the first counter 18 also includes a reset terminal 212 which may be used to receive the input data signal SDATA for a reset circuit (such as the reset circuit 96 shown in FIG. 5). The first counter 18 thus passes the first count parameter BIT_CNT to the comparison circuit 22 in order to determine the logical value of the data pulse. The memory buffer 210 is provided as a group of reference registers. These reference registers are configured to store the reference parameter SYNC_CNT. In this embodiment, the SDFDC 208 is configured to calibrate the decoder 10 in accordance with the calibration data pulse by setting the reference parameter SYNC_CNT based on the calibration data pulse in response to recognizing that a sequence of the data pulses has been provided in accordance to the SOS pulse pattern, as explained in further detail below.

To determine the logical value of the data pulse from the first count parameter BIT_CNT, the comparison circuit 22 is configured to compare the first count parameter BIT_CNT with the reference parameter SYNC_CNT. The reference parameter SYNC_CNT indicates a reference number is based on a temporal duration of a calibration data pulse. In the same manner described above with respect to FIG. 2, the comparison circuit 22 shown in FIG. 16 is configured to generate the data output 34 such that the data output 34 represents a first logical value (e.g., a bit value of "1") in response to the first count parameter BIT_CNT being greater than the reference parameter SYNC_CNT and such that the data output 34 represents a second logical value (e.g., a bit value of "0") in response to the first count parameter BIT_CNT being less than the reference parameter SYNC_CNT. Accordingly, the decoder 10 shown in FIG. 1 is configured to decode data pulses in accordance to a PWM bus protocol. Thus, the decoder 10 shown in FIG. 16 does this by being configured to store the reference parameter SYNC_CNT and decode data pulses transmitted along the bus line 12 based on the reference parameter SYNC_CNT.

In this example, the PWM protocol allows for the data pulses to represent bit values [0,1]. The comparison circuit 22 is configured to generate the data output 34 as a data output signal such that the data output signal represents an output bit that was represented by the data pulse. The sequential state element 24 is configured to receive the data output 34 and store the output bit represented by the data output 34. The sequential state element 24 generates the memory input signal 38 so that the logical value (in this case, the bit value represented by the data pulse) is stored by the data frame registers 202 shown in FIG. 14.

FIG. 16 also illustrates an exemplary circuit diagram of the SDFDC 208 from in the data demodulator 200 shown in FIG. 14. The SDFDC 208 shown in FIG. 16 includes the second counter 20, a memory buffer 214, a memory buffer 216, a divider 218, a multiplexing circuit 220, a sequential state element 222, and a pattern detection circuit 224. In this embodiment, the second counter 20 stores a second count parameter BIT_CNT1 and operates identically to the first counter 18. The second counter 20 is configured to store the second count parameter BIT_CNT1 in a group of registers RB, which may be provided in the same manner as the flip-flops FF shown in FIG. 5. In this manner, the SDFDC 208 is configured to measure a pulse width of each of the data pulses provided in the input data signal SDATA along the bus line 12. More specifically, the second counter 20 is configured to receive the oscillation signal OVR_CLK from the oscillator 14 at the input terminal 32. Furthermore, in the embodiment shown in FIG. 16, the second counter 20 receives the input data signal SDATA at the enabling terminal 52. Accordingly, the second counter 20 is enabled during each of the data pulses and disabled when no data pulse is being provided along the bus line 12. While the second counter 20 is enabled by the data pulse, the second counter 20 is configured to increment the second count parameter BIT_CNT1 in response to each of the oscillation pulses provided by the oscillation signal OVR_CLK. In this manner, for each data pulse provided within the input data signal SDATA, the second counter 20 is configured to count the oscillation pulses of the oscillation signal OVR_CLK that are generated as a result of the data pulse.

The group of registers RB in the second counter 20 stores the second count parameter BIT_CNT1. The second counter parameter BIT_CNT1 is initialized to an initial value once the data pulse has finished. In this embodiment, the second counter 20 also includes a reset terminal 236 in order to provide power on reset (which is described with respect to the reset circuit 96 shown in FIG. 5). The second count parameter BIT_CNT1 is thus a parameter that indicates a pulse width of the data pulse.

As shown by the SDFDC 208 in FIG. 16, the memory buffer 214 is configured to store a count parameter CNTA. The memory buffer 214 is provided as a group of registers and is connected in sequence with the second counter 20 and, more specifically, with the group of registers RB of the second counter 20. Once the data pulse is finished and before the second counter 20 is reset to an initial value in anticipation of the next data pulse, the count parameter CNTA is set equal to the second count parameter BIT_CNT1 stored by the groups of registers in the memory buffer 214. In this manner, the second counter 20 can reset the count parameter BIT_CNT1 to an initial value in order to count the oscillation pulses resulting from the next data pulse. Thus, with respect to the current data pulse, the group of registers 214 is configured to store the count of the previous data pulse.

Additionally, the memory buffer 216 is provided by a group of registers that stores a count parameter CNTB. Thus, the group of registers in the memory buffer 216 is coupled in sequence with the group of registers in the memory buffer 214. Accordingly, when yet another data pulse is provided along the bus line 12 in the input data signal SDATA, the count parameter CNTB in the memory buffer 216 is set equal to the count parameter CNTA in the group of registers of the memory buffer 214. Thus, before the second counter 20 resets the count parameter BIT_CNT1, the count parameter CNTB is set equal to the count parameter CNTA. Thus, with respect to the current data pulse, the group of registers of the memory buffer 216 stores the count resulting two data pulses ago.

Accordingly, the groups of registers RB of the second counter 20, the group of the registers of the memory buffer 214, and the group of registers of the memory buffer 216 are coupled in cascade to one another where the group of registers RB of the second counter are the initial group of registers and the group of registers of the memory buffer 216 are the final group of registers. This arrangement allows counts for the three latest data pulses to be stored and compared. As shown in FIG. 16, the SDFDC 208 includes an inverter gate 228 that generates an inverted version of the input data signal SDATA as an inverted input data signal SDATA". In this manner, the group of registers RB of the second counter 20, the group of registers of the memory buffer 214, and the group of registers of the memory buffer 216 are synchronized to correspond to paths the count parameters BIT_CNT1, CNTA, and CNTB based on the data pulses of the input data signal SDATA.

So long as the number of groups of the registers is set equal to or greater than the number of data pulses in the SOS pulse pattern, the sequentially coupled groups of registers can store counts resulting from the latest series of data pulses to determine if the latest series of data pulses has been provided in accordance with the SOS pulse pattern.

The pattern detection circuit 224 is shown operably associated with the groups of registers RB in the second counter 20, the group of registers in the memory buffer 214, and the group of register in the memory buffer 216. In this manner, the pattern detection circuit 224 can receive the current values of the second count parameter BIT_CNT1, the count parameter CNTA, and the count parameter CNTB. The pattern detection circuit 224 is configured to recognize that the sequence of data pulses transmitted along the bus line 12 have been provided in accordance with the SOS pulse pattern. More specifically, the pattern detection circuit is configured to compare the count parameters BIT_CNT1, CNTA, and CNTB in the groups of registers to detect whether the count parameters BIT_CNT1, CNTA, and CNTB indicate that the latest series of three pulses has been provided in accordance with the SOS pulse pattern. As demonstrated in FIG. 13, the SOS pulse pattern is a pattern of pulse widths. In response to the pattern detection circuit 224 detecting that the latest series of three data pulses has been provided in accordance to the SOS pulse pattern (i.e., has the required pulse widths), the pattern detection circuit 224 is configured to acknowledge the SOS pulse pattern by generating the reset output 204.

Figure 17:
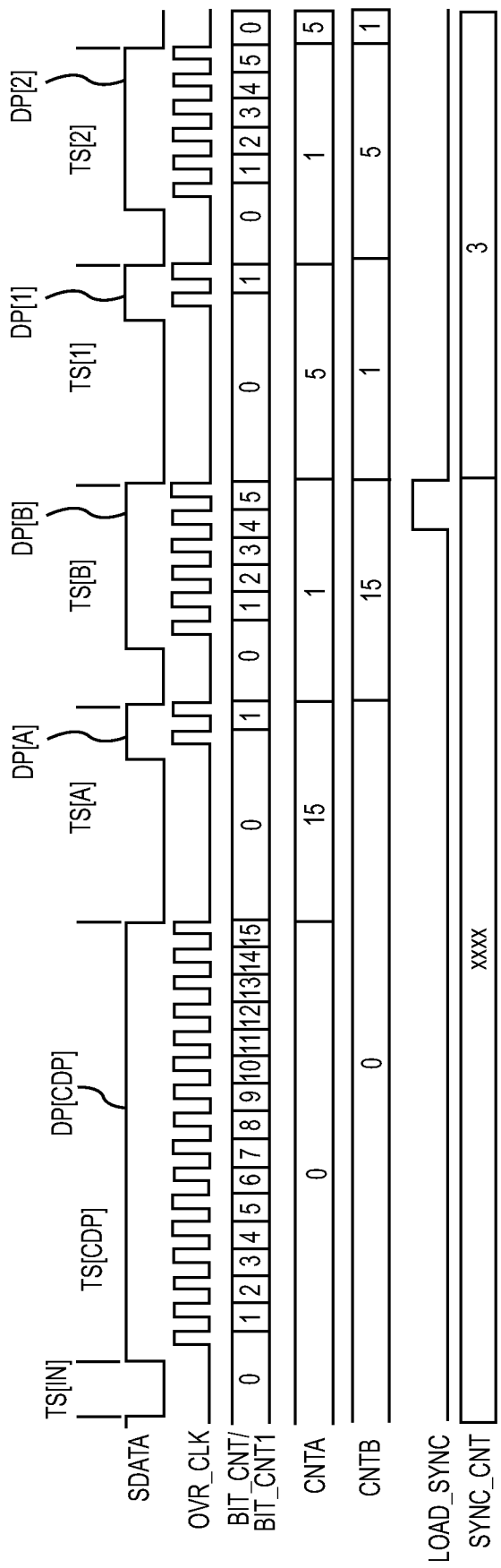
FIG. 17 is a signal graph that illustrates an input data signal and related signals for the circuit diagram in FIG. 16.

Referring now to FIGS. 16 and 17, FIG. 17 illustrates an embodiment of the input data signal SDATA where three data pulses have been provided in accordance to one embodiment of the SOS pulse pattern. In this example, the data pulse DP[CDP] is provided during the time slot TS[CDP] and is the calibration data pulse. The SOS identifier pulse DP[A] is an SOS identifier pulse and is provided during the time slot TS[A]. The SOS identifier pulse DP[B] is another SOS identifier pulse and is provided during the time slot TS[B]. The input data signal SDATA is dropped low in the time slot TS[IN] prior to the calibration data pulse DP[CDP]. The data pulse DP[1] and the data pule DP[2] are each provided in the time slots TS[1] and TS[2]. The data pulses DP[1] and DP[2] represent logical values and are provided after the data pulses DP[CDP], DP[A], and DP[B] after the data frame has been started by the SOS pulse pattern. The time slot TS[IN] is 50% as long as the time slot TS[1] and 50% as long as the time slot TS[2]. The time slot TS[CDP] is two times as long as the timeslot TS[1] and the time slot TS[2]. The calibration data pulse DP[CDP] is provided throughout the entire timeslot TS[CDP]. The time slot TS[A] is the same temporal duration as the time slot TS[1] and the same temporal duration as the time slot TS[2].

The SOS identifier pulse DP[A] is provided for 25% of the time slot TS[A]. The time slot TS[B] is the same time duration as the time slot TS[1] and is the same time duration as the time slot TS[2]. The calibration identifying data pulse DP[2] is provided during 75% of the time slot TS[B]. Thus, the SOS pulse pattern is provided by the data pulses DP[CDP], DP[A], and DP[B] as a pulse having pulse width equal to 200% of a standard time slot followed by a data pulse having a pulse width that is 25% the length of a standard time slot and then followed by a data pulse having a pulse width that is 75% the time length of a standard time slot.

To detect whether the latest series of three data pulses is provided in accordance with the SOS pulse pattern, the pattern detection circuit 224 includes a comparator 232, a comparator 234, and comparator 236, and a comparator 238. Furthermore, the pattern detection circuit 224 includes a multiplier 240, a multiplier 242, a multiplier 244, and a multiplier 246. The comparator 232 has a digital comparator input A1 and a digital comparator input B1. The comparator 232 receives a value at the digital comparator input A1 and a value at the digital parameter input B1. The comparator 232 generates a comparator output signal 248 based on whether the value at the digital comparator output A1 is greater than the output at the digital comparator output B1 More specifically, the comparator output signal 248 is high if the value at the digital comparator input A1 is greater than the value at the digital comparator input B1. The comparator 234 is configured to receive a parameter value at the digital comparator input A2 and a parameter value at the digital comparator input B2. The comparator 234 is configured to generate a comparator output signal 252 depending on whether the parameter value received at the digital comparator A2 is greater than the parameter value received at the digital comparator input B2. More specifically, if the parameter value received the digital comparator input A2 is greater than the parameter value received at the digital comparator input B2, the comparator 234 generates the comparator output signal 250 high. Otherwise the comparator output signal 250 is low. The comparator 236 is configured to receive a parameter value at the digital comparator input A3 and a parameter value at the digital comparator input B3. If the parameter value at the digital comparator input A3 is greater than the parameter value received at the digital comparator input B3, the comparator 236 generates a comparator output signal 252 high. Otherwise, the comparator 236 generates the comparator output signal 252 low. Finally, the comparator 238 is configured to receive a parameter value at the digital comparator input A4 and a parameter value at the digital comparator input B4. If the parameter value at the digital comparator input A4 is greater than the input value at the digital comparator input B4, the comparator 238 generates a comparator output signal 256 high. Otherwise the comparator 238 generates the comparator output signal 256 low. T The multiplier 240 is coupled to receive the count parameter BIT_CNT1 from the second counter 20 and to multiply the count parameter BIT_CNT1 by four. The multiplied parameter value is then provided to the digital comparator input A1 of the comparator 232. The digital comparator input B1 of the comparator 232 receives the count parameter CNTA. As for the comparator 234, the digital comparator input A2 is coupled to receive the count parameter BIT_CNT1 from the group of registers RB in the second counter 20. The multiplier 242 is coupled to receive the count parameter CNTA from the group of register in the memory buffer 214 and multiply the count parameter CNTA by one. The multiplied parameter value from the multiplier 242 is provided to the digital comparator B2 of the comparator 234. With regard to the comparator 236, the comparator 236 is configured to receive the count parameter CNTB from the group of registers in the memory buffer 216. The multiplier 244 is coupled to receive the second count parameter BIT_CNT1 from the group of registers RB in the second counter 20. The multiplier 244 multiples the second count parameter BIT_CNT 1 by two. The multiplied parameter value from the multiplier 244 is then provided to the digital comparator input B3 of the comparator 236. Finally, with regard to the comparator 238, the comparator 238 is configured to receive the count parameter CNTB from the group of registers in the memory buffer 216 at the digital comparator input A4. The multiplier 246 is configured to receive the count parameter CNTA from the group of register in the memory buffer 214. The multiplier 246 multiplies the count parameter CNTB by four. The multiplied count parameter from the multiplier 246 is then provided to the digital comparator input B4 of the comparator 238.

The pattern detection circuit 224 includes anding logic 258 that is configured to receive the comparator output signal 248, the comparator output signal 250, the comparator output signal 252, and the comparator output signal 256. The anding logic 258 generates a multiplier select signal LOAD_SYNC that is high when the comparator output signals 248, 250, 252, and 256 are high. Otherwise, the multiplexer selects signal LOAD_SYNC is low. Accordingly, when the multiplexer select signal LOAD_SYNC is high, the pattern detection circuit 224 has detected that the latest series of three data pulses are provided in accordance to the SOS pulse pattern. The conditions for detection are therefore as follows:

BIT_CNT1*4>CNTB

BIT_CNT1>CNTA

CNTB>BIT_CNT1*2

CNTB>CNTA*4

Note that the multiplexing circuit 220 receives the multiplexer select signal LOAD_SYNC to select between its digital multiplexer inputs. One digital multiplexer input of the multiplexing circuit 220 simply receives the reference parameter SYNC_CNT from the group of registers in the memory buffer 210. The other multiplexer input receives the calibration count parameter CNTCAL from the divider 218. The input to the divider 218 is the count parameter CNTB from the group of registers of the memory buffer 216. The divider 218 divides the count parameter CNTB by four. If the multiplexer select signal LOAD_SYNC is low, the multiplexer circuit 230 simply selects the reference parameter SYNC_CNT as provided by the group of registers in the memory buffer 210, thus no change is provided to the reference parameter. However, if the multiplexer select signal LOAD_SYNC is high since the pattern detection circuit 224 has detected the SOS pulse pattern, the multiplexer selects the calibration count parameter CNTCAL. As such, the reference parameter SYNC_CNT is set equal to the calibration count parameter CNTCAL. As explained in further detail below, the count parameter CNTB will be storing the count resulting from the calibration data pulse DP[CDP] once the SOS pulse pattern is detected by the pattern detection circuit 224. The sequential state element 222 receives the multiplexer select signal LOAD_SYNC as a data input. When the multiplexer select signal LOAD_SYNC is low, the output of the sequential state element 222 is low and thus the reset output 204 is not provided to reset the data frame registers 202 shown in FIG. 14. However, if the multiplexer select signal LOAD_SYNC is high because the pattern detection circuit 224 has detected the SOS pulse pattern, the sequential state element will provide a high output, thus, in this case, the reset output 204 is generated in order to reset the data frame registers 202 shown in FIG. 14.

Referring again to FIGS. 16 and 17, the first counter 18 and the second counter 20 are enabled by the calibration data pulse DP[CDP] during the calibration time slot TS[CDP]. In this case, the oscillation signal OVR_CLK generates 15 oscillation pulses as a result of the calibration pulse DP[CDP]. For each of these data pulses, the first count parameter BIT_CNT and the second count parameter BIT_CNT1 are incremented and thus are set to equal 15 at the end of the calibration data pulse DP[CDP]. The count parameter CNTA has been initiated to a value of 0. Similarly the count parameter CNTB has been initiated to a count parameter of 0. Thus at the end of the calibration data pulse DP[CDP], the second count parameter BIT_CNT1 is equal to 15, the count parameter CNTA is equal to 0, and the count parameter CNTB is equal to 0. Thus, the pattern detection circuit 224 has not detected that a series of data pulses has been provided in accordance to the SOS pulse pattern. At the beginning of the time slot TS[A], the first count parameter BIT_CNT and the second count parameter BIT_CNT1 are initiated to 0. Also, the count parameter CNTA is passed the value of the second count parameter BIT_CNT1 before initialization and is set to 15. The count parameter CNTB is set to 0. Thus the multiplexer select signal LOAD_SYNC remains low. The oscillator 14 is enabled by the SOS identifier pulse DP[A] during the time slot TS[A]. As a result of the SOS identifier pulse DP[A], the oscillation signal OVR_CLK generates two data pulses. In this case, this results in the first count parameter BIT_CNT and the second count parameter BIT_CNT1 being set to 1 at the end of the SOS identifier pulse DP[A] at the end of the time slot TS[A]. Again, the multiplexer select signal LOAD_SYNC is still low since the pattern detection circuit 224 has not detected the SOS pulse pattern.

At the beginning of the time slot TS[B], the value of the count parameter CNTA is passed to the memory buffer 216 so that the count parameter CNTB is equal to 15. The value of the second count parameter BIT_CNT1 is passed as the parameter value of the count parameter CNTA. Thus, the count parameter CNTA is set equal to one. The first count parameter BIT_CNT and the second count parameter BIT_CNT1 are then re-initiated to zero. The oscillator 14 is again enabled during the time slot TS[B] by the SOS identifier pulse DP[B] and the first counter 18 and the second counter 20 increment the first count parameter BIT_CNT and the second count parameter BIT_CNT1, respectively. Note that the data pulses DP[CDP], DP[A], DP[B] are a sequence of data pulses provided in the input data signal SDATA in accordance with the SOS pulse pattern. Thus after the first count parameter BIT_CNT and the second count parameter BIT_CNT1 have been incremented to 4, the aforementioned list of conditions to detect the SOS pulse pattern are met. Thus, during the time slot TS[B], the pattern detection circuit 224 detects that the data pulses DP[CDP], DP[A], and DP[B] are provided in accordance with the SOS pulse pattern. In this case, the multiplexer select signal LOAD_SYNC is generated high. At the end of the time slot TS[B], the reference parameter SYNC_CNT is set to equal to the calibration count parameter CNTCAL which is determined based on the count parameter CNTB divided by 4. Thus at the beginning of the time slot TS[1], the decoder 10 has been calibrated by setting the reference parameter to 3. Note that the count parameter CNTB was equal to 15 which corresponded to the count resulting two previous data pulses ago during the time slot TS[CDP]. Thus, when the pattern detection circuit 224 does detect the SOS pulse pattern, the count parameter CNTB will be the count parameter set equal to the count resulting from the calibration data pulse DP[CDP].

At the beginning of the time slot TS[1], the second count parameter BIT_CNT1, the count parameter CNTA, and the count parameter CNTB are sequentially passed as shown. However, since the data pulses DP[A], DP[B] and DP[1] are not provided in accordance to the SOS pulse pattern, the multiplexer select signal LOAD_SYNC is maintained low. Thus in this case the value of the reference parameter SYNC_CNT is simply looped back into the memory buffer 210 and is not changed. The same is true during the time slot TS[2]. During the time slot TS[2], the pattern detection circuit 224 does not detect the SOS pulse pattern. This is because the SOS identifier pulse DP[B], the data pulse DP[1], and the data pulse DP[2] are not provided in accordance to the SOS pulse pattern. Therefore, the multiplexer select signal LOAD_SYNC is maintained low and the reference parameter is simply looped back into the memory buffer 210.

Figure 18:
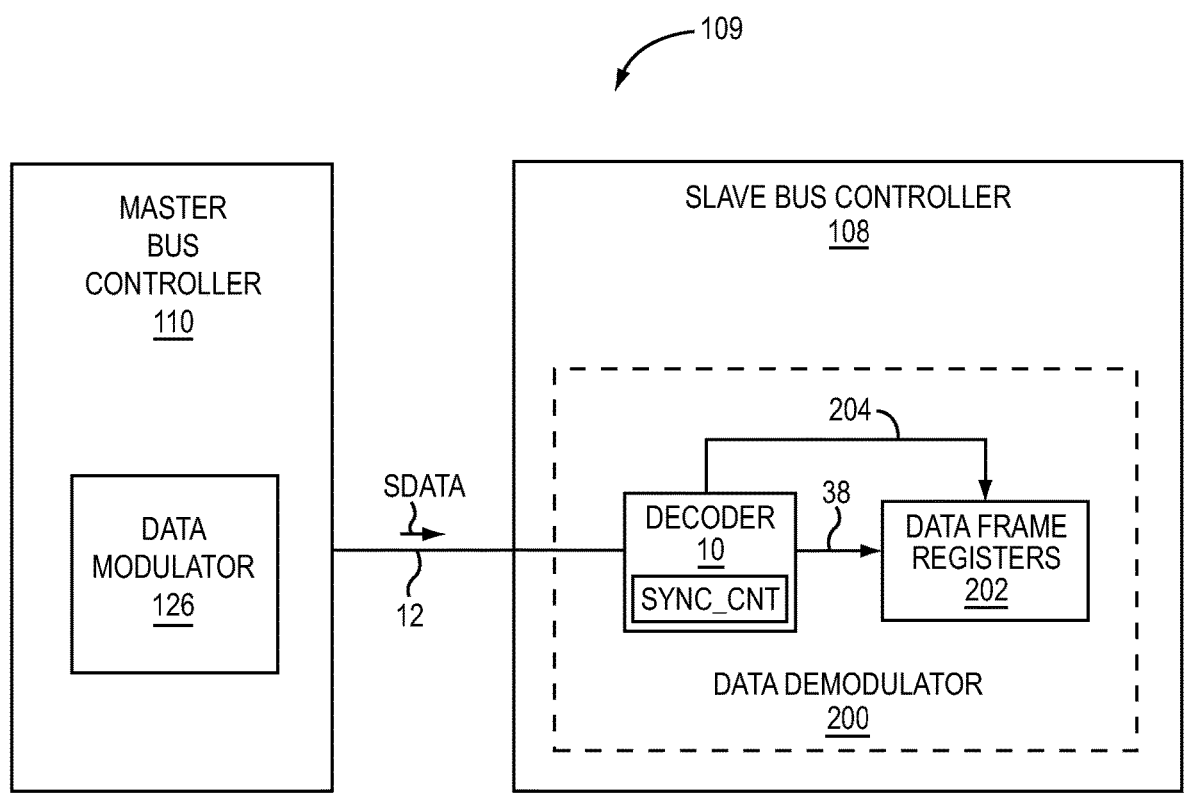
FIG. 18 illustrates yet another embodiment of a data demodulator wherein the data modulator has a decoder that is configured to detect that a sequence of data pulses has been provided in accordance with the SOS pulse pattern.

FIG. 18 illustrates another embodiment of the bus interface system 109 that includes the master bus controller 110 and the slave bus controller 108 coupled to the bus line 12. As in the previously described embodiments, the master bus controller 110 includes the data modulator 126, which generates the input data signal SDATA in accordance to a PWM bus protocol. In this embodiment, as with the embodiment described with respect to FIGS. 12 and 14, the data modulator 126 is configured to generate a sequence of data pulses in accordance to the SOS pulse pattern at the beginning of each data frame.

The slave bus controller 108 includes one embodiment of the data demodulator 200 described above with respect to FIG. 12. Unlike the embodiment of the data demodulator 200 shown in FIG. 14, the data demodulator 200 shown in FIG. 18 includes an embodiment of the decoder 10 that is configured to recognize that the sequence of data pulses transmitted along the bus line from the master bus controller 110 have been provided in accordance with the SOS pulse pattern. Consequently, in this embodiment, the decoder 10 itself is capable of recognizing that a new data frame has begun when the data modulator 126 of the master bus controller 110 generates the sequence of data pulses in accordance to the SOS pulse pattern. Accordingly, in this embodiment, the decoder 10 is configured to generate the reset output 204 that clears the data frame registers 202 in response to the decoder 10 recognizing the sequence of data pulses in accordance to the SOS pulse pattern.

Additionally, the decoder 10 is configured to calibrate itself using the calibration data pulse provided in the sequence of data pulses that start the data frame. Thus, the decoder 10 is also configured to calibrate the decoder 10 in accordance with the calibration data pulse in response to recognizing that the sequence of data pulses has been provided in accordance to the SOS pulse pattern. The master bus controller 110 generates the data pulses in the input data signal SDATA along the bus line 12, as with the embodiments described above. Logical values of logical symbols are represented in accordance with the PWM bus protocol. With regard to calibration, the decoder 10 is configured to store the reference parameter SYNC_CNT.

The decoder 10 is further configured to calibrate the decoder 10 in accordance with the calibration data pulse DP[CDP] by setting the reference parameter SYNC_CNT based on the calibration data pulse DP[CDP] in response to recognizing that the sequence of data pulses has been provided in accordance with the SOS pulse pattern. Thus, the decoder 10 itself sets the reference parameter in accordance to the count resulting from the calibration data pulse when the master bus controller 110 is again operating to start a new data frame. Once the data frame has been started, as with the previous embodiments described above, the decoder 10 decodes the data pulses transmitted along the bus line 12 based on the reference parameter SYNC_CNT. The logical value represented by the particular data pulse is represented by the memory input signal 38 and stored in the data frame registers 202. The data demodulator 200 shown in FIG. 18 thus can perform the procedures described in FIG. 15, just like the embodiment shown in FIG. 14 except that the SDFDC 208 is not provided.

Figure 19:
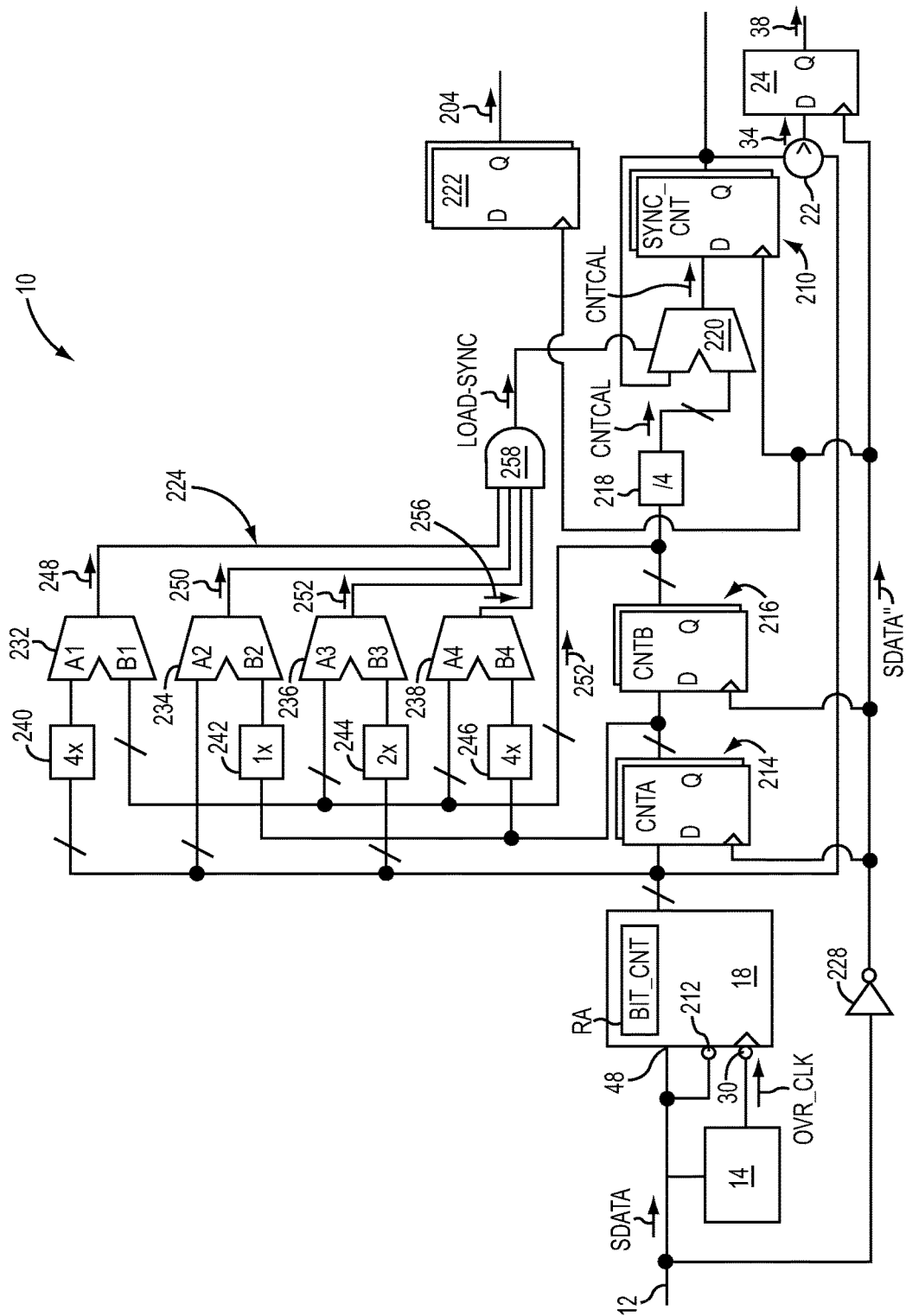
FIG. 19 is an exemplary circuit diagram of the decoder shown in FIG. 18.

FIG. 19 illustrates an exemplary circuit diagram of the decoder 10 shown in FIG. 18. Like the decoder 10 shown in FIG. 16, the decoder 10 in FIG. 19 includes the oscillator 14, the first counter 18, the comparison circuit 22, the sequential state element 24, and the memory buffer 210 (which stores the reference parameter SYNC_CNT). With respect to these components, the decoder 10 of FIG. 19 operates in the same manner described above with respect to FIG. 16. Thus, the oscillator 14 is configured to be enabled by each of the data pulses transmitted along the bus line 12. The oscillator 14 generates oscillation pulses in the oscillation signal OVS_CLK while enabled by each of the data pulses provided in the input data signal SDATA. The first counter 18 is operable to store the first count parameter BIT_CNT. For each data pulse of the data pulses provided in the input data signal SDATA, the first counter 18 is configured to count the oscillation pulses such that the first count parameter BIT_CNT indicates the number of oscillation pulses generated as a result of the particular data pulse. The reference registers of the memory buffer 210 are configured to store the reference parameter SYNC_CNT.

As with the embodiments described above, the comparison circuit 22 is configured to compare the first count parameter BIT_CNT with the reference parameter SYNC_CNT. The reference parameter SYNC_CNT which is set in accordance to the calibration data pulse. Therefore, the comparison circuit 22 is configured to generate the data output 34 such that the data output 34 represents a first logical value in response to the first count parameter BIT_CNT being greater than the reference parameter SYNC_CNT. However, the comparison circuit 22 generates the data output 34 to represent a second logical value in response to the first count parameter BIT_CNT being less than the reference parameter SYNC_CNT. The sequential state element 24 generates the memory input signal 38 to represent the logical value from the data output 34 as described above with respect to the embodiments of the decoder described in FIGS. 1 and 16.

However, in this embodiment, the pattern detection circuitry 224 is integrated into the decoder 10. Thus, the decoder 10 further includes the memory buffer 214, the memory buffer 216, the divider 218, the multiplexing circuit 220, the sequential state element 222, the pattern detection circuit 224, and the inverter gate 228. All of these components operate in the same manner as described for the SDFDC 208 shown in FIG. 16, except that in this case, the first counter 18 is coupled in sequence to the memory buffer 214 and the pattern detection circuit 224 operates with the first count parameter BIT_CNT rather than the second count parameter BIT_CNT1 (shown in FIG. 16).

Accordingly, in this embodiment, the group of registers RA of the first counter 18, the group of registers of the memory buffer 214, and the group of registers of the memory buffer 216 are sequentially coupled in cascade to one another so that the group of registers RA of the first counter 18 are the initial group of registers and the group of registers of the memory buffer 216 are the final group of registers. However, just like with the embodiment described above with respect to FIG. 16, the group of registers of the memory buffer 214 store the count parameter CNTA and the group of registers of the memory buffer 216 are configured to store the count parameter CNTB. Unlike the embodiment shown in FIG. 16 where the value of the second count parameter BIT_CNT1 (shown in FIG. 16) was passed along to the group of registers in the memory buffer 214 and the group of registers in the memory buffer 216, in this embodiment, the value of the first count parameter BIT_CNT is passed along to the group of registers in the memory buffer 214 and to the group of registers in the memory buffer 216 in sequence instead.

The decoder 10 also includes the inverter gate 228 that generates the inverted input data signal SDATA". Thus, the group of registers RA of the first counter 18, the group of register of the memory buffer 214, and the group of registers of the memory buffer 216 are synchronized to pass the corresponding count parameters BIT_CNT, CNTA, CNTB based on the data pulses in the input data signal SDATA. Accordingly, the count resulting from the series of last three data pulses is stored in the group of counter registers RA, the group of registers of the memory buffer 214, and the group of registers of the memory buffer 216.

The pattern detection circuit 224 is configured to recognize that a sequence of the data pulses transmitted along the bus line 12 in the input data signal SDATA has been provided in accordance with the SOS pulse pattern. However, in the embodiment shown in FIG. 19, the first count parameter BIT_CNT is used by the pattern detection circuit 224 rather than the second count parameter BIT_CNT1 (shown in FIG. 16). Thus the multiplier 240 is configured to receive the first count parameter BIT_CNT, the digital comparator input A2 of the comparator 234 is configured to receive the first count parameter BIT_CNT, and the multiplier 244 is configured to receive the first count parameter BIT_CNT from the group of registers RA of the first counter 18. Otherwise, the pattern detection circuit 224 operates in the same manner described above with respect to FIG. 16.

Thus, the pattern detection circuit 224 shown in FIG. 19 is configured to compare the count parameters BIT_CNT, CNTA, CNTB to detect whether the count parameters BIT_CNT, CNTA, CNTB have been provided in accordance with the SOS pulse pattern. If so, the anding logic 258 generates the multiplexer select input signal LOAD_SYNC high. This results in the sequential state element 222 providing the reset output 204 and the multiplexing circuit 220 setting the reference parameter SYNC_CNT in accordance with the calibration count parameter CNTCAL from the divider 218. Otherwise, the anding logic 258 generates the multiplexer select signal LOAD_SYNC low. As such, the reset output 204 is not generated, and the reference parameter SYNC_CNT is simply reloaded by the multiplexing circuit 220 back into the memory buffer 210 with no change in value. The decoder 10 shown in FIG. 19 can thus provide the wave forms shown in FIG. 17 (except there is no second count parameter BIT_CNT1 shown in FIG. 16). As such the SOS pulse pattern is simply a pattern of pulse widths. The pattern detection circuit 224 utilizes the count parameters BIT_CNT, CNTA, CNTB in order to detect that the sequence of the data pulses DP[CDP], DP[A], and DP[B] have been provided in accordance to the SOS pulse pattern. In this manner, the decoder 10 shown in FIG. 19 is configured to recognize when the master bus controller 110 (shown in FIG. 18) has started a new data frame.

Figure 20:
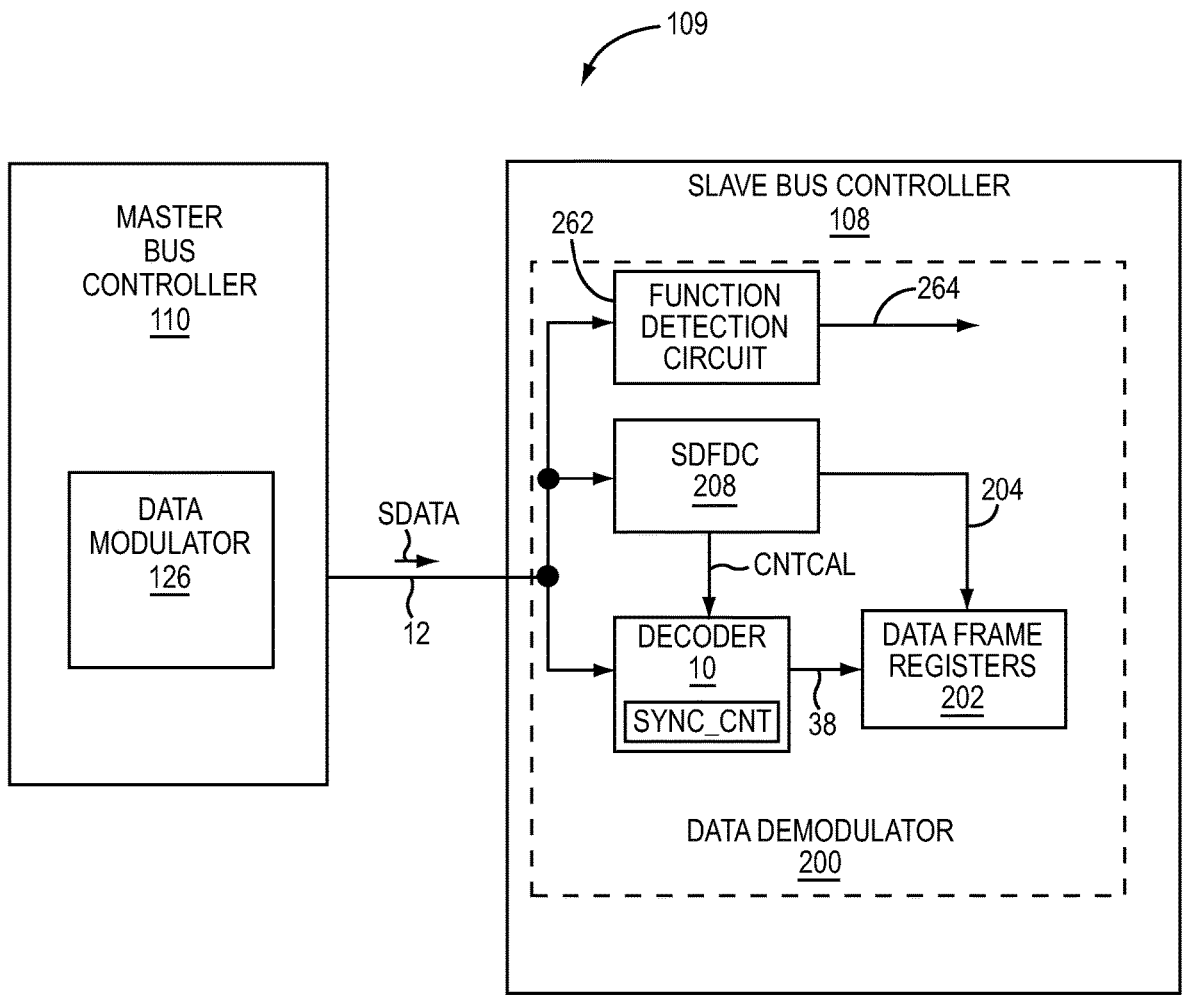
FIG. 20 illustrates yet another embodiment of the bus interface system wherein the data demodulator of the slave bus controller includes the SDFDC described with respect to FIG. 14 and a function detection circuit configured to recognize a function request pulse pattern.

FIG. 20 illustrates yet another embodiment of the bus interface system 109 that includes an embodiment of the master bus controller 110 and the slave bus controller 108 coupled to the bus line 12. The master bus controller 110 includes the data modulator 126 and is the same as the master bus controller 110 described in FIG. 14. The data demodulator 200 includes SDFDC 208, the same decoder 10, and the same data frame registers 202 described above with respect to FIG. 14. However, in this embodiment, the data demodulator 200 further includes a function detection circuit 262. For example, the data modulator 126 of the master bus controller 110 may be configured to generate a sequence of the data pulses in the input data signal in accordance with a function request pulse pattern. As such, there may be a function that the master bus controller 110 wants to request that the slave bus controller 108 perform that does not involve the exchange of logical values (e.g., data bits). Rather, the function requested to be performed by the master bus controller 110 simply needs to be recognized by the slave bus controller 108 for performance.

One example of such a function is a trigger function. The trigger function simply is requesting that the slave bus controller 108 do a particular procedure or set of procedures once the function has been requested by the master bus controller 110. For example, the trigger function may be requesting that the slave bus controller 108 place certain data into operational registers. Address information and payload information are not necessary because that information had already previously been transmitted to the slave bus controller 108 from the master bus controller 110. To request the function (e.g., such as the trigger function), the master bus controller 110 generates a sequence of data pulses in accordance with a function request pulse pattern. The function request pulse pattern may also be a pattern of pulse widths that is distinct from other possible combinations of data pulses that can be transmitted by the data modulator 126 along the bus line 12. Accordingly, the function request pulse pattern is distinct from the SOS pulse pattern along with any other pulse pattern that can be generated as a result of the exchange of logical symbols along the bus line 12.

The function detection circuit 262 in the data demodulator 200 of the slave bus controller 108 shown in FIG. 20 is configured to recognize that the sequence of data pulses transmitted along the bus line 12 have been provided in accordance with the function request pulse pattern. In response, the function detection circuit 262 generates a request output 264 that indicates that the function (e.g., the trigger function) has been requested. The slave bus controller 108 then performs the function (e.g., the trigger function) in response to recognizing that the second sequence has been provided in accordance with the function detection pattern.

Figure 21:
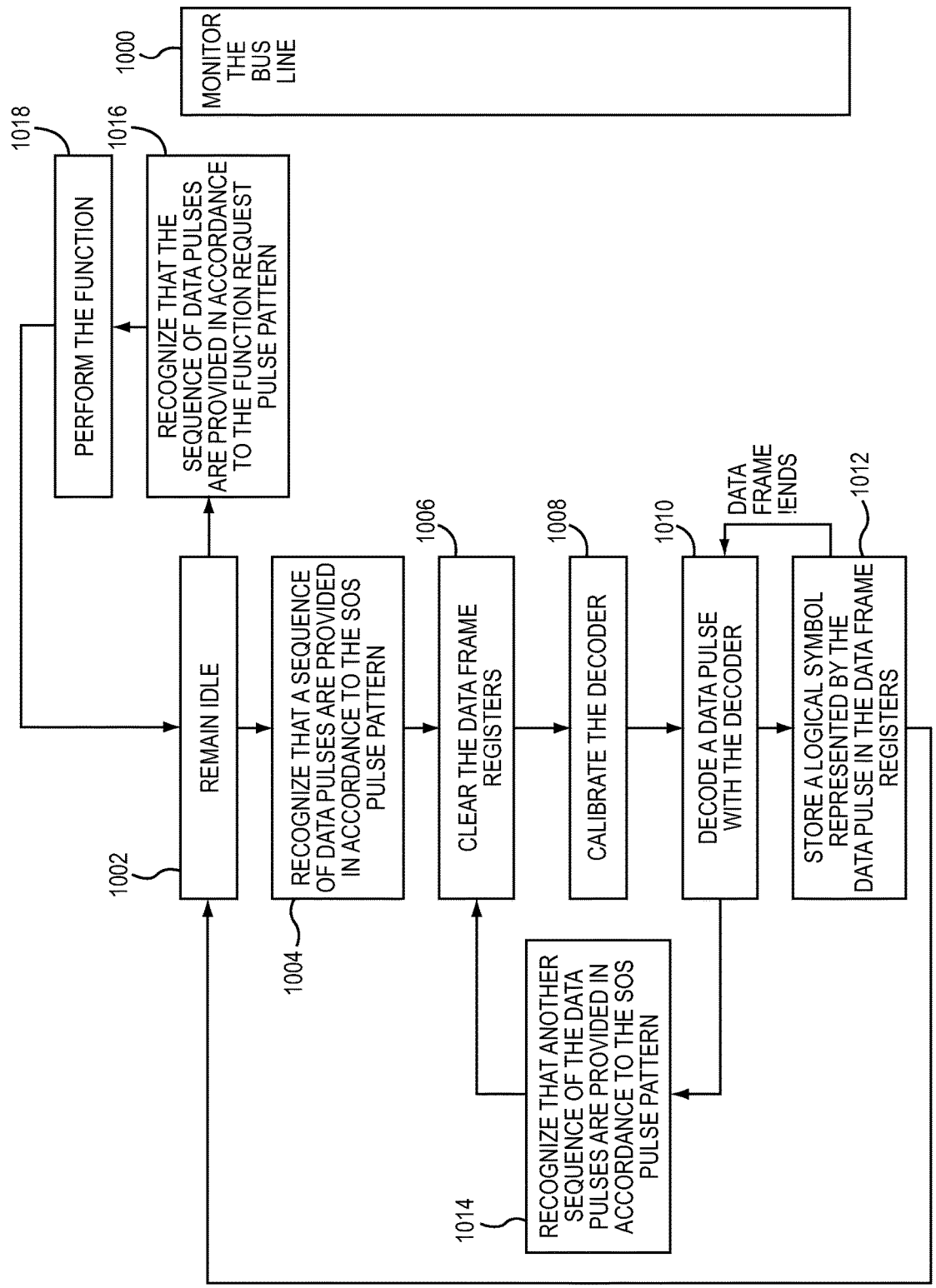
FIG. 21 illustrates a method of operating the slave bus controller shown in FIG. 20.

FIG. 21 illustrates another embodiment of a method of operating the bus interface system 109. In particular, the method refers to the functions performed by the data demodulator 200 shown in FIG. 20. The procedures 1000-1014 are the same as the ones described in the embodiment shown in FIG. 15. However, in this embodiment, the data modulator 126 of the master bus controller 110 is also configured to generate a sequence of data pulses in the input data signal SDATA along the bus line 12 in accordance to the function request pulse pattern. Upon receiving the sequence of the data pulses in accordance to the function request pulse pattern, the function detection circuit 262 is configured to recognize that the sequence of the data pulses is provided in the function detect request pattern (procedure 1016). In the particular embodiment shown in FIG. 20, the function detection circuit 262 is configured to generate the request output 264 in response to recognizing that the sequence of data pulses is provided in accordance to the pulse pattern. The slave bus controller 108 performs the function (e.g., the trigger function) in response to the function detection circuit 262 recognizing that the sequence of data pulses has been provided in accordance to the function request pulse pattern (procedure 1018).

Those skilled in the art will recognize improvements and modifications to the preferred embodiments of the present disclosure. All such improvements and modifications are considered within the scope of the concepts disclosed herein and the claims that follow.

What is claimed is:

1. A bus interface system, comprising:
a single bus line consisting of one wire;
a master bus controller coupled to the single bus line, wherein the master bus controller is configured to generate a sequence of data pulses along the single bus line such that the sequence of data pulses is provided in accordance with a first pulse pattern and the sequence of data pulses includes a calibration data pulse; and
a slave bus controller coupled to the single bus line, wherein no other bus line connects the master bus controller and the slave bus controller, and wherein the slave bus controller comprises a decoder and the slave bus controller is configured to:
recognize that the sequence of data pulses transmitted along the single bus line has been provided in accordance with the first pulse pattern; and
calibrate the decoder in accordance with the calibration data pulse in response to recognizing that the sequence of data pulses has been provided in accordance with the first pulse pattern.

2. The bus interface system of claim 1 wherein the slave bus controller further comprises data frame registers and the slave bus controller is further configured to clear the data frame registers in response to recognizing that the sequence of data pulses has been provided in the first pulse pattern.

3. The bus interface system of claim 2 wherein the master bus controller is configured to generate an additional data pulse upon transmitting the sequence of data pulses such that the additional data pulse represents a logical value wherein:
the decoder is configured to generate a memory input signal in response to the additional data pulse such that the memory input signal represents the logical value; and
the data frame registers are configured to store the logical value represented by the memory input signal in the data frame registers.

4. The bus interface system of claim 1 wherein the master bus controller is configured to start communication of a first data frame along the single bus line with the sequence of data pulses.

5. The bus interface system of claim 4 wherein the master bus controller is configured to start the communication of the first data frame with the sequence of data pulses by ending a communication interlude along the single bus line.

6. The bus interface system of claim 4 wherein the master bus controller is configured to start the communication of the first data frame with the sequence of data pulses by interrupting communication of a previous data frame being communicated along the single bus line.

7. The bus interface system of claim 1 wherein the slave bus controller further comprises a start of data frame detection circuit (SDFDC) configured to:
recognize that the sequence of data pulses transmitted along the single bus line has been provided in accordance with the first pulse pattern; and
calibrate the decoder in accordance with the calibration data pulse in response to recognizing that the sequence of data pulses has been provided in accordance with the first pulse pattern.

8. The bus interface system of claim 7 wherein:
the master bus controller is configured to generate data pulses along the single bus line, wherein the data pulses include the sequence of data pulses;
the decoder is configured to store a reference parameter and decode data pulses transmitted along the single bus line based on the reference parameter; and
the SDFDC is configured to calibrate the decoder in accordance with the calibration data pulse by setting the reference parameter based on the calibration data pulse in response to recognizing that the sequence of data pulses has been provided in accordance with the first pulse pattern.

9. The bus interface system of claim 8 wherein the decoder comprises:
an oscillator that is configured to be enabled by each of the data pulses transmitted along the single bus line and to generate oscillation pulses while enabled by each of the data pulses;
a first counter operable to store a first count parameter, wherein, for each data pulse of the data pulses the first counter is configured to count the oscillation pulses generated such that the first count parameter indicates a number of the oscillation pulses as a result of the data pulse;
reference registers configured to store the reference parameter that indicates a reference number; and
a comparison circuit configured to compare the first count parameter with the reference parameter that indicates the reference number and generate a data output such that the data output represents a first logical value in response to the first count parameter being greater than the reference parameter and such that the data output represents a second logical value in response to the first count parameter being less than the reference parameter.

10. The bus interface system of claim 9 wherein the SDFDC is configured to:
for each of the data pulses, count the oscillation pulses generated as a result of the data pulse; and
set the reference parameter stored by the decoder based on a number of the oscillation pulses counted by the SDFDC as a result of the calibration data pulse in response to recognizing that the sequence of data pulses has been provided in accordance with the first pulse pattern.

11. The bus interface system of claim 10 wherein the slave bus controller further comprises data frame registers and the SDFDC is further configured to clear the data frame registers in response to recognizing that the sequence of data pulses has been provided in the first pulse pattern.

12. The bus interface system of claim 8 wherein the first pulse pattern is a pulse width pattern and wherein the SDFDC is configured to recognize that the sequence of data pulses transmitted along the single bus line has been provided in accordance with the first pulse pattern by being configured to:

measure a pulse width of each of the data pulses;
store parameters so that each parameter of the parameters indicates the pulse width of a different data pulse in a series of the data pulses;
detect whether the parameters indicate that the series of the data pulses has been provided with the first pulse pattern; and
acknowledge that the series of the data pulses has been provided in accordance with the first pulse pattern when the series of the data pulses is the sequence of data pulses.

13. The bus interface system of claim 1 wherein the decoder of the slave bus controller is configured to:
recognize that the sequence of data pulses transmitted along the single bus line has been provided in accordance with the first pulse pattern; and
calibrate the decoder in accordance with the calibration data pulse in response to recognizing that the sequence of data pulses has been provided in accordance with the first pulse pattern.

14. The bus interface system of claim 13 wherein:
the master bus controller is configured to generate data pulses along the single bus line, wherein the data pulses include the sequence of data pulses; and
the decoder is configured to:
store a reference parameter;
decode data pulses transmitted along the single bus line based on the reference parameter; and
calibrate the decoder in accordance with the calibration data pulse by setting the reference parameter based on the calibration data pulse in response to recognizing that the sequence of data pulses has been provided in accordance with the first pulse pattern.

15. The bus interface system of claim 14 wherein the decoder comprises:
an oscillator that is configured to be enabled by each of the data pulses transmitted along the single bus line and to generate oscillation pulses while enabled by each of the data pulses;
a first counter operable to store a first count parameter, wherein, for each data pulse of the data pulses, the first counter is configured to count the oscillation pulses such that the first count parameter indicates a number of the oscillation pulses generated as a result of the data pulse;
reference registers configured to store the reference parameter that indicates a reference number; and
a comparison circuit configured to compare the first count parameter with the reference parameter that indicates the reference number and generate a data output such that the data output represents a first logical value in response to the first count parameter being greater than the reference parameter and such that the data output represents a second logical value in response to the first count parameter being less than the reference parameter.

16. The bus interface system of claim 15 wherein the decoder further comprises:
groups of registers sequentially coupled in cascade to one another so as to include an initial group of registers and a final group of registers, the groups of registers being configured to store count parameters such that each group of registers of the groups of registers stores a corresponding one of the count parameters;
each of the groups of registers is synchronized to pass the corresponding one of the count parameters based on the data pulses; and
the first counter is configured to store the first count parameter in the initial group of registers.

17. The bus interface system of claim 16 wherein the decoder further comprises a pattern detection circuit configured to recognize that the sequence of data pulses transmitted along the single bus line has been provided in accordance with the first pulse pattern by being configured to:
compare the count parameters in the groups of registers to detect whether the count parameters have been provided in accordance with the first pulse pattern; and
acknowledge the first pulse pattern in response to detecting that the count parameters have been provided in accordance with the first pulse pattern.

18. The bus interface system of claim 17 wherein the decoder is configured to set the reference parameter equal to the count parameter stored by the final group of registers in response to the pattern detection circuit detecting that the count parameters are provided in accordance with the first pulse pattern.

19. The bus interface system of claim 1 wherein the decoder comprises:
an oscillator that is configured to be enabled by each of the data pulses in the sequence of data pulses transmitted along the single bus line and to generate oscillation pulses while enabled by each of the data pulses in the sequence of data pulses;
a first counter, wherein, for each data pulse of the data pulses in the sequence of data pulses, the first counter is configured to count the oscillation pulses such that a first count parameter indicates a number of the oscillation pulses generated as a result of the data pulse; and
groups of registers sequentially coupled in cascade to one another so as to include an initial group of registers and a final group of registers, the groups of registers being configured to store count parameters such that each group of registers of the groups of registers stores a corresponding one of the count parameters;
wherein each of the groups of registers is synchronized to pass the corresponding one of the count parameters based on the data pulses in the sequence of data pulses; and
wherein the first counter is configured to store the first count parameter in the initial group of registers.

20. The bus interface system of claim 19 wherein the decoder further comprises a pattern detection circuit configured to recognize that the sequence of data pulses transmitted along the single bus line has been provided in accordance with the first pulse pattern by being configured to:
compare the count parameters in the groups of registers to detect whether the count parameters have been provided in accordance with the first pulse pattern; and
acknowledge the first pulse pattern in response to detecting that the count parameters have been provided in accordance with the first pulse pattern.

21. The bus interface system of claim 20 wherein the pattern detection circuit is configured to detect whether the count parameters have been provided in accordance with the first pulse pattern, wherein the first pulse pattern is a pattern of pulse widths.

22. The bus interface system of claim 1 wherein:
the master bus controller is further configured to generate a second sequence of data pulses along the single bus line such that the second sequence of data pulses is provided in accordance with a second pulse pattern;

the slave bus controller is further configured to:
- recognize that the second sequence of data pulses transmitted along the single bus line has been provided in accordance with the second pulse pattern; and
- perform a function in response to recognizing that the second sequence of data pulses has been provided in accordance with the second pulse pattern.

23. The bus interface system of claim 22 wherein the function is a trigger function.

24. The bus interface system of claim 22 wherein the slave bus controller further comprises a function detection circuit configured to recognize that the second sequence of data pulses transmitted along the single bus line has been provided in accordance with the second pulse pattern.

25. A method of operating a one wire bus interface system that includes a master bus controller and a slave bus controller coupled along a single bus line, wherein no other bus line connects the master bus controller and the slave bus controller, the method comprising:
- generating a sequence of data pulses along the single bus line with the master bus controller such that the sequence of data pulses is provided in accordance with a first pulse pattern and the sequence of data pulses includes a calibration data pulse;
- recognizing that the sequence of data pulses transmitted along the single bus line to the slave bus controller has been provided in accordance with the first pulse pattern; and
- calibrating a decoder in the slave bus controller in accordance with the calibration data pulse in response to recognizing that the sequence of data pulses has been provided in accordance with the first pulse pattern.

26. The method of operation of claim 25 further comprising clearing data frame registers in the slave bus controller in response to recognizing that the sequence of data pulses has been provided in accordance with the first pulse pattern.

27. The method of operation of claim 26 wherein the data frame registers are cleared by the slave bus controller to begin a data frame that is provided after the slave bus controller has been idle.

28. The method of operation of claim 26 wherein the data frame registers are cleared by the slave bus controller when the master bus controller has interrupted transmission of a data frame.

29. The method of operation of claim 26 further comprising:
- generating an additional data pulse with the master bus controller; and
- decoding the additional data pulse with the decoder in accordance with a Pulse Width Modulation (PWM) bus protocol.

30. The bus interface system of claim 1, wherein the bus interface system is a one wire bus interface system.

31. The bus interface system of claim 30, wherein power, synchronization information, payload information, and address information are all delivered to the slave bus controller on the single bus line.

* * * * *